(12) United States Patent
Kopelman et al.

(10) Patent No.: US 11,564,777 B2
(45) Date of Patent: Jan. 31, 2023

(54) RELEASABLE PALATAL EXPANDERS

(71) Applicant: Align Technology, Inc., San Jose, CA (US)

(72) Inventors: Avi Kopelman, Palo Alto, CA (US); Ryan Kimura, San Jose, CA (US); Yaser Shanjani, Milpitas, CA (US); Jeremy Riley, Mountain View, CA (US); Jun Sato, San Jose, CA (US); Bob Grove, San Jose, CA (US); Reza Shirazi Aghjari, San Jose, CA (US)

(73) Assignee: Align Technology, Inc., San Jose, CA (US)

( * ) Notice: Subject to any disclaimer, the term of this patent is extended or adjusted under 35 U.S.C. 154(b) by 667 days.

(21) Appl. No.: 16/380,801

(22) Filed: Apr. 10, 2019

(65) Prior Publication Data

US 2019/0314119 A1 Oct. 17, 2019

Related U.S. Application Data

(60) Provisional application No. 62/656,289, filed on Apr. 11, 2018, provisional application No. 62/735,658, filed on Sep. 24, 2018.

(51) Int. Cl.
*A61C 7/10* (2006.01)
*A61C 7/02* (2006.01)

(52) U.S. Cl.
CPC .............. *A61C 7/10* (2013.01); *A61C 7/023* (2013.01)

(58) Field of Classification Search
CPC ..................................... A61C 7/08; A61C 7/10
See application file for complete search history.

(56) References Cited

U.S. PATENT DOCUMENTS

| 2,098,867 A | 11/1937 | Baxter |
| 2,171,695 A | 9/1939 | Harper |
| 2,194,790 A | 3/1940 | Jeno et al. |
| 2,467,432 A | 4/1949 | Kesling |

(Continued)

FOREIGN PATENT DOCUMENTS

| AU | 517102 B | 11/1977 |
| AU | 3031677 A | 11/1977 |

(Continued)

OTHER PUBLICATIONS

US 8,553,966 B1, 10/2013, Alpern et al. (withdrawn)

(Continued)

*Primary Examiner* — Ralph A Lewis
(74) *Attorney, Agent, or Firm* — Shay Glenn LLP

(57) ABSTRACT

Releasable and removable palatal expander apparatuses for expanding a patient's palate ("palatal expanders") and methods of using and making them. These releasable palatal expanders are adapted for ease in removal by the patient or caregiver, and may include a breach region configured to predictably bend or break when a pulling force is applied. The palatal expander apparatuses described herein may include one or more locks for locking the palatal expander onto the patient's teeth. The lock(s) may be unlocked to release the palatal expander from the teeth. A lock may include a control for manually unlocking the lock. Unlocking the locks may allow the palatal expander to automatically disengage from the patient's teeth.

35 Claims, 28 Drawing Sheets

(56) References Cited

U.S. PATENT DOCUMENTS

| | | |
|---|---|---|
| 2,531,222 A | 11/1950 | Kesling |
| 2,818,065 A | 12/1957 | Freed |
| 3,089,487 A | 5/1963 | Enicks et al. |
| 3,092,907 A | 6/1963 | Traiger |
| 3,162,948 A | 12/1964 | Gerber |
| 3,178,820 A | 4/1965 | Kesling |
| 3,211,143 A | 10/1965 | Grossberg |
| 3,277,892 A | 10/1966 | Tepper |
| 3,379,193 A | 4/1968 | Monsghan |
| 3,385,291 A | 5/1968 | Martin |
| 3,407,500 A | 10/1968 | Kesling |
| 3,478,742 A | 11/1969 | Bohlmann |
| 3,496,936 A | 2/1970 | Gores |
| 3,533,163 A | 10/1970 | Kirschenbaum |
| 3,556,093 A | 1/1971 | Quick |
| 3,600,808 A | 8/1971 | Reeve |
| 3,660,900 A | 5/1972 | Andrews |
| 3,683,502 A | 8/1972 | Wallshein |
| 3,724,075 A | 4/1973 | Kesling et al. |
| 3,738,005 A | 6/1973 | Cohen et al. |
| 3,797,115 A | 3/1974 | Cohen et al. |
| 3,860,803 A | 1/1975 | Levine |
| 3,885,310 A | 5/1975 | Northcutt |
| 3,916,526 A | 11/1975 | Schudy |
| 3,922,786 A | 12/1975 | Lavin |
| 3,949,477 A | 4/1976 | Cohen et al. |
| 3,950,851 A | 4/1976 | Bergersen |
| 3,955,282 A | 5/1976 | Mcnall |
| 3,983,628 A | 10/1976 | Acevedo |
| 4,014,096 A | 3/1977 | Dellinger |
| 4,055,895 A | 11/1977 | Huge |
| 4,094,068 A | 6/1978 | Schinhammer |
| 4,117,596 A | 10/1978 | Wallshein |
| 4,129,946 A | 12/1978 | Kennedy |
| 4,134,208 A | 1/1979 | Pearlman |
| 4,139,944 A | 2/1979 | Bergersen |
| 4,179,811 A | 12/1979 | Hinz |
| 4,179,812 A | 12/1979 | White |
| 4,183,141 A | 1/1980 | Dellinger et al. |
| 4,195,046 A | 3/1980 | Kesling |
| 4,204,325 A | 5/1980 | Kaelble |
| 4,253,828 A | 3/1981 | Coles |
| 4,255,138 A | 3/1981 | Frohn |
| 4,299,568 A | 11/1981 | Crowley |
| 4,324,546 A | 4/1982 | Heitlinger et al. |
| 4,324,547 A | 4/1982 | Arcan et al. |
| 4,348,178 A | 9/1982 | Kurz |
| 4,368,040 A | 1/1983 | Weissman |
| 4,419,992 A | 12/1983 | Chorbajian |
| 4,433,956 A | 2/1984 | Witzig |
| 4,433,960 A | 2/1984 | Garito et al. |
| 4,439,154 A | 3/1984 | Mayclin |
| 4,449,928 A | 5/1984 | Von |
| 4,478,580 A | 10/1984 | Barrut |
| 4,500,294 A | 2/1985 | Lewis |
| 4,505,672 A | 3/1985 | Kurz |
| 4,505,673 A | 3/1985 | Yoshii |
| 4,519,386 A | 5/1985 | Sullivan |
| 4,523,908 A | 6/1985 | Drisaldi et al. |
| 4,526,540 A | 7/1985 | Dellinger |
| 4,553,936 A | 11/1985 | Wang |
| 4,575,330 A | 3/1986 | Hull |
| 4,575,805 A | 3/1986 | Moermann et al. |
| 4,591,341 A | 5/1986 | Andrews |
| 4,592,725 A | 6/1986 | Goshgarian |
| 4,608,021 A | 8/1986 | Barrett |
| 4,609,349 A | 9/1986 | Cain |
| 4,611,288 A | 9/1986 | Duret et al. |
| 4,629,424 A | 12/1986 | Lauks et al. |
| 4,638,145 A | 1/1987 | Sakuma et al. |
| 4,656,860 A | 4/1987 | Orthuber et al. |
| 4,663,720 A | 5/1987 | Duret et al. |
| 4,664,626 A | 5/1987 | Kesling |
| 4,665,621 A | 5/1987 | Ackerman et al. |
| 4,676,747 A | 6/1987 | Kesling |
| 4,755,139 A | 7/1988 | Abbatte et al. |
| 4,757,824 A | 7/1988 | Chaumet |
| 4,763,791 A | 8/1988 | Halverson et al. |
| 4,764,111 A | 8/1988 | Knierim |
| 4,790,752 A | 12/1988 | Cheslak |
| 4,793,803 A | 12/1988 | Martz |
| 4,798,534 A | 1/1989 | Breads |
| 4,830,612 A | 5/1989 | Bergersen |
| 4,836,778 A | 6/1989 | Baumrind et al. |
| 4,837,732 A | 6/1989 | Brandestini et al. |
| 4,850,864 A | 7/1989 | Diamond |
| 4,850,865 A | 7/1989 | Napolitano |
| 4,856,991 A | 8/1989 | Breads et al. |
| 4,877,398 A | 10/1989 | Kesling |
| 4,880,380 A | 11/1989 | Martz |
| 4,886,451 A | 12/1989 | Cetlin |
| 4,889,238 A | 12/1989 | Batchelor |
| 4,890,608 A | 1/1990 | Steer |
| 4,901,737 A | 2/1990 | Toone |
| 4,932,866 A | 6/1990 | Guis |
| 4,935,635 A | 6/1990 | O'Harra |
| 4,936,862 A | 6/1990 | Walker et al. |
| 4,937,392 A | 6/1990 | Imanari et al. |
| 4,937,928 A | 7/1990 | van der Zel |
| 4,941,826 A | 7/1990 | Loran et al. |
| 4,952,928 A | 8/1990 | Carroll et al. |
| 4,964,770 A | 10/1990 | Steinbichler et al. |
| 4,971,557 A | 11/1990 | Martin |
| 4,975,052 A | 12/1990 | Spencer et al. |
| 4,976,614 A | 12/1990 | Tepper |
| 4,983,334 A | 1/1991 | Adell |
| 4,997,369 A | 3/1991 | Shafir |
| 5,002,485 A | 3/1991 | Aagesen |
| 5,011,405 A | 4/1991 | Lemchen |
| 5,015,183 A | 5/1991 | Fenick |
| 5,017,133 A | 5/1991 | Miura |
| 5,018,969 A | 5/1991 | Andreiko et al. |
| 5,027,281 A | 6/1991 | Rekow et al. |
| 5,035,613 A | 7/1991 | Breads et al. |
| 5,037,295 A | 8/1991 | Bergersen |
| 5,055,039 A | 10/1991 | Abbatte et al. |
| 5,061,839 A | 10/1991 | Matsuno et al. |
| 5,083,919 A | 1/1992 | Quach |
| 5,094,614 A | 3/1992 | Wildman |
| 5,100,316 A | 3/1992 | Wildman |
| 5,103,838 A | 4/1992 | Yousif |
| 5,114,339 A | 5/1992 | Guis |
| 5,121,333 A | 6/1992 | Riley et al. |
| 5,123,425 A | 6/1992 | Shannon et al. |
| 5,128,870 A | 7/1992 | Erdman et al. |
| 5,130,064 A | 7/1992 | Smalley et al. |
| 5,131,843 A | 7/1992 | Hilgers et al. |
| 5,131,844 A | 7/1992 | Marinaccio et al. |
| 5,139,419 A | 8/1992 | Andreiko et al. |
| 5,145,364 A | 9/1992 | Martz et al. |
| 5,176,517 A | 1/1993 | Truax |
| 5,194,003 A | 3/1993 | Garay et al. |
| 5,204,670 A | 4/1993 | Stinton |
| 5,222,499 A | 6/1993 | Allen et al. |
| 5,224,049 A | 6/1993 | Mushabac |
| 5,238,404 A | 8/1993 | Andreiko |
| 5,242,304 A | 9/1993 | Truax et al. |
| 5,245,592 A | 9/1993 | Kuemmel et al. |
| 5,273,429 A | 12/1993 | Rekow et al. |
| 5,278,756 A | 1/1994 | Lemchen et al. |
| 5,306,144 A | 4/1994 | Hibst et al. |
| 5,312,247 A | 5/1994 | Sachdeva et al. |
| 5,324,186 A | 6/1994 | Bakanowski |
| 5,328,362 A | 7/1994 | Watson et al. |
| 5,335,657 A | 8/1994 | Terry et al. |
| 5,338,198 A | 8/1994 | Wu et al. |
| 5,340,309 A | 8/1994 | Robertson |
| 5,342,202 A | 8/1994 | Deshayes |
| 5,344,315 A | 9/1994 | Hanson |
| 5,354,201 A | 10/1994 | Wilson et al. |
| 5,368,478 A | 11/1994 | Andreiko et al. |
| 5,372,502 A | 12/1994 | Massen et al. |
| D354,355 S | 1/1995 | Hilgers |
| 5,382,164 A | 1/1995 | Stern |

(56) References Cited

U.S. PATENT DOCUMENTS

| | | |
|---|---|---|
| 5,395,238 A | 3/1995 | Andreiko et al. |
| 5,415,542 A | 5/1995 | Kesling |
| 5,431,562 A | 7/1995 | Andreiko et al. |
| 5,440,326 A | 8/1995 | Quinn |
| 5,440,496 A | 8/1995 | Andersson et al. |
| 5,447,432 A | 9/1995 | Andreiko et al. |
| 5,449,703 A | 9/1995 | Mitra et al. |
| 5,452,219 A | 9/1995 | Dehoff et al. |
| 5,454,717 A | 10/1995 | Andreiko et al. |
| 5,456,600 A | 10/1995 | Andreiko et al. |
| 5,474,448 A | 12/1995 | Andreiko et al. |
| 5,487,662 A | 1/1996 | Kipke et al. |
| RE35,169 E | 3/1996 | Lemchen et al. |
| 5,499,633 A | 3/1996 | Fenton |
| 5,522,725 A | 6/1996 | Jordan et al. |
| 5,528,735 A | 6/1996 | Strasnick et al. |
| 5,533,895 A | 7/1996 | Andreiko et al. |
| 5,540,732 A | 7/1996 | Testerman |
| 5,542,842 A | 8/1996 | Andreiko et al. |
| 5,543,780 A | 8/1996 | McAuley et al. |
| 5,549,476 A | 8/1996 | Stern |
| 5,562,448 A | 10/1996 | Mushabac |
| 5,570,182 A | 10/1996 | Nathel et al. |
| 5,575,655 A | 11/1996 | Darnell |
| 5,583,977 A | 12/1996 | Seidl |
| 5,587,912 A | 12/1996 | Andersson et al. |
| 5,588,098 A | 12/1996 | Chen et al. |
| 5,605,459 A | 2/1997 | Kuroda et al. |
| 5,607,305 A | 3/1997 | Andersson et al. |
| 5,614,075 A | 3/1997 | Andre |
| 5,621,648 A | 4/1997 | Crump |
| 5,626,537 A | 5/1997 | Danyo et al. |
| 5,636,736 A | 6/1997 | Jacobs et al. |
| 5,645,420 A | 7/1997 | Bergersen |
| 5,645,421 A * | 7/1997 | Slootsky ............... A61C 3/16 433/2 |
| 5,651,671 A | 7/1997 | Seay et al. |
| 5,655,653 A | 8/1997 | Chester |
| 5,659,420 A | 8/1997 | Wakai et al. |
| 5,683,243 A | 11/1997 | Andreiko et al. |
| 5,683,244 A | 11/1997 | Truax |
| 5,691,539 A | 11/1997 | Pfeiffer |
| 5,692,894 A | 12/1997 | Schwartz et al. |
| 5,711,665 A | 1/1998 | Adam et al. |
| 5,711,666 A | 1/1998 | Hanson |
| 5,725,376 A | 3/1998 | Poirier |
| 5,725,378 A | 3/1998 | Wang |
| 5,730,151 A | 3/1998 | Summer et al. |
| 5,737,084 A | 4/1998 | Ishihara |
| 5,740,267 A | 4/1998 | Echerer et al. |
| 5,742,700 A | 4/1998 | Yoon et al. |
| 5,769,631 A | 6/1998 | Williams |
| 5,774,425 A | 6/1998 | Ivanov et al. |
| 5,790,242 A | 8/1998 | Stern et al. |
| 5,799,100 A | 8/1998 | Clarke et al. |
| 5,800,162 A | 9/1998 | Shimodaira et al. |
| 5,800,174 A | 9/1998 | Andersson |
| 5,813,854 A | 9/1998 | Nikodem |
| 5,816,800 A | 10/1998 | Brehm et al. |
| 5,818,587 A | 10/1998 | Devaraj et al. |
| 5,823,778 A | 10/1998 | Schmitt et al. |
| 5,848,115 A | 12/1998 | Little et al. |
| 5,857,853 A | 1/1999 | van Nifterick et al. |
| 5,866,058 A | 2/1999 | Batchelder et al. |
| 5,876,199 A | 3/1999 | Bergersen |
| 5,879,158 A | 3/1999 | Doyle et al. |
| 5,880,961 A | 3/1999 | Crump |
| 5,880,962 A | 3/1999 | Andersson et al. |
| 5,882,192 A | 3/1999 | Bergersen |
| 5,886,702 A | 3/1999 | Migdal et al. |
| 5,890,896 A | 4/1999 | Padial |
| 5,904,479 A | 5/1999 | Staples |
| 5,934,288 A | 8/1999 | Avila et al. |
| 5,957,686 A | 9/1999 | Anthony |
| 5,964,587 A | 10/1999 | Sato |
| 5,971,754 A | 10/1999 | Sondhi et al. |
| 5,975,893 A | 11/1999 | Chishti et al. |
| 5,975,906 A | 11/1999 | Knutson |
| 5,980,246 A | 11/1999 | Ramsay et al. |
| 5,989,023 A | 11/1999 | Summer et al. |
| 6,002,706 A | 12/1999 | Staver et al. |
| 6,018,713 A | 1/2000 | Coli et al. |
| 6,044,309 A | 3/2000 | Honda |
| 6,049,743 A | 4/2000 | Baba |
| 6,053,731 A | 4/2000 | Heckenberger |
| 6,068,482 A | 5/2000 | Snow |
| 6,070,140 A | 5/2000 | Tran |
| 6,099,303 A | 8/2000 | Gibbs et al. |
| 6,099,314 A | 8/2000 | Kopelman et al. |
| 6,102,701 A | 8/2000 | Engeron |
| 6,120,287 A | 9/2000 | Chen |
| 6,123,544 A | 9/2000 | Cleary |
| 6,142,780 A | 11/2000 | Burgio |
| 6,152,731 A | 11/2000 | Jordan et al. |
| 6,154,676 A | 11/2000 | Levine |
| 6,183,248 B1 | 2/2001 | Chishti et al. |
| 6,183,249 B1 | 2/2001 | Brennan et al. |
| 6,186,780 B1 | 2/2001 | Hibst et al. |
| 6,190,165 B1 | 2/2001 | Andreiko et al. |
| 6,200,133 B1 | 3/2001 | Kittelsen |
| 6,201,880 B1 | 3/2001 | Elbaum et al. |
| 6,210,162 B1 | 4/2001 | Chishti et al. |
| 6,212,435 B1 | 4/2001 | Lattner et al. |
| 6,213,767 B1 | 4/2001 | Dixon et al. |
| 6,217,334 B1 | 4/2001 | Hultgren |
| 6,227,850 B1 | 5/2001 | Chishti et al. |
| 6,230,142 B1 | 5/2001 | Benigno et al. |
| 6,231,338 B1 | 5/2001 | De Josselin De Jong et al. |
| 6,238,745 B1 | 5/2001 | Morita et al. |
| 6,239,705 B1 | 5/2001 | Glen |
| 6,243,601 B1 | 6/2001 | Wist |
| 6,263,234 B1 | 7/2001 | Engelhardt et al. |
| 6,283,761 B1 | 9/2001 | Joao |
| 6,288,138 B1 | 9/2001 | Yamamoto et al. |
| 6,299,438 B1 | 10/2001 | Sahagian et al. |
| 6,299,440 B1 | 10/2001 | Phan et al. |
| 6,309,215 B1 | 10/2001 | Phan et al. |
| 6,313,432 B1 | 11/2001 | Nagata et al. |
| 6,315,553 B1 | 11/2001 | Sachdeva et al. |
| 6,328,745 B1 | 12/2001 | Ascherman |
| 6,332,774 B1 | 12/2001 | Chikami |
| 6,334,073 B1 | 12/2001 | Levine |
| 6,350,120 B1 | 2/2002 | Sachdeva et al. |
| 6,364,660 B1 | 4/2002 | Durbin et al. |
| 6,382,975 B1 | 5/2002 | Poirier |
| 6,386,878 B1 | 5/2002 | Pavlovskaia et al. |
| 6,394,802 B1 | 5/2002 | Hahn |
| 6,402,510 B1 | 6/2002 | Williams |
| 6,402,707 B1 | 6/2002 | Ernst |
| 6,405,729 B1 | 6/2002 | Thornton |
| 6,406,292 B1 | 6/2002 | Chishti et al. |
| 6,409,504 B1 | 6/2002 | Jones et al. |
| 6,413,086 B1 | 7/2002 | Womack |
| 6,414,264 B1 | 7/2002 | Von Falkenhausen |
| 6,414,708 B1 | 7/2002 | Carmeli et al. |
| 6,435,871 B1 | 8/2002 | Inman |
| 6,436,058 B1 | 8/2002 | Krahner et al. |
| 6,441,354 B1 | 8/2002 | Seghatol et al. |
| 6,450,167 B1 | 9/2002 | David et al. |
| 6,450,807 B1 | 9/2002 | Chishti et al. |
| 6,462,301 B1 | 10/2002 | Scott et al. |
| 6,470,338 B1 | 10/2002 | Rizzo et al. |
| 6,471,511 B1 | 10/2002 | Chishti et al. |
| 6,471,512 B1 | 10/2002 | Sachdeva |
| 6,471,970 B1 | 10/2002 | Fanara et al. |
| 6,482,002 B2 | 11/2002 | Jordan et al. |
| 6,482,298 B1 | 11/2002 | Bhatnagar |
| 6,496,814 B1 | 12/2002 | Busche |
| 6,496,816 B1 | 12/2002 | Thiesson et al. |
| 6,499,026 B1 | 12/2002 | Rivette et al. |
| 6,499,995 B1 | 12/2002 | Schwartz |
| 6,507,832 B1 | 1/2003 | Evans et al. |
| 6,514,074 B1 | 2/2003 | Chishti et al. |
| 6,515,593 B1 | 2/2003 | Stark et al. |

(56) References Cited

U.S. PATENT DOCUMENTS

| | | |
|---|---|---|
| 6,516,288 B2 | 2/2003 | Bagne |
| 6,516,805 B1 | 2/2003 | Thornton |
| 6,520,772 B2 | 2/2003 | Williams |
| 6,523,009 B1 | 2/2003 | Wilkins |
| 6,523,019 B1 | 2/2003 | Borthwick |
| 6,524,101 B1 | 2/2003 | Phan et al. |
| 6,526,168 B1 | 2/2003 | Ornes et al. |
| 6,526,982 B1 | 3/2003 | Strong |
| 6,529,891 B1 | 3/2003 | Heckerman |
| 6,529,902 B1 | 3/2003 | Kanevsky et al. |
| 6,532,455 B1 | 3/2003 | Martin et al. |
| 6,535,865 B1 | 3/2003 | Skaaning et al. |
| 6,540,512 B1 | 4/2003 | Sachdeva et al. |
| 6,540,707 B1 | 4/2003 | Stark et al. |
| 6,542,593 B1 | 4/2003 | Bowman Amuah |
| 6,542,881 B1 | 4/2003 | Meidan et al. |
| 6,542,894 B1 | 4/2003 | Lee et al. |
| 6,542,903 B2 | 4/2003 | Hull et al. |
| 6,551,243 B2 | 4/2003 | Bocionek et al. |
| 6,554,837 B1 | 4/2003 | Hauri et al. |
| 6,556,659 B1 | 4/2003 | Bowman Amuah |
| 6,556,977 B1 | 4/2003 | Lapointe et al. |
| 6,560,592 B1 | 5/2003 | Reid et al. |
| 6,564,209 B1 | 5/2003 | Dempski et al. |
| 6,567,814 B1 | 5/2003 | Bankier et al. |
| 6,571,227 B1 | 5/2003 | Agrafiotis et al. |
| 6,572,372 B1 | 6/2003 | Phan et al. |
| 6,573,998 B2 | 6/2003 | Cohen-Sabban |
| 6,574,561 B2 | 6/2003 | Alexander et al. |
| 6,578,003 B1 | 6/2003 | Camarda et al. |
| 6,580,948 B2 | 6/2003 | Haupert et al. |
| 6,587,529 B1 | 7/2003 | Staszewski et al. |
| 6,587,828 B1 | 7/2003 | Sachdeva |
| 6,592,368 B1 | 7/2003 | Weathers, Jr. |
| 6,594,539 B1 | 7/2003 | Geng |
| 6,595,342 B1 | 7/2003 | Maritzen et al. |
| 6,597,934 B1 | 7/2003 | De Jong et al. |
| 6,598,043 B1 | 7/2003 | Baclawski |
| 6,599,250 B2 | 7/2003 | Webb et al. |
| 6,602,070 B2 | 8/2003 | Miller et al. |
| 6,604,527 B1 | 8/2003 | Palmisano |
| 6,606,744 B1 | 8/2003 | Mikurak |
| 6,607,382 B1 | 8/2003 | Kuo et al. |
| 6,611,783 B2 | 8/2003 | Kelly et al. |
| 6,611,867 B1 | 8/2003 | Bowman Amuah |
| 6,613,001 B1 | 9/2003 | Dworkin |
| 6,615,158 B2 | 9/2003 | Wenzel et al. |
| 6,616,447 B1 | 9/2003 | Rizoiu et al. |
| 6,616,579 B1 | 9/2003 | Reinbold et al. |
| 6,621,491 B1 | 9/2003 | Baumrind et al. |
| 6,623,698 B2 | 9/2003 | Kuo |
| 6,624,752 B2 | 9/2003 | Klitsgaard et al. |
| 6,626,180 B1 | 9/2003 | Kittelsen et al. |
| 6,626,569 B2 | 9/2003 | Reinstein et al. |
| 6,626,669 B2 | 9/2003 | Zegarelli |
| 6,633,772 B2 | 10/2003 | Ford et al. |
| 6,640,128 B2 | 10/2003 | Vilsmeier et al. |
| 6,643,646 B2 | 11/2003 | Su et al. |
| 6,647,383 B1 | 11/2003 | August et al. |
| 6,650,944 B2 | 11/2003 | Goedeke et al. |
| 6,671,818 B1 | 12/2003 | Mikurak |
| 6,675,104 B2 | 1/2004 | Paulse et al. |
| 6,678,669 B2 | 1/2004 | Lapointe et al. |
| 6,685,469 B2 | 2/2004 | Chishti et al. |
| 6,689,055 B1 | 2/2004 | Mullen et al. |
| 6,690,761 B2 | 2/2004 | Lang et al. |
| 6,691,110 B2 | 2/2004 | Wang et al. |
| 6,694,234 B2 | 2/2004 | Lockwood et al. |
| 6,697,164 B1 | 2/2004 | Babayoff et al. |
| 6,697,793 B2 | 2/2004 | McGreevy |
| 6,702,765 B2 | 3/2004 | Robbins et al. |
| 6,702,804 B1 | 3/2004 | Ritter et al. |
| 6,705,863 B2 | 3/2004 | Phan et al. |
| 6,729,876 B2 | 5/2004 | Chishti et al. |
| 6,733,289 B2 | 5/2004 | Manemann et al. |
| 6,736,638 B1 | 5/2004 | Sachdeva et al. |
| 6,739,869 B1 | 5/2004 | Taub et al. |
| 6,744,932 B1 | 6/2004 | Rubbert et al. |
| 6,749,414 B1 | 6/2004 | Hanson et al. |
| 6,769,913 B2 | 8/2004 | Hurson |
| 6,772,026 B2 | 8/2004 | Bradbury et al. |
| 6,790,036 B2 | 9/2004 | Graham |
| 6,802,713 B1 | 10/2004 | Chishti et al. |
| 6,814,574 B2 | 11/2004 | Abolfathi et al. |
| 6,830,450 B2 | 12/2004 | Knopp et al. |
| 6,832,912 B2 | 12/2004 | Mao |
| 6,832,914 B1 | 12/2004 | Bonnet et al. |
| 6,843,370 B2 | 1/2005 | Tuneberg |
| 6,845,175 B2 | 1/2005 | Kopelman et al. |
| 6,885,464 B1 | 4/2005 | Pfeiffer et al. |
| 6,890,285 B2 | 5/2005 | Rahman et al. |
| 6,951,254 B2 | 10/2005 | Morrison |
| 6,976,841 B1 | 12/2005 | Osterwalder |
| 6,978,268 B2 | 12/2005 | Thomas et al. |
| 6,983,752 B2 | 1/2006 | Garabadian |
| 6,984,128 B2 | 1/2006 | Breining et al. |
| 6,988,893 B2 | 1/2006 | Haywood |
| 7,011,518 B2 * | 3/2006 | DeLuke .................. A61C 7/10 433/7 |
| 7,016,952 B2 | 3/2006 | Mullen et al. |
| 7,020,963 B2 | 4/2006 | Cleary et al. |
| 7,036,514 B2 | 5/2006 | Heck |
| 7,040,896 B2 | 5/2006 | Pavlovskaia et al. |
| 7,106,233 B2 | 9/2006 | Schroeder et al. |
| 7,112,065 B2 | 9/2006 | Kopelman et al. |
| 7,121,825 B2 | 10/2006 | Chishti et al. |
| 7,134,874 B2 | 11/2006 | Chishti et al. |
| 7,137,812 B2 | 11/2006 | Cleary et al. |
| 7,138,640 B1 | 11/2006 | Delgado et al. |
| 7,140,877 B2 | 11/2006 | Kaza |
| 7,142,312 B2 | 11/2006 | Quadling et al. |
| 7,155,373 B2 | 12/2006 | Jordan |
| 7,156,655 B2 | 1/2007 | Sachdeva et al. |
| 7,156,661 B2 | 1/2007 | Choi et al. |
| 7,168,950 B2 | 1/2007 | Cinader, Jr. et al. |
| 7,184,150 B2 | 2/2007 | Quadling et al. |
| 7,191,451 B2 | 3/2007 | Nakagawa |
| 7,192,273 B2 | 3/2007 | McSurdy |
| 7,217,131 B2 | 5/2007 | Vuillemot |
| 7,220,122 B2 | 5/2007 | Chishti |
| 7,220,124 B2 | 5/2007 | Taub et al. |
| 7,229,282 B2 | 6/2007 | Andreiko et al. |
| 7,234,937 B2 | 6/2007 | Sachdeva et al. |
| 7,241,142 B2 | 7/2007 | Abolfathi et al. |
| 7,244,230 B2 | 7/2007 | Duggirala et al. |
| 7,245,753 B2 | 7/2007 | Squilla et al. |
| 7,257,136 B2 | 8/2007 | Mori et al. |
| 7,286,954 B2 | 10/2007 | Kopelman et al. |
| 7,292,759 B2 | 11/2007 | Boutoussov et al. |
| 7,294,141 B2 | 11/2007 | Bergersen |
| 7,302,842 B2 | 12/2007 | Biester et al. |
| 7,320,592 B2 | 1/2008 | Chishti et al. |
| 7,328,706 B2 | 2/2008 | Bardach et al. |
| 7,329,122 B1 | 2/2008 | Scott |
| 7,338,327 B2 | 3/2008 | Sticker et al. |
| D565,509 S | 4/2008 | Fechner et al. |
| 7,351,116 B2 | 4/2008 | Dold |
| 7,354,270 B2 | 4/2008 | Abolfathi et al. |
| 7,357,637 B2 | 4/2008 | Liechtung |
| 7,435,083 B2 | 10/2008 | Chishti et al. |
| 7,450,231 B2 | 11/2008 | Johs et al. |
| 7,458,810 B2 | 12/2008 | Bergersen |
| 7,460,230 B2 | 12/2008 | Johs et al. |
| 7,462,076 B2 | 12/2008 | Walter et al. |
| 7,463,929 B2 | 12/2008 | Simmons |
| 7,476,100 B2 | 1/2009 | Kuo |
| 7,500,851 B2 | 3/2009 | Williams |
| D594,413 S | 6/2009 | Palka et al. |
| 7,543,511 B2 | 6/2009 | Kimura et al. |
| 7,544,103 B2 | 6/2009 | Walter et al. |
| 7,553,157 B2 | 6/2009 | Abolfathi et al. |
| 7,561,273 B2 | 7/2009 | Stautmeister et al. |
| 7,577,284 B2 | 8/2009 | Wong et al. |
| 7,596,253 B2 | 9/2009 | Wong et al. |

(56) References Cited

U.S. PATENT DOCUMENTS

| | | |
|---|---|---|
| 7,597,594 B2 | 10/2009 | Stadler et al. |
| 7,609,875 B2 | 10/2009 | Liu et al. |
| D603,796 S | 11/2009 | Sticker et al. |
| 7,616,319 B1 | 11/2009 | Woollam et al. |
| 7,626,705 B2 | 12/2009 | Altendorf |
| 7,632,216 B2 | 12/2009 | Rahman et al. |
| 7,633,625 B1 | 12/2009 | Woollam et al. |
| 7,637,262 B2 | 12/2009 | Bailey |
| 7,637,740 B2 | 12/2009 | Knopp |
| 7,641,473 B2 | 1/2010 | Sporbert et al. |
| 7,668,355 B2 | 2/2010 | Wong et al. |
| 7,670,179 B2 | 3/2010 | Muller |
| 7,695,327 B2 | 4/2010 | Bauerle et al. |
| 7,698,068 B2 | 4/2010 | Babayoff |
| 7,711,447 B2 | 5/2010 | Lu et al. |
| 7,724,378 B2 | 5/2010 | Babayoff |
| D618,619 S | 6/2010 | Walter |
| 7,728,848 B2 | 6/2010 | Petrov et al. |
| 7,731,508 B2 | 6/2010 | Borst |
| 7,735,217 B2 | 6/2010 | Borst |
| 7,740,476 B2 | 6/2010 | Rubbert et al. |
| 7,744,369 B2 | 6/2010 | Imgrund et al. |
| 7,746,339 B2 | 6/2010 | Matov et al. |
| 7,780,460 B2 | 8/2010 | Walter |
| 7,787,132 B2 | 8/2010 | Korner et al. |
| 7,791,810 B2 | 9/2010 | Powell |
| 7,796,243 B2 | 9/2010 | Choo-Smith et al. |
| 7,806,687 B2 | 10/2010 | Minagi et al. |
| 7,806,727 B2 | 10/2010 | Dold et al. |
| 7,813,787 B2 | 10/2010 | De Josselin De Jong et al. |
| 7,828,601 B2 | 11/2010 | Pyczak |
| 7,841,464 B2 | 11/2010 | Cinader, Jr. et al. |
| 7,845,969 B2 | 12/2010 | Stadler et al. |
| 7,854,609 B2 | 12/2010 | Chen et al. |
| 7,862,336 B2 | 1/2011 | Kopelman et al. |
| 7,869,983 B2 | 1/2011 | Raby et al. |
| 7,872,760 B2 | 1/2011 | Ertl |
| 7,874,836 B2 | 1/2011 | McSurdy |
| 7,874,849 B2 | 1/2011 | Sticker et al. |
| 7,878,801 B2 | 2/2011 | Abolfathi et al. |
| 7,878,805 B2 | 2/2011 | Moss et al. |
| 7,880,751 B2 | 2/2011 | Kuo et al. |
| 7,892,474 B2 | 2/2011 | Shkolnik et al. |
| 7,904,308 B2 | 3/2011 | Arnone et al. |
| 7,907,280 B2 | 3/2011 | Johs et al. |
| 7,929,151 B2 | 4/2011 | Liang et al. |
| 7,930,189 B2 | 4/2011 | Kuo |
| 7,947,508 B2 | 5/2011 | Tricca et al. |
| 7,959,308 B2 | 6/2011 | Freeman et al. |
| 7,963,766 B2 | 6/2011 | Cronauer |
| 7,985,414 B2 | 7/2011 | Knaack et al. |
| 7,986,415 B2 | 7/2011 | Thiel et al. |
| 7,987,099 B2 | 7/2011 | Kuo et al. |
| 7,991,485 B2 | 8/2011 | Zakim |
| 8,017,891 B2 | 9/2011 | Nevin |
| 8,026,916 B2 | 9/2011 | Wen |
| 8,027,709 B2 | 9/2011 | Arnone et al. |
| 8,029,277 B2 | 10/2011 | Imgrund et al. |
| 8,038,444 B2 | 10/2011 | Kitching et al. |
| 8,045,772 B2 | 10/2011 | Kosuge et al. |
| 8,054,556 B2 | 11/2011 | Chen et al. |
| 8,070,490 B1 | 12/2011 | Roetzer et al. |
| 8,075,306 B2 | 12/2011 | Kitching et al. |
| 8,077,949 B2 | 12/2011 | Liang et al. |
| 8,083,556 B2 | 12/2011 | Stadler et al. |
| D652,799 S | 1/2012 | Mueller |
| 8,092,215 B2 | 1/2012 | Stone-Collonge et al. |
| 8,099,268 B2 | 1/2012 | Kitching et al. |
| 8,108,189 B2 | 1/2012 | Chelnokov et al. |
| 8,118,592 B2 | 2/2012 | Tortorici |
| 8,126,025 B2 | 2/2012 | Takeda |
| 8,136,529 B2 | 3/2012 | Kelly |
| 8,144,954 B2 | 3/2012 | Quadling et al. |
| 8,152,518 B2 | 4/2012 | Kuo |
| 8,160,334 B2 | 4/2012 | Thiel et al. |
| 8,172,569 B2 | 5/2012 | Matty et al. |
| 8,197,252 B1 | 6/2012 | Harrison, III |
| 8,201,560 B2 | 6/2012 | Dembro |
| 8,215,312 B2 | 7/2012 | Garabadian et al. |
| 8,240,018 B2 | 8/2012 | Walter et al. |
| 8,272,866 B2 | 9/2012 | Chun et al. |
| 8,275,180 B2 | 9/2012 | Kuo |
| 8,279,450 B2 | 10/2012 | Oota et al. |
| 8,292,617 B2 | 10/2012 | Brandt et al. |
| 8,294,657 B2 | 10/2012 | Kim et al. |
| 8,296,952 B2 | 10/2012 | Greenberg |
| 8,297,286 B2 | 10/2012 | Smernoff |
| 8,303,302 B2 * | 11/2012 | Teasdale ............... A61C 7/14 433/34 |
| 8,306,608 B2 | 11/2012 | Mandelis et al. |
| 8,314,764 B2 | 11/2012 | Kim et al. |
| 8,332,015 B2 | 12/2012 | Ertl |
| 8,354,588 B2 | 1/2013 | Sticker et al. |
| 8,366,479 B2 | 2/2013 | Borst et al. |
| 8,401,826 B2 | 3/2013 | Cheng et al. |
| 8,419,428 B2 | 4/2013 | Lawrence |
| 8,433,083 B2 | 4/2013 | Abolfathi et al. |
| 8,439,672 B2 | 5/2013 | Matov et al. |
| 8,465,280 B2 | 6/2013 | Sachdeva et al. |
| 8,477,320 B2 | 7/2013 | Stock et al. |
| 8,488,113 B2 | 7/2013 | Thiel et al. |
| 8,517,726 B2 | 8/2013 | Kakavand et al. |
| 8,520,922 B2 | 8/2013 | Wang et al. |
| 8,520,925 B2 | 8/2013 | Duret |
| 8,556,625 B2 | 10/2013 | Lovely |
| 8,570,530 B2 | 10/2013 | Liang |
| 8,573,224 B2 | 11/2013 | Thornton |
| 8,577,212 B2 | 11/2013 | Thiel |
| 8,601,925 B1 | 12/2013 | Coto |
| 8,650,586 B2 | 2/2014 | Lee et al. |
| 8,675,706 B2 | 3/2014 | Seurin et al. |
| 8,723,029 B2 | 5/2014 | Pyczak et al. |
| 8,738,394 B2 | 5/2014 | Kuo |
| 8,743,923 B2 | 6/2014 | Geske et al. |
| 8,753,114 B2 | 6/2014 | Vuillemot |
| 8,767,270 B2 | 7/2014 | Curry et al. |
| 8,768,016 B2 | 7/2014 | Pan et al. |
| 8,771,149 B2 | 7/2014 | Rahman et al. |
| 8,839,476 B2 | 9/2014 | Adachi |
| 8,843,381 B2 | 9/2014 | Kuo et al. |
| 8,856,053 B2 | 10/2014 | Mah |
| 8,870,566 B2 | 10/2014 | Bergersen |
| 8,874,452 B2 | 10/2014 | Kuo |
| 8,878,905 B2 | 11/2014 | Fisker et al. |
| 8,886,702 B2 | 11/2014 | Hering et al. |
| 8,896,592 B2 | 11/2014 | Boltunov et al. |
| 8,899,976 B2 | 12/2014 | Chen et al. |
| 8,936,463 B2 | 1/2015 | Mason et al. |
| 8,948,482 B2 | 2/2015 | Levin |
| 8,956,058 B2 | 2/2015 | Rosch |
| 8,992,216 B2 | 3/2015 | Karazivan |
| 9,022,792 B2 | 5/2015 | Sticker et al. |
| 9,039,418 B1 | 5/2015 | Rubbert |
| 9,084,535 B2 | 7/2015 | Girkin et al. |
| 9,108,338 B2 | 8/2015 | Sirovskiy et al. |
| 9,144,512 B2 | 9/2015 | Wagner |
| 9,192,305 B2 | 11/2015 | Levin |
| 9,204,952 B2 | 12/2015 | Lampalzer |
| 9,211,166 B2 | 12/2015 | Kuo et al. |
| 9,220,580 B2 | 12/2015 | Borovinskih et al. |
| 9,241,774 B2 | 1/2016 | Li et al. |
| 9,242,118 B2 | 1/2016 | Brawn |
| 9,261,358 B2 | 2/2016 | Atiya et al. |
| 9,336,336 B2 | 5/2016 | Deichmann et al. |
| 9,351,810 B2 | 5/2016 | Moon |
| 9,375,300 B2 | 6/2016 | Matov et al. |
| 9,381,810 B2 | 7/2016 | Nelson et al. |
| 9,403,238 B2 | 8/2016 | Culp |
| 9,408,743 B1 | 8/2016 | Wagner |
| 9,414,897 B2 | 8/2016 | Wu et al. |
| 9,433,476 B2 | 9/2016 | Khardekar et al. |
| 9,439,568 B2 | 9/2016 | Atiya et al. |
| 9,444,981 B2 | 9/2016 | Bellis et al. |
| 9,463,287 B1 | 10/2016 | Lorberbaum et al. |

(56) References Cited

U.S. PATENT DOCUMENTS

| | | |
|---|---|---|
| 9,492,243 B2 | 11/2016 | Kuo |
| 9,500,635 B2 | 11/2016 | Islam |
| 9,506,808 B2 | 11/2016 | Jeon et al. |
| 9,510,918 B2 | 12/2016 | Sanchez |
| 9,545,331 B2 | 1/2017 | Ingemarsson-Matzen |
| 9,584,771 B2 | 2/2017 | Mandelis et al. |
| 9,610,141 B2 | 4/2017 | Kopelman et al. |
| 9,675,427 B2 | 6/2017 | Kopelman |
| 9,675,430 B2 | 6/2017 | Verker et al. |
| 9,693,839 B2 | 7/2017 | Atiya et al. |
| 9,730,769 B2 | 8/2017 | Chen et al. |
| 9,744,006 B2 | 8/2017 | Ross |
| 9,795,461 B2 | 10/2017 | Kopelman et al. |
| 9,848,985 B2 | 12/2017 | Yang et al. |
| 9,861,451 B1 | 1/2018 | Davis |
| 9,936,186 B2 | 4/2018 | Jesenko et al. |
| 10,123,706 B2 | 11/2018 | Elbaz et al. |
| 10,130,445 B2 | 11/2018 | Kopelman et al. |
| 10,154,889 B2 | 12/2018 | Chen et al. |
| 10,159,541 B2 | 12/2018 | Bindayel |
| 10,231,801 B2 | 3/2019 | Korytov et al. |
| 10,248,883 B2 | 4/2019 | Borovinskih et al. |
| 10,258,432 B2 | 4/2019 | Webber |
| 10,390,913 B2 | 8/2019 | Sabina et al. |
| 10,449,016 B2 | 10/2019 | Kimura et al. |
| 10,470,847 B2 | 11/2019 | Shanjani et al. |
| 10,504,386 B2 | 12/2019 | Levin et al. |
| 10,517,482 B2 | 12/2019 | Sato et al. |
| 10,585,958 B2 | 3/2020 | Elbaz et al. |
| 10,595,966 B2 | 3/2020 | Carrier, Jr. et al. |
| 10,606,911 B2 | 3/2020 | Elbaz et al. |
| 10,613,515 B2 | 4/2020 | Cramer et al. |
| 10,639,134 B2 | 5/2020 | Shanjani et al. |
| 10,813,727 B2 | 10/2020 | Sabina et al. |
| 10,980,613 B2 | 4/2021 | Shanjani et al. |
| 10,993,783 B2 | 5/2021 | Wu et al. |
| 2001/0002310 A1 | 5/2001 | Chishti et al. |
| 2001/0032100 A1 | 10/2001 | Mahmud et al. |
| 2001/0038705 A1 | 11/2001 | Rubbert et al. |
| 2001/0041320 A1 | 11/2001 | Phan et al. |
| 2001/0054231 A1 | 12/2001 | Miller et al. |
| 2002/0004727 A1 | 1/2002 | Knaus et al. |
| 2002/0007284 A1 | 1/2002 | Schurenberg et al. |
| 2002/0010568 A1 | 1/2002 | Rubbert et al. |
| 2002/0015934 A1 | 2/2002 | Rubbert et al. |
| 2002/0025503 A1 | 2/2002 | Chapoulaud et al. |
| 2002/0026105 A1 | 2/2002 | Drazen |
| 2002/0028417 A1 | 3/2002 | Chapoulaud et al. |
| 2002/0035572 A1 | 3/2002 | Takatori et al. |
| 2002/0064752 A1 | 5/2002 | Durbin et al. |
| 2002/0064759 A1 | 5/2002 | Durbin et al. |
| 2002/0087551 A1 | 7/2002 | Hickey et al. |
| 2002/0107853 A1 | 8/2002 | Hofmann et al. |
| 2002/0188478 A1 | 12/2002 | Breeland et al. |
| 2002/0192617 A1 | 12/2002 | Phan et al. |
| 2003/0000927 A1 | 1/2003 | Kanaya et al. |
| 2003/0009252 A1 | 1/2003 | Pavlovskaia et al. |
| 2003/0019848 A1 | 1/2003 | Nicholas et al. |
| 2003/0021453 A1 | 1/2003 | Weise et al. |
| 2003/0035061 A1 | 2/2003 | Iwaki et al. |
| 2003/0049581 A1 | 3/2003 | Deluke |
| 2003/0057192 A1 | 3/2003 | Patel |
| 2003/0059736 A1 | 3/2003 | Lai et al. |
| 2003/0060532 A1 | 3/2003 | Subelka et al. |
| 2003/0068598 A1 | 4/2003 | Vallittu et al. |
| 2003/0095697 A1 | 5/2003 | Wood et al. |
| 2003/0101079 A1 | 5/2003 | McLaughlin |
| 2003/0103060 A1 | 6/2003 | Anderson et al. |
| 2003/0120517 A1 | 6/2003 | Eida et al. |
| 2003/0139834 A1 | 7/2003 | Nikolskiy et al. |
| 2003/0144886 A1 | 7/2003 | Taira |
| 2003/0172043 A1 | 9/2003 | Guyon et al. |
| 2003/0190575 A1 | 10/2003 | Hilliard |
| 2003/0192867 A1 | 10/2003 | Yamazaki et al. |
| 2003/0207224 A1 | 11/2003 | Lotte |
| 2003/0215764 A1 | 11/2003 | Kopelman et al. |
| 2003/0224311 A1 | 12/2003 | Cronauer |
| 2003/0224313 A1 | 12/2003 | Bergersen |
| 2003/0224314 A1 | 12/2003 | Bergersen |
| 2004/0002873 A1 | 1/2004 | Sachdeva |
| 2004/0009449 A1 | 1/2004 | Mah et al. |
| 2004/0013994 A1 | 1/2004 | Goldberg et al. |
| 2004/0013996 A1 | 1/2004 | Sapian |
| 2004/0019262 A1 | 1/2004 | Perelgut |
| 2004/0029078 A1 | 2/2004 | Marshall |
| 2004/0038168 A1 | 2/2004 | Choi et al. |
| 2004/0054304 A1 | 3/2004 | Raby |
| 2004/0054358 A1 | 3/2004 | Cox et al. |
| 2004/0058295 A1 | 3/2004 | Bergersen |
| 2004/0068199 A1 | 4/2004 | Echauz et al. |
| 2004/0078222 A1 | 4/2004 | Khan et al. |
| 2004/0080621 A1 | 4/2004 | Fisher et al. |
| 2004/0094165 A1 | 5/2004 | Cook |
| 2004/0107118 A1 | 6/2004 | Harnsberger et al. |
| 2004/0133083 A1 | 7/2004 | Comaniciu et al. |
| 2004/0152036 A1 | 8/2004 | Abolfathi |
| 2004/0158194 A1 | 8/2004 | Wolff et al. |
| 2004/0166463 A1 | 8/2004 | Wen et al. |
| 2004/0167646 A1 | 8/2004 | Jelonek et al. |
| 2004/0193036 A1 | 9/2004 | Zhou et al. |
| 2004/0197728 A1 | 10/2004 | Abolfathi et al. |
| 2004/0214128 A1 | 10/2004 | Sachdeva et al. |
| 2004/0219479 A1 | 11/2004 | Malin et al. |
| 2004/0220691 A1 | 11/2004 | Hofmeister et al. |
| 2004/0229185 A1 | 11/2004 | Knopp |
| 2004/0259049 A1 | 12/2004 | Kopelman et al. |
| 2005/0003318 A1 | 1/2005 | Choi et al. |
| 2005/0023356 A1 | 2/2005 | Wiklof et al. |
| 2005/0031196 A1 | 2/2005 | Moghaddam et al. |
| 2005/0037312 A1 | 2/2005 | Uchida |
| 2005/0038669 A1 | 2/2005 | Sachdeva et al. |
| 2005/0040551 A1 | 2/2005 | Biegler et al. |
| 2005/0042569 A1 | 2/2005 | Phan et al. |
| 2005/0042577 A1 | 2/2005 | Kvitrud et al. |
| 2005/0048433 A1 | 3/2005 | Hilliard |
| 2005/0074717 A1 | 4/2005 | Cleary et al. |
| 2005/0089822 A1 | 4/2005 | Geng |
| 2005/0100333 A1 | 5/2005 | Kerschbaumer et al. |
| 2005/0108052 A1 | 5/2005 | Omaboe |
| 2005/0131738 A1 | 6/2005 | Morris |
| 2005/0144150 A1 | 6/2005 | Ramamurthy et al. |
| 2005/0171594 A1 | 8/2005 | Machan et al. |
| 2005/0171630 A1 | 8/2005 | Dinauer et al. |
| 2005/0181333 A1 | 8/2005 | Karazivan et al. |
| 2005/0186524 A1 | 8/2005 | Abolfathi et al. |
| 2005/0186526 A1 | 8/2005 | Stewart et al. |
| 2005/0216314 A1 | 9/2005 | Secor |
| 2005/0233276 A1 | 10/2005 | Kopelman et al. |
| 2005/0239013 A1 | 10/2005 | Sachdeva |
| 2005/0244781 A1 | 11/2005 | Abels et al. |
| 2005/0244791 A1 | 11/2005 | Davis et al. |
| 2005/0271996 A1 | 12/2005 | Sporbert et al. |
| 2006/0056670 A1 | 3/2006 | Hamadeh |
| 2006/0057533 A1 | 3/2006 | McGann |
| 2006/0063135 A1 | 3/2006 | Mehl |
| 2006/0078842 A1 | 4/2006 | Sachdeva et al. |
| 2006/0084024 A1 | 4/2006 | Farrell |
| 2006/0093982 A1 | 5/2006 | Wen |
| 2006/0098007 A1 | 5/2006 | Rouet et al. |
| 2006/0099545 A1 | 5/2006 | Lai et al. |
| 2006/0099546 A1 | 5/2006 | Bergersen |
| 2006/0110698 A1 | 5/2006 | Robson |
| 2006/0111631 A1 | 5/2006 | Kelliher et al. |
| 2006/0115785 A1 | 6/2006 | Li et al. |
| 2006/0137813 A1 | 6/2006 | Robrecht et al. |
| 2006/0147872 A1 | 7/2006 | Andreiko |
| 2006/0154198 A1 | 7/2006 | Durbin et al. |
| 2006/0154207 A1 | 7/2006 | Kuo |
| 2006/0173715 A1 | 8/2006 | Wang |
| 2006/0183082 A1 | 8/2006 | Quadling et al. |
| 2006/0188834 A1 | 8/2006 | Hilliard |
| 2006/0188848 A1 | 8/2006 | Tricca et al. |
| 2006/0194163 A1 | 8/2006 | Tricca et al. |
| 2006/0199153 A1 | 9/2006 | Liu et al. |

(56) References Cited

U.S. PATENT DOCUMENTS

| | | |
|---|---|---|
| 2006/0204078 A1 | 9/2006 | Orth et al. |
| 2006/0223022 A1 | 10/2006 | Solomon |
| 2006/0223023 A1 | 10/2006 | Lai et al. |
| 2006/0223032 A1 | 10/2006 | Fried et al. |
| 2006/0223342 A1 | 10/2006 | Borst et al. |
| 2006/0234179 A1 | 10/2006 | Wen et al. |
| 2006/0257815 A1 | 11/2006 | De Dominicis |
| 2006/0275729 A1 | 12/2006 | Fornoff |
| 2006/0275731 A1 | 12/2006 | Wen et al. |
| 2006/0275736 A1 | 12/2006 | Wen et al. |
| 2006/0277075 A1 | 12/2006 | Salwan |
| 2006/0290693 A1 | 12/2006 | Zhou et al. |
| 2006/0292520 A1 | 12/2006 | Dillon et al. |
| 2007/0031775 A1 | 2/2007 | Andreiko |
| 2007/0037111 A1 | 2/2007 | Mailyn |
| 2007/0037112 A1 | 2/2007 | Mailyn |
| 2007/0046865 A1 | 3/2007 | Umeda et al. |
| 2007/0053048 A1 | 3/2007 | Kumar et al. |
| 2007/0054237 A1 | 3/2007 | Neuschafer |
| 2007/0065768 A1 | 3/2007 | Nadav |
| 2007/0087300 A1 | 4/2007 | Willison et al. |
| 2007/0087302 A1 | 4/2007 | Reising et al. |
| 2007/0106138 A1 | 5/2007 | Beiski et al. |
| 2007/0122592 A1 | 5/2007 | Anderson et al. |
| 2007/0141525 A1 | 6/2007 | Cinader, Jr. |
| 2007/0141526 A1 | 6/2007 | Eisenberg et al. |
| 2007/0143135 A1 | 6/2007 | Lindquist et al. |
| 2007/0168152 A1 | 7/2007 | Matov et al. |
| 2007/0172112 A1 | 7/2007 | Paley et al. |
| 2007/0172291 A1 | 7/2007 | Yokoyama |
| 2007/0178420 A1 | 8/2007 | Keski-Nisula et al. |
| 2007/0183633 A1 | 8/2007 | Hoffmann |
| 2007/0184402 A1 | 8/2007 | Boutoussov et al. |
| 2007/0185732 A1 | 8/2007 | Hicks et al. |
| 2007/0192137 A1 | 8/2007 | Ombrellaro |
| 2007/0199929 A1 | 8/2007 | Rippl et al. |
| 2007/0215582 A1 | 9/2007 | Roeper et al. |
| 2007/0218422 A1 | 9/2007 | Ehrenfeld |
| 2007/0231765 A1 | 10/2007 | Phan et al. |
| 2007/0238065 A1 | 10/2007 | Sherwood et al. |
| 2007/0239488 A1 | 10/2007 | Derosso |
| 2007/0263226 A1 | 11/2007 | Kurtz et al. |
| 2008/0013727 A1 | 1/2008 | Uemura |
| 2008/0020350 A1 | 1/2008 | Matov et al. |
| 2008/0045053 A1 | 2/2008 | Stadler et al. |
| 2008/0057461 A1 | 3/2008 | Cheng et al. |
| 2008/0057467 A1 | 3/2008 | Gittelson |
| 2008/0057479 A1 | 3/2008 | Grenness |
| 2008/0059238 A1 | 3/2008 | Park et al. |
| 2008/0062429 A1 | 3/2008 | Liang et al. |
| 2008/0090208 A1 | 4/2008 | Rubbert |
| 2008/0094389 A1 | 4/2008 | Rouet et al. |
| 2008/0113317 A1 | 5/2008 | Kemp et al. |
| 2008/0115791 A1 | 5/2008 | Heine |
| 2008/0118882 A1 | 5/2008 | Su |
| 2008/0118886 A1 | 5/2008 | Liang et al. |
| 2008/0141534 A1 | 6/2008 | Hilliard |
| 2008/0169122 A1 | 7/2008 | Shiraishi et al. |
| 2008/0171934 A1 | 7/2008 | Greenan et al. |
| 2008/0176448 A1 | 7/2008 | Muller et al. |
| 2008/0182220 A1 | 7/2008 | Chishti et al. |
| 2008/0233530 A1 | 9/2008 | Cinader |
| 2008/0242144 A1 | 10/2008 | Dietz |
| 2008/0254402 A1 | 10/2008 | Hilliard |
| 2008/0254403 A1 | 10/2008 | Hilliard |
| 2008/0268400 A1 | 10/2008 | Moss et al. |
| 2008/0306724 A1 | 12/2008 | Kitching et al. |
| 2009/0029310 A1 | 1/2009 | Pumphrey et al. |
| 2009/0030290 A1 | 1/2009 | Kozuch et al. |
| 2009/0030347 A1 | 1/2009 | Cao |
| 2009/0040740 A1 | 2/2009 | Muller et al. |
| 2009/0061379 A1 | 3/2009 | Yamamoto et al. |
| 2009/0061381 A1 | 3/2009 | Durbin et al. |
| 2009/0075228 A1 | 3/2009 | Kumada et al. |
| 2009/0087050 A1 | 4/2009 | Gandyra |
| 2009/0098502 A1 | 4/2009 | Andreiko |
| 2009/0099445 A1 | 4/2009 | Burger |
| 2009/0103579 A1 | 4/2009 | Ushimaru et al. |
| 2009/0105523 A1 | 4/2009 | Kass et al. |
| 2009/0130620 A1 | 5/2009 | Yazdi et al. |
| 2009/0136890 A1 | 5/2009 | Kang et al. |
| 2009/0136893 A1 | 5/2009 | Zegarelli |
| 2009/0148809 A1 | 6/2009 | Kuo et al. |
| 2009/0170050 A1 | 7/2009 | Marcus |
| 2009/0181346 A1 | 7/2009 | Orth |
| 2009/0191502 A1 | 7/2009 | Cao et al. |
| 2009/0208897 A1 | 8/2009 | Kuo |
| 2009/0210032 A1 | 8/2009 | Beiski et al. |
| 2009/0218514 A1 | 9/2009 | Klunder et al. |
| 2009/0280450 A1 | 11/2009 | Kuo |
| 2009/0281433 A1 | 11/2009 | Saadat et al. |
| 2009/0286195 A1 | 11/2009 | Sears et al. |
| 2009/0298017 A1 | 12/2009 | Boerjes et al. |
| 2009/0305540 A1 | 12/2009 | Stadler et al. |
| 2009/0316966 A1 | 12/2009 | Marshall et al. |
| 2009/0317757 A1 | 12/2009 | Lemchen |
| 2010/0015565 A1 | 1/2010 | Carrillo et al. |
| 2010/0019170 A1 | 1/2010 | Hart et al. |
| 2010/0028825 A1 | 2/2010 | Lemchen |
| 2010/0045902 A1 | 2/2010 | Ikeda et al. |
| 2010/0047732 A1 | 2/2010 | Park |
| 2010/0062394 A1 | 3/2010 | Jones et al. |
| 2010/0068676 A1 | 3/2010 | Mason et al. |
| 2010/0075268 A1 | 3/2010 | Duran Von Arx |
| 2010/0138025 A1 | 6/2010 | Morton et al. |
| 2010/0142789 A1 | 6/2010 | Chang et al. |
| 2010/0145664 A1 | 6/2010 | Hultgren et al. |
| 2010/0145898 A1 | 6/2010 | Malfliet et al. |
| 2010/0152599 A1 | 6/2010 | Duhamel et al. |
| 2010/0165275 A1 | 7/2010 | Tsukamoto et al. |
| 2010/0167225 A1 | 7/2010 | Kuo |
| 2010/0179789 A1 | 7/2010 | Sachdeva et al. |
| 2010/0193482 A1 | 8/2010 | Ow et al. |
| 2010/0196837 A1 | 8/2010 | Farrell |
| 2010/0216085 A1 | 8/2010 | Kopelman |
| 2010/0217130 A1 | 8/2010 | Weinlaender |
| 2010/0231577 A1 | 9/2010 | Kim et al. |
| 2010/0268363 A1 | 10/2010 | Karim et al. |
| 2010/0268515 A1 | 10/2010 | Vogt et al. |
| 2010/0279243 A1 | 11/2010 | Cinader, Jr. et al. |
| 2010/0279245 A1 | 11/2010 | Navarro |
| 2010/0280798 A1 | 11/2010 | Pattijn et al. |
| 2010/0281370 A1 | 11/2010 | Rohaly et al. |
| 2010/0303316 A1 | 12/2010 | Bullis et al. |
| 2010/0312484 A1 | 12/2010 | Duhamel et al. |
| 2010/0327461 A1 | 12/2010 | Co et al. |
| 2011/0007920 A1 | 1/2011 | Abolfathi et al. |
| 2011/0012901 A1 | 1/2011 | Kaplanyan |
| 2011/0020761 A1 | 1/2011 | Kalili |
| 2011/0027743 A1 | 2/2011 | Cinader, Jr. et al. |
| 2011/0045428 A1 | 2/2011 | Boltunov et al. |
| 2011/0056350 A1 | 3/2011 | Gale et al. |
| 2011/0065060 A1 | 3/2011 | Teixeira et al. |
| 2011/0081625 A1 | 4/2011 | Fuh |
| 2011/0091832 A1 | 4/2011 | Kim et al. |
| 2011/0102549 A1 | 5/2011 | Takahashi |
| 2011/0102566 A1 | 5/2011 | Zakian et al. |
| 2011/0104630 A1 | 5/2011 | Matov et al. |
| 2011/0136072 A1 | 6/2011 | Li et al. |
| 2011/0136090 A1 | 6/2011 | Kazemi |
| 2011/0143300 A1 | 6/2011 | Villaalba |
| 2011/0143673 A1 | 6/2011 | Landesman et al. |
| 2011/0159452 A1 | 6/2011 | Huang |
| 2011/0164810 A1 | 7/2011 | Zang et al. |
| 2011/0207072 A1 | 8/2011 | Schiemann |
| 2011/0212420 A1 | 9/2011 | Vuillemot |
| 2011/0220623 A1 | 9/2011 | Beutler |
| 2011/0235045 A1 | 9/2011 | Koerner et al. |
| 2011/0240064 A1 | 10/2011 | Wales et al. |
| 2011/0262881 A1 | 10/2011 | Mauclaire |
| 2011/0269092 A1 | 11/2011 | Kuo et al. |
| 2011/0316994 A1 | 12/2011 | Lemchen |
| 2012/0028210 A1 | 2/2012 | Hegyi et al. |
| 2012/0029883 A1 | 2/2012 | Heinz et al. |

(56) References Cited

U.S. PATENT DOCUMENTS

| | | |
|---|---|---|
| 2012/0040311 A1 | 2/2012 | Nilsson |
| 2012/0064477 A1 | 3/2012 | Schmitt |
| 2012/0081786 A1 | 4/2012 | Mizu et al. |
| 2012/0086681 A1 | 4/2012 | Kim et al. |
| 2012/0115107 A1 | 5/2012 | Adams |
| 2012/0129117 A1 | 5/2012 | McCance |
| 2012/0147912 A1 | 6/2012 | Moench et al. |
| 2012/0150494 A1 | 6/2012 | Anderson et al. |
| 2012/0172678 A1 | 7/2012 | Logan et al. |
| 2012/0281293 A1 | 11/2012 | Gronenborn et al. |
| 2012/0295216 A1 | 11/2012 | Dykes et al. |
| 2012/0322025 A1 | 12/2012 | Ozawa et al. |
| 2013/0029284 A1 | 1/2013 | Teasdale |
| 2013/0081272 A1 | 4/2013 | Johnson et al. |
| 2013/0089828 A1 | 4/2013 | Borovinskih et al. |
| 2013/0095446 A1 | 4/2013 | Andreiko et al. |
| 2013/0103176 A1 | 4/2013 | Kopelman et al. |
| 2013/0110469 A1 | 5/2013 | Kopelman |
| 2013/0150689 A1 | 6/2013 | Shaw-Klein |
| 2013/0163627 A1 | 6/2013 | Seurin et al. |
| 2013/0201488 A1 | 8/2013 | Ishihara |
| 2013/0204599 A1 | 8/2013 | Matov et al. |
| 2013/0209952 A1 | 8/2013 | Kuo et al. |
| 2013/0235165 A1 | 9/2013 | Gharib et al. |
| 2013/0252195 A1 | 9/2013 | Popat |
| 2013/0266326 A1 | 10/2013 | Joseph et al. |
| 2013/0278396 A1 | 10/2013 | Kimmel |
| 2013/0280671 A1 | 10/2013 | Brawn et al. |
| 2013/0286114 A1 | 10/2013 | Ito et al. |
| 2013/0286174 A1 | 10/2013 | Urakabe |
| 2013/0293824 A1 | 11/2013 | Yoneyama et al. |
| 2013/0323664 A1 | 12/2013 | Parker |
| 2013/0323671 A1 | 12/2013 | Dillon et al. |
| 2013/0323674 A1 | 12/2013 | Hakomori et al. |
| 2013/0325431 A1 | 12/2013 | See et al. |
| 2013/0337412 A1 | 12/2013 | Kwon |
| 2014/0061974 A1 | 3/2014 | Tyler |
| 2014/0081091 A1 | 3/2014 | Abolfathi et al. |
| 2014/0093160 A1 | 4/2014 | Porikli et al. |
| 2014/0100495 A1 | 4/2014 | Haseley |
| 2014/0106289 A1 | 4/2014 | Kozlowski |
| 2014/0122027 A1 | 5/2014 | Andreiko et al. |
| 2014/0142902 A1 | 5/2014 | Chelnokov et al. |
| 2014/0170591 A1 | 6/2014 | El-Siblani |
| 2014/0178829 A1 | 6/2014 | Kim |
| 2014/0186794 A1 | 7/2014 | Deichmann et al. |
| 2014/0220520 A1 | 8/2014 | Salamini |
| 2014/0265034 A1 | 9/2014 | Dudley |
| 2014/0272774 A1 | 9/2014 | Dillon et al. |
| 2014/0294273 A1 | 10/2014 | Jaisson |
| 2014/0313299 A1 | 10/2014 | Gebhardt et al. |
| 2014/0329194 A1 | 11/2014 | Sachdeva et al. |
| 2014/0342299 A1 | 11/2014 | Jung |
| 2014/0342301 A1 | 11/2014 | Fleer et al. |
| 2014/0350354 A1 | 11/2014 | Stenzler et al. |
| 2014/0363778 A1 | 12/2014 | Parker |
| 2015/0002649 A1 | 1/2015 | Nowak et al. |
| 2015/0004553 A1 | 1/2015 | Li et al. |
| 2015/0021210 A1 | 1/2015 | Kesling |
| 2015/0031940 A1 | 1/2015 | Floyd |
| 2015/0079530 A1 | 3/2015 | Bergersen |
| 2015/0079531 A1 | 3/2015 | Heine |
| 2015/0094564 A1 | 4/2015 | Tashman et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0140502 A1 | 5/2015 | Brawn et al. |
| 2015/0150501 A1 | 6/2015 | George et al. |
| 2015/0164335 A1 | 6/2015 | Van Der Poel et al. |
| 2015/0173856 A1 | 6/2015 | Iowe et al. |
| 2015/0182303 A1 | 7/2015 | Abraham et al. |
| 2015/0216626 A1 | 8/2015 | Ranjbar |
| 2015/0216716 A1 | 8/2015 | Anitua |
| 2015/0230885 A1 | 8/2015 | Wucher |
| 2015/0238280 A1 | 8/2015 | Wu et al. |
| 2015/0238283 A1 | 8/2015 | Tanugula et al. |
| 2015/0257856 A1 | 9/2015 | Martz et al. |
| 2015/0306486 A1 | 10/2015 | Logan et al. |
| 2015/0320320 A1 | 11/2015 | Kopelman et al. |
| 2015/0325044 A1 | 11/2015 | Lebovitz |
| 2015/0338209 A1 | 11/2015 | Knüttel |
| 2015/0351638 A1 | 12/2015 | Amato |
| 2015/0366637 A1 | 12/2015 | Kopelman |
| 2015/0374469 A1 | 12/2015 | Konno et al. |
| 2016/0000332 A1 | 1/2016 | Atiya et al. |
| 2016/0003610 A1 | 1/2016 | Lampert et al. |
| 2016/0022185 A1 | 1/2016 | Agarwal et al. |
| 2016/0042509 A1 | 2/2016 | Andreiko et al. |
| 2016/0051345 A1 | 2/2016 | Levin |
| 2016/0064898 A1 | 3/2016 | Atiya et al. |
| 2016/0135924 A1 | 5/2016 | Choi et al. |
| 2016/0135925 A1 | 5/2016 | Mason et al. |
| 2016/0157962 A1 | 6/2016 | Kim et al. |
| 2016/0163115 A1 | 6/2016 | Furst |
| 2016/0193014 A1 | 7/2016 | Morton et al. |
| 2016/0217708 A1 | 7/2016 | Levin et al. |
| 2016/0220105 A1 | 8/2016 | Duret |
| 2016/0220200 A1 | 8/2016 | Sandholm et al. |
| 2016/0225151 A1 | 8/2016 | Cocco et al. |
| 2016/0228213 A1 | 8/2016 | Tod et al. |
| 2016/0242811 A1 | 8/2016 | Sadiq et al. |
| 2016/0242871 A1 | 8/2016 | Morton et al. |
| 2016/0246936 A1 | 8/2016 | Kahn |
| 2016/0287358 A1 | 10/2016 | Nowak et al. |
| 2016/0296303 A1 | 10/2016 | Parker |
| 2016/0328843 A1 | 11/2016 | Graham et al. |
| 2016/0346063 A1 | 12/2016 | Schulhof et al. |
| 2016/0367188 A1 | 12/2016 | Malik et al. |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0049326 A1 | 2/2017 | Alfano et al. |
| 2017/0056131 A1 | 3/2017 | Alauddin et al. |
| 2017/0079747 A1 | 3/2017 | Graf et al. |
| 2017/0086943 A1 | 3/2017 | Mah |
| 2017/0100209 A1 | 4/2017 | Wen |
| 2017/0100212 A1 | 4/2017 | Sherwood et al. |
| 2017/0100213 A1 | 4/2017 | Kuo |
| 2017/0100214 A1 | 4/2017 | Wen |
| 2017/0105815 A1 | 4/2017 | Matov et al. |
| 2017/0105816 A1 | 4/2017 | Ward |
| 2017/0105817 A1 | 4/2017 | Chun et al. |
| 2017/0135792 A1 | 5/2017 | Webber |
| 2017/0135793 A1 | 5/2017 | Webber et al. |
| 2017/0165032 A1 | 6/2017 | Webber et al. |
| 2017/0215739 A1 | 8/2017 | Miyasato |
| 2017/0231722 A1 | 8/2017 | Boronkay et al. |
| 2017/0251954 A1 | 9/2017 | Lotan et al. |
| 2017/0265967 A1 | 9/2017 | Hong |
| 2017/0319054 A1 | 11/2017 | Miller et al. |
| 2017/0319296 A1 | 11/2017 | Webber et al. |
| 2017/0325690 A1 | 11/2017 | Salah et al. |
| 2017/0340411 A1 | 11/2017 | Akselrod |
| 2018/0000563 A1 | 1/2018 | Shanjani et al. |
| 2018/0000565 A1 | 1/2018 | Shanjani et al. |
| 2018/0028064 A1 | 2/2018 | Elbaz et al. |
| 2018/0071054 A1 | 3/2018 | Ha |
| 2018/0085059 A1 | 3/2018 | Lee |
| 2018/0125610 A1 | 5/2018 | Carrier, Jr. et al. |
| 2018/0153648 A1* | 6/2018 | Shanjani ............... A61C 7/08 |
| 2018/0153649 A1 | 6/2018 | Wu et al. |
| 2018/0153733 A1 | 6/2018 | Kuo |
| 2018/0168776 A1 | 6/2018 | Webber |
| 2018/0168788 A1 | 6/2018 | Fernie |
| 2018/0192877 A1 | 7/2018 | Atiya et al. |
| 2018/0200031 A1* | 7/2018 | Webber ............... A61C 7/08 |
| 2018/0228359 A1 | 8/2018 | Meyer et al. |
| 2018/0280118 A1 | 10/2018 | Cramer |
| 2018/0280125 A1 | 10/2018 | Longley et al. |
| 2018/0284727 A1 | 10/2018 | Cramer et al. |
| 2018/0318042 A1 | 11/2018 | Baek et al. |
| 2018/0325626 A1 | 11/2018 | Huang |
| 2018/0353264 A1 | 12/2018 | Riley et al. |

(56) References Cited

U.S. PATENT DOCUMENTS

| | | |
|---|---|---|
| 2018/0360567 A1 | 12/2018 | Xue et al. |
| 2018/0368944 A1 | 12/2018 | Sato |
| 2019/0019187 A1 | 1/2019 | Miller et al. |
| 2019/0021817 A1 | 1/2019 | Sato et al. |
| 2019/0026599 A1 | 1/2019 | Salah et al. |
| 2019/0029784 A1 | 1/2019 | Moalem et al. |
| 2019/0046296 A1 | 2/2019 | Kopelman et al. |
| 2019/0046297 A1 | 2/2019 | Kopelman et al. |
| 2019/0069975 A1 | 3/2019 | Cam et al. |
| 2019/0076214 A1 | 3/2019 | Nyukhtikov et al. |
| 2019/0076216 A1 | 3/2019 | Moss et al. |
| 2019/0090983 A1 | 3/2019 | Webber et al. |
| 2019/0099129 A1 | 4/2019 | Kopelman et al. |
| 2019/0105130 A1 | 4/2019 | Grove et al. |
| 2019/0125494 A1 | 5/2019 | Li et al. |
| 2019/0152152 A1 | 5/2019 | O'Leary et al. |
| 2019/0171618 A1 | 6/2019 | Kuo |
| 2019/0175303 A1 | 6/2019 | Akopov et al. |
| 2019/0175304 A1 | 6/2019 | Morton et al. |
| 2019/0192259 A1 | 6/2019 | Kopelman et al. |
| 2019/0231477 A1 | 8/2019 | Shanjani et al. |
| 2019/0231492 A1 | 8/2019 | Sabina et al. |
| 2019/0338067 A1 | 11/2019 | Liska et al. |
| 2019/0343606 A1 | 11/2019 | Wu et al. |
| 2020/0046463 A1 | 2/2020 | Kimura et al. |
| 2020/0405451 A1* | 12/2020 | Lemchen ............... A61C 7/002 |
| 2021/0068926 A1 | 3/2021 | Wu et al. |
| 2021/0259812 A1 | 8/2021 | O'Leary et al. |

FOREIGN PATENT DOCUMENTS

| | | |
|---|---|---|
| CA | 1121955 A1 | 4/1982 |
| CN | 201101586 Y | 8/2008 |
| CN | 101426449 A | 5/2009 |
| CN | 101442953 A | 5/2009 |
| CN | 101677842 A | 3/2010 |
| CN | 201609421 U | 10/2010 |
| CN | 203369975 U | 1/2014 |
| CN | 103889364 A | 6/2014 |
| CN | 104000662 A | 8/2014 |
| CN | 204092220 U | 1/2015 |
| CN | 104379087 A | 2/2015 |
| CN | 204863317 U | 12/2015 |
| CN | 105266907 A | 1/2016 |
| CN | 105496575 A | 4/2016 |
| CN | 105997274 A | 10/2016 |
| CN | 106667594 A | 5/2017 |
| DE | 2749802 A1 | 5/1978 |
| DE | 3526198 A1 | 2/1986 |
| DE | 4207169 A1 | 9/1993 |
| DE | 69327661 T2 | 7/2000 |
| DE | 102005043627 A1 | 3/2007 |
| DE | 102009023357 A1 | 12/2010 |
| DE | 202010017014 U1 | 3/2011 |
| DE | 102011051443 A1 | 1/2013 |
| DE | 202012011899 U1 | 1/2013 |
| DE | 102014225457 A1 | 6/2016 |
| EP | 0428152 A1 | 5/1991 |
| EP | 490848 A2 | 6/1992 |
| EP | 541500 A1 | 5/1993 |
| EP | 714632 B1 | 5/1997 |
| EP | 774933 B1 | 12/2000 |
| EP | 731673 B1 | 5/2001 |
| EP | 1941843 A2 | 7/2008 |
| EP | 2211753 A1 | 8/2010 |
| EP | 2437027 A2 | 4/2012 |
| EP | 2447754 A1 | 5/2012 |
| EP | 1989764 B1 | 7/2012 |
| EP | 2332221 B1 | 11/2012 |
| EP | 2596553 B1 | 12/2013 |
| EP | 2612300 B1 | 2/2015 |
| ES | 463897 A1 | 1/1980 |
| ES | 2455066 A1 | 4/2014 |
| FR | 2369828 A1 | 6/1978 |
| FR | 2867377 A1 | 9/2005 |
| FR | 2930334 A1 | 10/2009 |
| GB | 1550777 A | 8/1979 |
| JP | 53-058191 A | 5/1978 |
| JP | 04-028359 A | 1/1992 |
| JP | 08-508174 A | 9/1996 |
| JP | H0919443 A | 1/1997 |
| JP | 2000339468 A | 12/2000 |
| JP | 2003245289 A | 9/2003 |
| JP | 2006043121 A | 2/2006 |
| JP | 2007151614 A | 6/2007 |
| JP | 2007260158 A | 10/2007 |
| JP | 2007537824 A | 12/2007 |
| JP | 2008067732 A | 3/2008 |
| JP | 2008523370 A | 7/2008 |
| JP | 04184427 B1 | 11/2008 |
| JP | 2009000412 A | 1/2009 |
| JP | 2009018173 A | 1/2009 |
| JP | 2009205330 A | 9/2009 |
| JP | 2010017726 A | 1/2010 |
| JP | 2011087733 A | 5/2011 |
| JP | 2012045143 A | 3/2012 |
| JP | 2013007645 A | 1/2013 |
| JP | 2013192865 A | 9/2013 |
| JP | 201735173 A | 2/2017 |
| KR | 20020062793 A | 7/2002 |
| KR | 20070108019 A | 11/2007 |
| KR | 20090065778 A | 6/2009 |
| KR | 101266966 B1 | 5/2013 |
| KR | 20160041632 A | 4/2016 |
| KR | 20160071127 A | 6/2016 |
| KR | 101675089 B1 | 11/2016 |
| KR | 20160133921 A | 11/2016 |
| TW | 480166 B | 3/2002 |
| WO | WO91/004713 A1 | 4/1991 |
| WO | WO-9203102 A1 | 3/1992 |
| WO | WO94/010935 A1 | 5/1994 |
| WO | WO96/23452 A1 | 8/1996 |
| WO | WO98/032394 A1 | 7/1998 |
| WO | WO98/044865 A1 | 10/1998 |
| WO | WO-0108592 A1 | 2/2001 |
| WO | WO-0180762 A2 | 11/2001 |
| WO | WO-0185047 A2 | 11/2001 |
| WO | WO-0217776 A2 | 3/2002 |
| WO | WO-02062252 A1 | 8/2002 |
| WO | WO-02095475 A1 | 11/2002 |
| WO | WO03/003932 A2 | 1/2003 |
| WO | WO2006/096558 A2 | 9/2006 |
| WO | WO2006/100700 A2 | 9/2006 |
| WO | WO-2006133548 A1 | 12/2006 |
| WO | WO-2007019709 A2 | 2/2007 |
| WO | WO-2007071341 A1 | 6/2007 |
| WO | WO-2007103377 A2 | 9/2007 |
| WO | WO-2008115654 A1 | 9/2008 |
| WO | WO-2009016645 A2 | 2/2009 |
| WO | WO-2009085752 A2 | 7/2009 |
| WO | WO-2009146788 A1 | 12/2009 |
| WO | WO-2009146789 A1 | 12/2009 |
| WO | WO2010/123892 A2 | 10/2010 |
| WO | WO-2012007003 A1 | 1/2012 |
| WO | WO-2012042547 A1 | 4/2012 |
| WO | WO-2012064684 A2 | 5/2012 |
| WO | WO-2012074304 A2 | 6/2012 |
| WO | WO-2012078980 A2 | 6/2012 |
| WO | WO-2012083968 A1 | 6/2012 |
| WO | WO-2012140021 A2 | 10/2012 |
| WO | WO2013/058879 A2 | 4/2013 |
| WO | WO2013/176444 A1 | 11/2013 |
| WO | WO2014/068107 A1 | 5/2014 |
| WO | WO-2014091865 A1 | 6/2014 |
| WO | WO-2014143911 A1 | 9/2014 |
| WO | WO-2015015289 A2 | 2/2015 |
| WO | WO-2015063032 A1 | 5/2015 |
| WO | WO-2015112638 A1 | 7/2015 |
| WO | WO-2015176004 A1 | 11/2015 |
| WO | WO-2016004415 A1 | 1/2016 |
| WO | WO2016/028106 A1 | 2/2016 |
| WO | WO-2016042393 A1 | 3/2016 |
| WO | WO-2016042396 A1 | 3/2016 |
| WO | WO-2016061279 A1 | 4/2016 |

(56) References Cited

FOREIGN PATENT DOCUMENTS

| WO | WO-2016084066 A1 | 6/2016 |
| WO | WO-2016099471 A1 | 6/2016 |
| WO | WO-2016113745 A1 | 7/2016 |
| WO | WO-2016116874 A1 | 7/2016 |
| WO | WO2016/149007 A1 | 9/2016 |
| WO | WO-2016200177 A1 | 12/2016 |
| WO | WO2017/006176 A1 | 1/2017 |
| WO | WO-2017182654 A1 | 10/2017 |
| WO | WO-2018057547 A1 | 3/2018 |
| WO | WO-2018085718 A2 | 5/2018 |

OTHER PUBLICATIONS

3 Shape Trios 3, Insane speed-scanning with 3shape trios 3 intracral canner, (Screenshot), 2 pages, retrieved from the internet at You Tube (https//www.youtube.com/watch?v=X5CviUZ5DpQ&feature=youtu.be, available as of Sep. 18, 2015.
Alves R.C., et al., "New Trends In Food Allergens Detection: Toward Biosensing Strategies", Critical Reviews in Food Science and Nutrition, Mar. 2015, 18 pages.
Arakawa et al., Mouthguard biosensor with telemetry system for monitoring of saliva glucose: A novel cavitas sensor, Biosensors and Bioelectronics, Oct. 2016, 84, pp. 106-111.
Bandodkar et al., Allprinted magnetically selfhealing electrochemical devices, Science Advances, Nov. 2016, 2(11), 11 pages, e1601465.
Bandodkar et al., Self-healing inks for autonomous repair of printable electrochemical devices, Advanced Electronic Materials, Dec. 2015, 1(12), 5 pages, 1500289.
Bandodkar et al., Wearable biofuel cells: a review; Electroanalysis, Jun. 2016, 28 (6), pp. 1188-1200.
Bandodkar et al., Wearable chemical sensors: present challenges and future prospects; Acs Sensors, May 11, 2016, 1(5), pp. 464-482.
Berland, The use of smile libraries for cosmetic dentistry, Dental Tribunne: Asia pacfic Edition, Mar. 29, 2006, p. 16 18.
Bernabe et al., Are the lower incisors the best predictors for the unerupted canine and premolars sums? An analysis of peruvian sample, The Angle Orthodontist, Mar. 2005, 75(2), pp. 202-207.
Bookstein, Principal warps: Thin-plate splines and decomposition of deformations, IEEE Transactions on pattern analysis and machine intelligence, Jun. 1989, 11 (6), pp. 567-585.
Cadent Inc., OrthoCAD ABO user guide, 38 pages, Dec. 21, 2005.
Cadent Inc., Reviewing and modifying an orthoCAD case, 4 pages, Feb. 14, 2005.
Collins English Dictionary, Teeth (definition), 9 pages, retrieved from the internet (https://www.collinsdictionary.com/us/dictionary/english/teeth) on May 13, 2019.
Daniels et al., The development of the index of complexity outcome and need (ICON), British Journal of Orthodontics, Jun. 2000, 27(2), pp. 149-162.
Dental Monitoring, "Basics: How to put your Cheek Retractor? (Dental Monitoring Tutorial)", https:/lwww.youtube.com/watch?v=6K1HXw4Kq3c, May 27, 2016.
Dental Monitoring, Dental monitoring tutdrial, 1 page (Screenshot), retrieved from the internet (https:www.youtube.com/watch?v=Dbe3ud0f9_c), Mar. 18, 2015.
Dentrix, "Dentrix G3, New Features". http://www.dentrix.com/g3/new_features/index.asp, accessed Jun. 6, 2008, 2 pgs.
Di Giacomo et al., Clinical application of sterolithographic surgical guides for implant placement: Preliminary results, Journal Periodontolgy, Apr. 2005, 76(4), pp. 503-507.
DICOM to surgical guides; (Screenshot); 1 page; retrieved from the internet at YouTube (https://youtu.be/47KtOmCEFQk); Published Apr. 4, 2016.
dictionary.com, Plural (definition), 6 pages, retrieved from the internet (https://www.dictionary.eom/browse/plural#) on May 13, 2019.
dictionary.com, Quadrant (definition), 6 pages, retrieved from the internet (https://www.dictionary.com/browse/quadrant?s=t) on May 13, 2019.
Doruk et al., The role of the headgear timer in extraoral co-operation, European Journal of Orthodontics, Jun. 1, 2004, 26, pp. 289-291.
Dummer et al., Computed Radiography Imaging Based on High-Density 670 nm VCSEL Arrays, International Society for Optics and Photonics, Feb. 24, 2010., vol. 7557, p. 75570H, 7 pages, (Author Manuscript).
Eclinger Selfie, Change your smile, 1 page (screenshot), retrieved from the internet https://play.google.com/store/apps/details?id=parkelict.ecligner), on Feb. 13, 2018.
Farooq et al., Relationship between tooth dimensions and malocclusion, JPMA: The Journal of the Pakistan Medical Association, 64(6), pp. 670-674, Jun. 2014.
Friedrich et al., "Measuring system for in vivo recording of force systems in orthodontic treatment-concept and analysis of accuracy", J. Biomech., 32(1), pp. 81-85, (Abstract only) Jan. 1999.
Geomagic, Dental reconstruction, 1 page, retrieved from the internet (http://geomagic.com/en/solutions/industry/detal_desc.php) on Jun. 6, 2008.
Gim Alldent Deutschland, "Das DUX System: Die Technik," 2 pages total (2002).
Gottschalk et al., "OBBTree: A hierarchical structure for rapid interference detection" (http://www.cs.unc.edu/?geom/OBB/OBBT.html); relieved from the internet (https://www.cse.iitk.ac.in/users/amiUcourses/RMP/presentations/dslamba/presentation/sig96.pdf) on Apr. 25, 2019,12 pages.
gpsdentaire.com, Get a realistic smile simulation in 4 steps with GPS, a smile management software, 10 pages, retrieved from the internet (http://www.gpsdentaire.com/en/preview/) on Jun. 6, 2008.
Grest, Daniel, Marker-Free Human Motion Capture in Dynamic Cluttered Environments from a Single View-Point:, PhD Thesis, 171 pages, 2007, Kiel, Germany, XP055320155. [retrieved on Nov. 16, 2016] Retrieved from the Internet: [http://www.grest.org/publications/thesisDanielGrest.pdf].
Hou H.M., et al., "The Uses of Orthodontic Study Models in Diagnosis and Treatment Planning", Hong Kong Dental Journal, Dec. 2006, vol. 3(2), pp. 107-115.
Imani et al., Awearable chemical-electrophysiological hybrid biosensing system for real-time health and fitness monitoring, Nature Communications, 7, 11650. doi 1038/ncomms11650, 7 pages, May 23, 2016.
Invisalign., You were made to move. There's never been a better time to straighten your teeth with the most advanced clear aligner in the world', Product webpage, 2 pages, retrieved from the internet (www.invisalign.com/) on Dec. 28, 2017.
Jeerapan et al., Stretchable biofuel cells as wearable textile-based self-powered sensors, Journal of Materials Chemistry A, 4(47), pp. 18342-18353, Dec. 21, 2016.
Karaman et al., A practical method of fabricating a lingual retainer, Am. Journal of Orthodontic and Dentofacial Orthopedics, Sep. 2003, 124(3), pp. 327-330.
Kim et al., A wearable fingernail chemical sensing platform: pH sensing at your fingertips, Taianta, 150, pp. 622-628, Apr. 2016.
Kim et al., Advanced materials for printed wearable electrochemical devices: A review, Advanced Electronic Materials, 3(1), 15 pages, 1600260, Jan. 2017.
Kim et al., Noninvasive alcohol monitoring using a wearable tatto-based iontophoretic-biosensing system, Acs Sensors, 1(8), pp. 1011-1019, Jul. 22, 2016.
Kim et al., Wearable salivary uric acid mouthguard biosensor with integrated wireless electronics, Biosensors and Bioelectronics, 74, pp. 1061-1068 (Author Manuscript), Dec. 2015.
Kumar et al., All-printed, stretchable Zn—Ag2o rechargeable battery via, hyperelastic binder for self-powering wearable electronics, Advanced Energy Materials, Apr. 2017, 7(8), 8 pages, 1602096.
Kumar et al., Rapid maxillary expansion: A unique treatment modality in dentistry, J. Clin. Diagn. Res., 5(4 ), pp. 906-911, Aug. 2011.
Mantzikos et al., Case report: Forced eruption and implant site development, The Angle Orthodontist, 68(2), pp. 179-186, Apr. 1998.

(56) References Cited

OTHER PUBLICATIONS

Martinelli et al., Prediction of lower permanent canine and premolars width by correlation methods, The Angle Orthodontist, 75(5), pp. 805-808, Sep. 2005.
Methot; Get the picture with a gps for smile design in 3 steps; Spectrum; 5(4); pp. 100-105; (year of pub. sufficiently earlier than effective US filing date and any foreign priority date) 2006.
Nedelcu, Robert G., et al., "Scanning Accuracy and Precision in 4 Intraoral Scanners: An In Vitro Comparison Based on 3-Dimensional Analysis," The Journal of Prosthetic Dentistry, vol. 112, Issue 6, Dec. 1, 2014, pp. 1461-1471.
Newcombe, R., et al., DTAM: Dense Tracking and Mapping in Real-Time, Retrieved from https://www.doc.ic.ac.uk/?ajd/Publications/newcombe_etal_iccv2011.pdf, Dec. 2011, 8 pgs.
Nourallah et al., New regression equations for prediciting the size of unerupted canines and premolars in a contemporary population, The Angle Orthodontist, 72(3), pp. 216-221, Jun. 2002.
ormco.com: Increasing clinical performance with 3D interactive treatment planning and patient-specific appliances; retrieved from the internet (http://www. konsident.com/wp-contenVfiles mf/1295385693http armco. com _index_ cmsfilesystemaction fileOrmcoPDFwhitepapers. pdf) on Feb. 27, 2019, 8 Pages.
OrthoCAD downloads, retrieved Jun. 27, 2012 from the internet (www.orthocad.com/download/downloads.asp), 2 pages, Feb. 14, 2005.
Paredes et al., A new, accurate and fast digital method to predict unerupted tooth size, The Angle Orthodontist, 76(1 ), pp. 14-19, Jan. 2006.
Parrilla et al., A textile-based stretchable multi-ion potentiometric sensor, Advanced Healthcare Materials, 5(9), pp. 996-1001, May 2016.
Patterson Dental, "Cosmetic Imaging". http://patterson.eaglesoft.net/cnt_di_cosimg.html, accessed Jun. 6, 2008, 2 pgs.
Rose T.P., et al., "The Role of Orthodontics in Implant Dentistry", British Dental Journal, vol. 201, No. 12, Dec. 23, 2006, pp. 753-764.
Rubin et al., Stress analysis of the human tooth using a three-dimensional finite element model, Journal of Dental Research, 62(2), pp. 82-86, Feb. 1983.
Sahm et al., "Micro-Electronic Monitoring Of Functional Appliance Wear", Eur J Orthod., 12(3), pp. 297-301, Aug. 1990.
Sahm, "Presentation of a wear timer for the clarification of scientific questions in orthodontic orthopedics", Fortschritte der Kieferorthopadie, 51 (4), pp. 243-247, (Translation Included) Jul. 1990.
Sarment et al., "Accuracy of implant placement with a stereolithographic surgical guide", Journal of Oral and Maxillofacial Implants, 118(4), pp. 571-577, Jul. 2003.
Schafer, et al. Quantifying patient adherence during active orthodontic treatment with removable appliances using microelectronic wear-time documentation. European Journal of Orthodontics. 2014, 1-8. doi: 10.1 093/ejo/cju012, Jul. 3, 2014.
Smalley; "Implants for tooth movement Determining implant location and orientation," Journal of Esthetic and Restorative Dentistry; Mar. 1995, vol. 7(2); pp. 62-72.
Smart Technology; Smile library II; 1 page; retrieved from the internet;< http://smart-technology.net/> on Jun. 6, 2008.
Smile-Vision; "The smile-vision cosmetic imaging system"; 2 pages; Retrieved from the internet< http://www.smile-vision.net/cos_imaging.php> on Jun. 6, 2008.
Sobral De A Gular et al., The Gingival Crevicular Fluid as a Source of Biomarkers to Enhance Efficiency of Orthodontic and Functional Treatment of Growing Patients, Bio. Med. Research International, 2017, 7 Pages, Article ID 3257235, 2017.
Szeliski, Richard, "Introduction to Computer Vision: Structure from Motion", Retrieved from internet< http://robots.stanford.edu/cs223b05/notes/CS%20223-B%20L10%20structurefro-mmotion1b.ppt> Feb. 3, 2005, 64 pgs.
Thera Mon; "Microsensor"; 2 pages; retrieved from the internet (www.english.thera-mon.com/the-product/transponder/index.html); on Sep. 19, 2016.
Vevin et al.; "Pose estimation of teeth through crown-shape matching; In Medical Imaging";: Image Processing of International Society of Optics and Photonics;May 9, 2002, vol. 4684; pp. 955-965.
Virtual Orthodontics, Our innovative software,2005, 2 Pages. (http://www.virtualorthodontics.com/innovativesoftware.html), retrieved from the internet (https://web.archive.org/web/20070518085145/http://www.virtualorthodontics.com/innovativesoftware.html); (year of pub. sufficiently earlier than effective US filing date and any foreign priority date).
Wiedmann; "According to the laws of harmony to find the right tooth shape with assistance of the computer"; Digital Dental News; Apr. 2008, 2nd Vol.; pp. 0005-0008.
Wikipedia; Palatal expansion; 3 pages; retrieved from the internet< https: en.wikipedia.org="" wiki="" palatal_expansion=""> on Mar. 5, 2018</https:>.
Wireless Sensor Networks Magazine, "Embedded Teeth for Oral Activity Recognition", Jul. 29, 2013, 2 pages; retrieved on Sep. 19, 2016 from the internet www.wsnmagazine.com/embedded-teeth/>.
Witt et al., "The wear-timing measuring device in orthodontics-cui bono? Reflections on the state-of-the-art in wear-timing measurement and compliance research in orthodontics"; Fortschr Kieferothop; Jun. 1991, vol. 52(3); pp. 117-125.
Wong et al., "Computer-aided design/computer-aided manufacturing surgical guidance for placement of dental implants": Case report; Implant Dentistry; Sep. 2007, vol. 16(2); pp. 123-130.
Yaltara Software; Visual planner; 1 page; retrieved from the internet(http://yaltara.com/vp/) on Jun. 6, 2008.
Yamada et al.; Simulation of fan-beam type optical computed-tomography imaging of strongly scattering and weakly absorbing media; Applied Optics; 32(25); pp. 4808-4814; Sep. 1, 1993.
Zhang et al., "Visual Speech Features Extraction for Improved Speech Recognition", 2002 IEEE International conference on Acoustics, Speech and Signal Processing, May 13-17, 2002, vol. 2, 4 pages.
AADR. American Association for Dental Research; Summary of Activities; Los Angeles, CA; p. 195; Mar. 20-23,(year of pub. sufficiently earlier than effective US filing date and any foreign priority date) 1980.
Alcaniz et al.; An Advanced System for the Simulation and Planning of Orthodontic Treatments; Karl Heinz Hohne and Ron Kikinis (eds.); Visualization in Biomedical Computing, 4th Intl. Conf, VBC '96, Hamburg, Germany; Springer-Verlag; pp. 511-520; Sep. 22-25, 1996.
Alexander et al.; The DigiGraph Work Station Part 2 Clinical Management; J. Clin. Orthod.; pp. 402-407; (Author Manuscript); Jul. 1990.
Align Technology; Align technology announces new teen solution with introduction of invisalign teen with mandibular advancement; 2 pages; retrieved from the internet (http://investor.aligntech.com/static-files/eb4fa6bb-3e62-404f-b74d-32059366a01b); Mar. 6, 2017.
Allesee Orthodontic Appliance: Important Tip About Wearing the Red White & Blue Active Clear Retainer System; Ailesee Orthodontic Appliances—Pro Lab; 1 page; (year of pub. sufficiently earlier than effective US filing date and any foreign priority date); 1998.
Allesee Orthodontic Appliances: DuraClearTM; Product information; 1 page; (year of pub. sufficiently earlier than effective US filing date and any foreign priority date) 1997.
Allesee Orthodontic Appliances; The Choice Is Clear: Red, White & Blue . . . The Simple, Affordable, No-Braces Treatment; ( product information for doctors); retrieved from the internet (http://ormco.com/aoa/appliancesservices/RWB/doctorhtml); 5 pages on May 19, 2003.
Allesee Orthodontic Appliances; The Choice Is Clear: Red, White & Blue . . . The Simple, Affordable, No-Braces Treatment; (product information), 6 pages; (year of pub. sufficiently earlier than effective US filing date and any foreign priority date) 2003.
Allesee Orthodontic Appliances; The Choice is Clear: Red, White & Blue . . . The Simple, Affordable, No-Braces Treatment;(Patient Information); retrieved from the internet (http://ormco.com/aoa/appliancesservices/RWB/patients.html); 2 pages on May 19, 2003.

(56) References Cited

OTHER PUBLICATIONS

Allesee Orthodontic Appliances; The Red, White & Blue Way to Improve Your Smile; (information for patients), 2 pages; (year of pub. sufficiently earlier than effective US filing date and any foreign priority date) 1992.
Allesee Orthodontic Appliances; You may be a candidate for this invisible no-braces treatment; product information for patients; 2 pages; (year of pub. sufficiently earlier than effective US filing date and any foreign priority date) 2002.
Altschuler et al.; Analysis of 3-D Data for Comparative 3-D Serial Growth Pattern Studies of Oral-Facial Structures; AADR Abstracts, Program and Abstracts of Papers, 57th General Session, IADR Annual Session, Mar. 29, 1979-Apr. 1, 1979, New Orleans Marriot; Journal of Dental Research; vol. 58, Special Issue A, p. 221; Jan. 1979.
Altschuler et al.; Laser Electro-Optic System for Rapid Three-Dimensional (3D) Topographic Mapping of Surfaces; Optical Engineering; 20(6); pp. 953-961; Dec. 1981.
Altschuler et al.; Measuring Surfaces Space-Coded by a Laser-Projected Dot Matrix; SPIE Imaging q Applications for Automated Industrial Inspection and Assembly; vol. 182; pp. 187-191; Oct. 10, 1979.
Altschuler; 3D Mapping of Maxillo-Facial Prosthesis; AADR Abstract #607; 2 pages total, (year of pub. sufficiently earlier than effective US filing date and any foreign priority date) 1980.
Andersson et al.; Clinical Results with Titanium Crowns Fabricated with Machine Duplication and Spark Erosion; Acta Odontologica Scandinavica; 47(5); pp. 279-286; Oct. 1989.
Andrews, The Six Keys to Optimal Occlusion Straight Wire, Chapter 3, L.A. Wells; pp. 13-24; (year of pub. sufficiently earlier than effective US filing date and any foreign priority date) 1989.
Barone et al.; Creation of 3D multi-body orthodontic models by using independent imaging sensors; Sensors; 13(2); pp. 2033-2050; Feb. 5, 2013.
Bartels et al.; An Introduction to Splines for Use in Computer Graphics and Geometric Modeling; Morgan Kaufmann Publishers; pp. 422-425 Jan. 1, 1987.
Baumrind et al, "Mapping the Skull in 3-D," reprinted from J. Calif. Dent. Assoc, 48(2), 11 pages; (year of pub. sufficiently earlier than effective US filing date and any foreign priority date) Fall Issue 1972.
Baumrind et al.; A Stereophotogrammetric System for the Detection of Prosthesis Loosening in Total Hip Arthroplasty; NATO Symposium on Applications of Human Biostereometrics; SPIE; vol. 166; pp. 112-123; Jul. 9-13, 1978.
Baumrind; A System for Cranio facial Mapping Through the Integration of Data from Stereo X-Ray Films and Stereo Photographs; an invited paper submitted to the 1975 American Society of Photogram Symposium on Close-Range Photogram Systems; University of Illinois; pp. 142-166; Aug. 26-30, 1975.
Baumrind; Integrated Three-Dimensional Craniofacial Mapping: Background, Principles, and Perspectives; Seminars in Orthodontics; 7(4); pp. 223-232; Dec. 2001.
beautyworlds.com; Virtual plastic surgery—beautysurge.com announces launch of cosmetic surgery digital imaging services; 5 pages; retrieved from the internet (http://www.beautyworlds.com/cosmossurgdigitalimagning.htm); Mar. 2004.
Begole et al.; A Computer System for the Analysis of Dental Casts; The Angle Orthodontist; 51(3); pp. 252-258; Jul. 1981.
Bernard et al.; Computerized Diagnosis in Orthodontics for Epidemiological Studies: A ProgressReport; (Abstract Only), J. Dental Res. Special Issue, vol. 67, p. 169, paper presented at International Association for Dental Research 66th General Session, Montreal Canada; Mar. 9-13, 1988.
Bhatia et al.; A Computer-Aided Design for Orthognathic Surgery; British Journal of Oral and Maxillofacial Surgery; 22(4); pp. 237-253; Aug. 1, 1984.
Biggerstaff et al.; Computerized Analysis of Occlusion in the Postcanine Dentition; American Journal of Orthodontics; 61(3); pp. 245-254; Mar. 1972.
Biggerstaff; Computerized Diagnostic Setups and Simulations; Angle Orthodontist; 40(I); pp. 28-36; Jan. 1970.
Biostar Operation & Training Manual. Great Lakes Orthodontics, Ltd. 199 Fire Tower Drive,Tonawanda, New York. 14150-5890, 20 pages; (year of pub. sufficiently earlier than effective US filing date and any foreign priority date) 1990.
Blu et al.; Linear interpolation revitalized; IEEE Transactions on Image Processing; 13(5); pp. 710-719; May 2004.
Bourke, Coordinate System Transformation; 1 page; retrived from the internet (http://astronomy.swin.edu.au/' pbourke/prolection/coords) on Nov. 5, 2004; Jun. 1996.
Boyd et al.; Three Dimensional Diagnosis and Orthodontic Treatment of Complex Malocclusions With the Invisalipn Appliance; Seminars in Orthodontics; 7(4); pp. 274-293; Dec. 2001.
Brandestini et al.; Computer Machined Ceramic Inlays: In Vitro Marginal Adaptation; J. Dent. Res. Special Issue; (Abstract 305); vol. 64; p. 208; (year of pub. sufficiently earlier than effective US filing date and any foreign priority date) 1985.
Brook et al.; An Image Analysis System for the Determination of Tooth Dimensions from Study Casts: Comparison with Manual Measurements of Mesio-distal Diameter; Journal of Dental Research; 65(3); pp. 428-431; Mar. 1986.
Burstone et al.; Precision Adjustment of the Transpalatal Lingual Arch: Computer Arch Form Predetermination; American Journal of Orthodontics; 79(2);pp. 115-133; Feb. 1981.
Burstone; Dr. Charles J. Burstone on The Uses of the Computer in Orthodontic Practice (Part 1); Journal of Clinical Orthodontics; 13(7); pp. 442-453; (interview); Jul. 1979.
Burstone; Dr. Charles J. Burstone on The Uses of the Computer in Orthodontic Practice (Part 2); journal of Clinical Orthodontics; 13(8); pp. 539-551 (interview); Aug. 1979.
Cardinal Industrial Finishes; Powder Coatings; 6 pages; retrieved from the internet (http://www.cardinalpaint.com) on Aug. 25, 2000.
Carnaghan, An Alternative to Holograms for the Portrayal of Human Teeth; 4th Int'l. Conf. on Holographic Systems, Components and Applications; pp. 228-231; Sep. 15, 1993.
Chaconas et al,; The DigiGraph Work Station, Part 1, Basic Concepts; Journal of Clinical Orthodontics; 24(6); pp. 360-367; (Author Manuscript); Jun. 1990.
Chafetz et al.; Subsidence of the Femoral Prosthesis, A Stereophotogrammetric Evaluation; Clinical Orthopaedics and Related Research; No. 201; pp. 60-67; Dec. 1985.
Chiappone; Constructing the Gnathologic Setup and Positioner; Journal of Clinical Orthodontics; 14(2); pp. 121-133; Feb. 1980.
Chishti et al.; U.S. Appl. No. 60/050,342 entitled "Procedure for moving teeth using a seires of retainers," filed Jun. 20, 1997.
Cottingham; Gnathologic Clear Plastic Positioner; American Journal of Orthodontics; 55(1); pp. 23-31; Jan. 1969.
Crawford; CAD/CAM in the Dental Office: Does It Work?; Canadian Dental Journal; 57(2); pp. 121-123 Feb. 1991.
Crawford; Computers in Dentistry: Part 1: CAD/CAM: The Computer Moves Chairside, Part 2: F. Duret A Man With A Vision, Part 3: The Computer Gives New Vision—Literally, Part 4: Bytes 'N Bites The Computer Moves From The Front Desk To The Operatory; Canadian Dental Journal; 54(9); pp. 661-666 Sep. 1988.
Crooks; CAD/CAM Comes to USC; USC Dentistry; pp. 14-17; (year of pub. sufficiently earlier than effective US filing date and any foreign priority date) Spring 1990.
CSI Computerized Scanning and Imaging Facility; What is a maximum/minimum intensity projection (MIP/MinIP); 1 page; retrived from the internet (http://csi.whoi.edu/content/what-maximumminimum-intensity-projection-mipminip); Jan. 4, 2010.
CURETON; Correcting Maialigned Mandibular Incisors with Removable Retainers; Journal of Clinical Orthodontics; 30(7); pp. 390-395; Jul. 1996.
Curry et al.; Integrated Three-Dimensional Craniofacial Mapping at the Craniofacial Research InstrumentationLaboratory/University of the Pacific; Seminars in Orthodontics; 7(4); pp. 258-265; Dec. 2001.
Cutting et al.; Three-Dimensional Computer-Assisted Design of Craniofacial Surgical Procedures; Optimization and Interaction with Cephalometric and CT-Based Models; Plastic and Reconstructive Surgery; 77(6); pp. 877-885; Jun. 1986.

(56) References Cited

OTHER PUBLICATIONS

DCS Dental AG; The CAD/CAM 'DCS Titan System' for Production of Crowns/Bridges; DSC Production; pp. 1-7; Jan. 1992.
Defranco et al.; Three-Dimensional Large Displacement Analysis of Orthodontic Appliances; Journal of Biomechanics; 9(12); pp. 793-801; Jan. 1976.
Dental Institute University of Zurich Switzerland; Program for International Symposium on Computer Restorations: State of the Art of the CEREC-Method; 2 pages; May 1991.
Dentrac Corporation; Dentrac document; pp. 4-13; (year of pub. sufficiently earlier than effective US filing date and any foreign priority date) 1992.
DENT-X; Dentsim . . . Dent-x's virtual reality 3-D training simulator . . . A revolution in dental education; 6 pages; retrieved from the internet (http://www.dent-x.com/DentSim.htm); on Sep. 24, 1998.
Di Muzio et al.; Minimum intensity projection (MinIP); 6 pages; retrieved from the internet (https://radiopaedia.org/articles/minimum-intensity-projection-minip) on Sep. 6, 2018.
Doyle; Digital Dentistry; Computer Graphics World; pp. 50-52 andp. 54; Oct. 2000.
Duret et al.; CAD/CAM Imaging in Dentistry; Current Opinion in Dentistry; 1(2); pp. 150-154; Apr. 1991.
Duret et al.; CAD-CAM in Dentistry; Journal of the American Dental Association; 117(6); pp. 715-720; Nov. 1988.
Duret; The Dental CAD/CAM, General Description of the Project; Hennson International Product Brochure, 18 pages; Jan. 1986.
Duret; Vers Une Prosthese Informatisee; Tonus; 75(15); pp. 55-57; (English translation attached); 23 pages; Nov. 15, 1985.
Economides; The Microcomputer in the Orthodontic Office; Journal of Clinical Orthodontics; 13(11); pp. 767-772; Nov. 1979.
Ellias et al.; Proteomic analysis of saliva identifies potential biomarkers for orthodontic tooth movement; The Scientific World Journal; vol. 2012; Article ID 647240; dio:10.1100/2012/647240; 7 pages; Jul. 2012.
Elsasser; Some Observations on the History and Uses of the Kesling Positioner; American Journal of Orthodontics; 36(5); pp. 368-374; May 1, 1950.
English translation of Japanese Laid-Open Publication No. 63-11148 to inventor T. Ozukuri (Laid-Open on Jan. 18, 1998) pp. 1-7.
Faber et al.; Computerized Interactive Orthodontic Treatment Planning; American Journal of Orthodontics; 73(1); pp. 36-46; Jan. 1978.
Felton et al.; A Computerized Analysis of the Shape and Stability of Mandibular Arch Form; American Journal of Orthodontics and Dentofacial Orthopedics; 92(6); pp. 478-483; Dec. 1987.
Florez-Moreno; Time-related changes in salivary levels of the osteotropic factors sRANKL and OPG through orthodontic tooth movement; American Journal of Orthodontics and Dentofacial Orthopedics; 143(1); pp. 92-100; Jan. 2013.
Friede et al.; Accuracy of Cephalometric Prediction in Orthognathic Surgery; Journal of Oral and Maxillofacial Surgery; 45(9); pp. 754-760; Sep. 1987.
Futterling et al.; Automated Finite Element Modeling of a Human Mandible with Dental Implants; JS WSCG '98-Conference Program; 8 pages; retrieved from the Internet (https://dspace5.zcu.ez/bitstream/11025/15851/1/Strasser_98.pdf); on Aug. 21, 2018.
Gansky; Dental data mining: potential pitfalls and practical issues; Advances in Dental Research; 17(1); pp. 109-114; Dec. 2003.
Gao et al.; 3-D element Generation for Multi-Connected Complex Dental and Mandibular Structure; IEEE Proceedings International Workshop in Medical Imaging and Augmented Reality; pp. 267-271; Jun. 12, 2001.
Gim-Alldent Deutschland, "Das DUX System: Die Technik," 3 pages; (English Translation Included); (year of pub. sufficiently earlier than effective US filing date and any foreign priority date); 2002.
Gottleib et al.; JCO Interviews Dr. James A. McNamara, Jr., on the Frankel Appliance: Part 2: Clinical 1-1 Management; Journal of Clinical Orthodontics; 16(6); pp. 390-407; retrieved from the internet (http://www.jco-online.com/archive/print_article.asp?Year=1982&Month=06&ArticleNum+); 21 pages; Jun. 1982.
Grayson; New Methods for Three Dimensional Analysis of Craniofacial Deformity, Symposium: Computerized Facial Imaging in Oral and Maxillofacial Surgery; American Association of Oral and Maxillofacial Surgeons; 48(8) suppl 1; pp. 5-6; Sep. 13, 1990.
Guess et al.; Computer Treatment Estimates In Orthodontics and Orthognathic Surgery; Journal of Clinical Orthodontics; 23(4); pp. 262-268; 11 pages; (Author Manuscript); Apr. 1989.
Heaven et al.; Computer-Based Image Analysis of Artificial Root Surface Caries; Abstracts of Papers #2094; Journal of Dental Research; 70:528; (Abstract Only); Apr. 17-21, 1991.
Highbeam Research: Simulating stress put on jaw. (ANSYS Inc.'s finite element analysis software); 2 pages; retrieved from the Internet (http://static.highbeam.eom/t/toolingampproduction/november011996/simulatingstressputonfa . . . ); on Nov. 5, 2004.
Hikage; Integrated Orthodontic Management System for Virtual Three-Dimensional Computer Graphic Simulation and Optical Video Image Database for Diagnosis and Treatment Planning; Journal of Japan KA Orthodontic Society; 46(2); pp. 248-269; 56 pages; (English Translation Included); Feb. 1987.
Hoffmann et al.; Role of Cephalometry for Planning of Jaw Orthopedics and Jaw Surgery Procedures; Informatbnen, pp. 375-396; (English Abstract Included); Mar. 1991.
Hojjatie et al.; Three-Dimensional Finite Element Analysis of Glass-Ceramic Dental Crowns; Journal of Biomechanics; 23(11); pp. 1157-1166; Jan. 1990.
Huckins; CAD-CAM Generated Mandibular Model Prototype from MRI Data; AAOMS, p. 96: (Abstract Only); (year of pub. sufficiently earlier than effective US filing date and any foreign priority date) 1999.
JCO Interviews; Craig Andreiko, DDS, MS on the Elan and Orthos Systems; Interview by Dr. Larry W. White; Journal of Clinical Orthodontics; 28(8); pp. 459-468; 14 pages; (Author Manuscript); Aug. 1994.
JCO Interviews; Dr. Homer W. Phillips on Computers in Orthodontic Practice, Part 2; Journal of Clinical Orthodontics; 17(12); pp. 819-831; 19 pages; (Author Manuscript); Dec. 1983.
Jerrold; The Problem, Electronic Data Transmission and the Law; American Journal of Orthodontics and Dentofacial Orthopedics; 113(4); pp. 478-479; 5 pages; (Author Manuscript); Apr. 1998.
Jia et al.; Epidermal biofuel cells: energy harvesting from human perspiration; Angewandle Chemie International Edition; 52(28); pp. 7233-7236; Jul. 8, 2013.
Jia et al.; Wearable textile biofuel cells for powering electronics; Journal of Materials Chemistry A; 2(43); pp. 18184-18189; Oct. 14, 2014.
Jones et al.; An Assessment of the Fit of a Parabolic Curve to Pre- and Post-Treatment Dental Arches; British Journal of Orthodontics; 16(2); pp. 85-93; May 1989.
Kamada et.al.; Case Reports On Tooth Positioners Using LTV Vinyl Silicone Rubber; J. Nihon University School of Dentistry; 26(1); pp. 11-29; (year of pub. sufficiently earlier than effective US filing date and any foreign priority date) 1984.
Kamada et.al.; Construction of Tooth Positioners with LTV Vinyl Silicone Rubber and Some Case KJ Reports; J. Nihon University School of Dentistry; 24(1); pp. 1-27; (year of pub. sufficiently earlier than effective US filing date and any foreign priority date) 1982.
Kanazawa et al.; Three-Dimensional Measurements of the Occlusal Surfaces of Upper Molars in a Dutch Population; Journal of Dental Research; 63(11); pp. 1298-1301; Nov. 1984.
Kesling et al.; The Philosophy of the Tooth Positioning Appliance; American Journal of Orthodontics and Oral surgery; 31(6); pp. 297-304; Jun. 1945.
Kesling; Coordinating the Predetermined Pattern and Tooth Positioner with Conventional Treatment; American Journal of Orthodontics and Oral Surgery; 32(5); pp. 285-293; May 1946.
Kim et al.; Non-invasive mouthguard biosensor for continuous salivary monitoring of metabolites; Analyst; 139(7); pp. 1632-1636; Apr. 7, 2014.
Kleeman et al.; The Speed Positioner; J. Clin. Orthod.; 30(12); pp. 673-680; Dec. 1996.

(56) References Cited

OTHER PUBLICATIONS

Kochanek; Interpolating Splines with Local Tension, Continuity and Bias Control; Computer Graphics; 18(3); pp. 33-41; Jan. 1, 1984.

Kumar et al.; Biomarkers in orthodontic tooth movement; Journal of Pharmacy Bioallied Sciences; 7(Suppl 2); pp. S325-S330; 12 pages; (Author Manuscript); Aug. 2015.

Kunii et al.; Articulation Simulation for an Intelligent Dental Care System; Displays; 15(3); pp. 181-188; Jul. 1994.

Kuroda et al.; Three-Dimensional Dental Cast Analyzing System Using Laser Scanning; American Journal of Orthodontics and Dentofacial Orthopedics; 110(4); pp. 365-369; Oct. 1996.

Laurendeau et al.; A Computer-Vision Technique for the Acquisition and Processing of 3-D Profiles of 7 Dental Imprints: An Application in Orthodontics; IEEE Transactions on Medical Imaging; 10(3); pp. 453-461; Sep. 1991.

Leinfelder et al.; A New Method for Generating Ceramic Restorations: a CAD-CAM System; Journal of the American Dental Association; 118(6); pp. 703-707; Jun. 1989.

Manetti et al.; Computer-Aided Cefalometry and New Mechanics in Orthodontics; Fortschr Kieferorthop; 44; pp. 370-376; 8 pages; (English Article Summary Included); (year of pub. sufficiently earlier than effective US filing date and any foreign priority date) 1983.

McCann; Inside the ADA; J. Amer. Dent. Assoc, 118:286-294; Mar. 1989.

McNamara et al.; Invisible Retainers; J. Clin Orthod.; pp. 570-578; 11 pages; (Author Manuscript); Aug. 1985.

McNamara et al.; Orthodontic and Orthopedic Treatment in the Mixed Dentition; Needham Press; pp. 347-353; Jan. 1993.

Moermann et al., Computer Machined Adhesive Porcelain Inlays: Margin Adaptation after Fatigue Stress; IADR Abstract 339; J. Dent. Res.; 66(a):763; (Abstract Only); (year of pub. sufficiently earlier than effective US filing date and any foreign priority date) 1987.

Moles; Correcting Mild Malalignments—As Easy As One, Two, Three; AOA/Pro Corner; 11(2); 2 pages; (year of pub. sufficiently earlier than effective US filing date and any foreign priority date) 2002.

Mormann et al.; Marginale Adaptation von adhasuven Porzellaninlays in vitro; Separatdruck aus:Schweiz. Mschr. Zahnmed.; 95; pp. 1118-1129; 8 pages; (Machine Translated English Abstract); (year of pub. sufficiently earlier than effective US filing date and any foreign priority date); 1985.

Nahoum; The Vacuum Formed Dental Contour Appliance; N. Y. State Dent. J.; 30(9); pp. 385-390; Nov. 1964.

Nash; CEREC CAD/CAM Inlays: Aesthetics and Durability in a Single Appointment; Dentistry Today; 9(8); pp. 20, 22-23 and 54; Oct. 1990.

Nishiyama et al.; A New Construction of Tooth Repositioner by LTV Vinyl Silicone Rubber; The Journal of Nihon University School of Dentistry; 19(2); pp. 93-102 (year of pub. sufficiently earlier than effective US filing date and any foreign priority date) 1977.

Ogawa et al.; Mapping, profiling and clustering of pressure pain threshold (PPT) in edentulous oral muscosa; Journal of Dentistry; 32(3); pp. 219-228; Mar. 2004.

Ogimoto et al.; Pressure-pain threshold determination in the oral mucosa; Journal of Oral Rehabilitation; 29(7); pp. 620-626; Jul. 2002.

Page et al.; Validity and accuracy of a risk calculator in predicting periodontal disease; Journal of the American Dental Association; 133(5); pp. 569-576; May 2002.

Paul et al.; Digital Documentation of Individual Human Jaw and Tooth Forms for Applications in Orthodontics; Oral Surgery and Forensic Medicine Proc. of the 24th Annual Conf. of the IEEE Industrial Electronics Society (IECON '98); vol. 4; pp. 2415-2418; Sep. 4, 1998.

Pinkham; Foolish Concept Propels Technology; Dentist, 3 pages , Jan./Feb. 1989.

Pinkham; Inventor's CAD/CAM May Transform Dentistry; Dentist; pp. 1 and 35, Sep. 1990.

Ponitz; Invisible retainers; Am. J. Orthod.; 59(3); pp. 266-272; Mar. 1971.

Procera Research Projects; Procera Research Projects 1993 Abstract Collection; 23 pages; (year of pub. sufficiently earlier than effective US filing date and any foreign priority date) 1993.

Proffit et al.; The first stage of comprehensive treatment alignment and leveling; Contemporary Orthodontics, 3rd Ed.; Chapter 16; Mosby Inc.; pp. 534-537; (year of pub. sufficiently earlier than effective US filing date and any foreign priority date) 2000.

Proffit et al.; The first stage of comprehensive treatment: alignment and leveling; Contemporary Orthodontics; (Second Ed.); Chapter 15, MosbyYear Book; St. Louis, Missouri; pp. 470-533 Oct. 1993.

Raintree Essix & ARS Materials, Inc., Raintree Essix, Technical Magazine Table of contents and Essix Appliances, 7 pages; retrieved from the internet (http://www.essix.com/magazine/defaulthtml) on Aug. 13, 1997.

Redmond et al.; Clinical Implications of Digital Orthodontics; American Journal of Orthodontics and Dentofacial Orthopedics; 117(2); pp. 240-242; Feb. 2000.

Rekow et al.; CAD/CAM for Dental Restorations—Some of the Curious Challenges; IEEE Transactions on Biomedical Engineering; 38(4); pp. 314-318; Apr. 1991.

Rekow et al.; Comparison of Three Data Acquisition Techniques for 3-D Tooth Surface Mapping; Annual International Conference of the IEEE Engineering in Medicine and Biology Society; 13(1); pp. 344-345 (year of pub. sufficiently earlier than effective US filing date and any foreign priority date) 1991.

Rekow; A Review of the Developments in Dental CAD/CAM Systems; Current Opinion in Dentistry; 2; pp. 25-33; Jun. 1992.

Rekow; CAD/CAM in Dentistry: A Historical Perspective and View of the Future; Journal Canadian Dental Association; 58(4); pp. 283, 287-288; Apr. 1992.

Rekow; Computer-Aided Design and Manufacturing in Dentistry: A Review of the State of the Art; Journal of Prosthetic Dentistry; 58(4); pp. 512-516; Dec. 1987.

Rekow; Dental CAD-CAM Systems: What is the State of the Art?; The Journal of the American Dental Association; 122(12); pp. 43-48; Dec. 1991.

Rekow; Feasibility of an Automated System for Production of Dental Restorations, Ph.D. Thesis; Univ. of Minnesota, 250 pages, Nov. 1988.

Richmond et al.; The Development of the PAR Index (Peer Assessment Rating): Reliability and Validity.; The European Journal of Orthodontics; 14(2); pp. 125-139; Apr. 1992.

Richmond et al.; The Development of a 3D Cast Analysis System; British Journal of Orthodontics; 13(1); pp. 53-54; Jan. 1986.

Richmond; Recording The Dental Cast In Three Dimensions; American Journal of Orthodontics and Dentofacial Orthopedics; 92(3); pp. 199-206; Sep. 1987.

Rudge; Dental Arch Analysis: Arch Form, A Review of the Literature; The European Journal of Orthodontics; 3(4); pp. 279-284; Jan. 1981.

Sakuda et al.; Integrated Information-Processing System In Clinical Orthodontics: An Approach with Use of a Computer Network System; American Journal of Orthodontics and Dentofacial Orthopedics; 101(3); pp. 210-220; 20 pages; (Author Manuscript) Mar. 1992.

Schellhas et al.; Three-Dimensional Computed Tomography in Maxillofacial Surgical Planning; Archives of Otolaryngology—Head and Neck Surgery; 114(4); pp. 438-442; Apr. 1988.

Schroeder et al.; Eds. The Visual Toolkit, Prentice Hall PTR, New Jersey; Chapters 6, 8 & 9, (pp. 153-210,309-354, and 355-428; (year of pub. sufficiently earlier than effective US filing date and any foreign priority date) 1998.

Shilliday; Minimizing finishing problems with the mini-positioner; American Journal of Orthodontics; 59(6); pp. 596-599; Jun. 1971.

Shimada et al.; Application of optical coherence tomography (OCT) for diagnosis of caries, cracks, and defects of restorations; Current Oral Health Reports; 2(2); pp. 73-80; Jun. 2015.

Siemens; CEREC—Computer-Reconstruction, High Tech in der Zahnmedizin; 15 pagesl; (Includes Machine Translation); (year of pub. sufficiently earlier than effective US filing date and any foreign priority date); 2004.

(56) References Cited

OTHER PUBLICATIONS

Sinclair; The Readers' Corner; Journal of Clinical Orthodontics; 26(6); pp. 369-372; 5 pages; retrived from the internet (http://www.jco-online.com/archive/print_article.asp?Year=1992&Month=06&ArticleNum=); Jun. 1992.
Sirona Dental Systems GmbH, CEREC 3D, Manuel utiiisateur, Version 2.0X (in French); 114 pages; (English translation of table of contents included); (year of pub. sufficiently earlier than effective US filing date and any foreign priority date); 2003.
Stoll et al.; Computer-aided Technologies in Dentistry; Dtsch Zahna'rzti Z 45, pp. 314-322; (English Abstract Included); (year of pub. sufficiently earlier than effective US filing date and any foreign priority date) 1990.
Sturman; Interactive Keyframe Animation of 3-D Articulated Models; Proceedings Graphics Interface '84; vol. 86; pp. 35-40; May-Jun. 1984.
The American Heritage, Stedman's Medical Dictionary; Gingiva; 3 pages; retrieved from the interent (http://reference.com/search/search?q=gingiva) on Nov. 5, 2004.
The Dental Company Sirona: Cerc omnicam and cerec bluecam brochure: The first choice in every case; 8 pages; (year of pub. sufficiently earlier than effective US filing date and any foreign priority date) 2014.
THORLABS; Pellin broca prisms; 1 page; retrieved from the internet (www.thorlabs.com); Nov. 30, 2012.
Tiziani et al.; Confocal principle for macro and microscopic surface and defect analysis; Optical Engineering; 39(1); pp. 32-39; Jan. 1, 2000.
Truax; Truax Clasp-Less(TM) Appliance System; The Functional Orthodontist; 9(5); pp. 22-24, 26-28; Sep.-Oct. 1992.
Tru-Tatn Orthodontic & Dental Supplies, Product Brochure, Rochester, Minnesota 55902, 16 pages; (year of pub. sufficiently earlier than effective US filing date and any foreign priority date) 1996.
U.S. Department of Commerce, National Technical Information Service, Holodontography: An Introduction to Dental Laser Holography; School of Aerospace Medicine Brooks AFB Tex; Mar. 1973, 40 pages; Mar. 1973.
U.S. Department of Commerce, National Technical Information Service; Automated Crown Replication Using Solid Photography SM; Solid Photography Inc., Melville NY,; 20 pages; Oct. 1977.
Vadapalli: Minimum intensity projection (MinIP) is a data visualization; 7 pages; retrieved from the internet (https://prezi.com/tdmttnmv2knw/minimum-intensity-projection-minip-is-a-data-visualization/) on Sep. 6, 2018.
Van Der Linden et al.; Three-Dimensional Analysis of Dental Casts by Means of the Optocom; Journal of Dental Research; 51(4); p. 1100; Jul.-Aug. 1972.
Van Der Linden; A New Method to Determine Tooth Positions and Dental Arch Dimensions; Journal of Dental Research; 51(4); p. 1104; Jul.-Aug. 1972.
Van Der Zel; Ceramic-Fused-to-Metal Restorations with a New CAD/CAM System; Quintessence International; 24(A); pp. 769-778; (year of pub. sufficiently earlier than effective US filing date and any foreign priority date); 1993.
Van Hilsen et al.; Comparing potential early caries assessment methods for teledentistry; BMC Oral Health; 13(16); doi: 10.1186/1472-6831-13-16; 9 pages; Mar. 2013.
Varady et al.; Reverse Engineering Of Geometric Models'An Introduction; Computer-Aided Design; 29(4); pp. 255-268; 20 pages; (Author Manuscript); Apr. 1997.
Verstreken et al.; An Image-Guided Planning System for Endosseous Oral Implants; IEEE Transactions on Medical Imaging; 17(5); pp. 842-852; Oct. 1998.
Warunek et al.; Physical and Mechanical Properties of Elastomers in Orthodonic Positioners; American Journal of Orthodontics and Dentofacial Orthopedics; 95(5); pp. 388-400; 21 pages; (Author Manuscript); May 1989.
Warunek et.al.; Clinical Use of Silicone Elastomer Applicances; JCO; 23(10); pp. 694-700; Oct. 1989.
Watson et al.; Pressures recorded at te denture base-mucosal surface interface in complete denture wearers; Journal of Oral Rehabilitation 14(6); pp. 575-589; Nov. 1987.
Wells; Application of the Positioner Appliance in Orthodontic Treatment; American Journal of Orthodontics; 58(4); pp. 351-366; Oct. 1970.
Williams; Dentistry and CAD/CAM: Another French Revolution; J. Dent. Practice Admin.; 4(1); pp. 2-5 Jan./Mar. 1987.
Williams; The Switzerland and Minnesota Developments in CAD/CAM; Journal of Dental Practice Administration; 4(2); pp. 50-55; Apr./Jun. 1987.
Windmiller et al.; Wearable electrochemical sensors and biosensors: a review; Electroanalysis; 25(1); pp. 29-46; Jan. 2013.
Wishan; New Advances in Personal Computer Applications for Cephalometric Analysis, Growth Prediction, Surgical Treatment Planning and Imaging Processing; Symposium: Computerized Facial Imaging in Oral and Maxilofacial Surgery; p. 5; Presented on Sep. 13, 1990.
Wolf; Three-dimensional structure determination of semi-transparent objects from holographic data; Optics Communications; 1(4); pp. 153-156; Sep. 1969.
WSCG'98—Conference Program, The Sixth International Conference in Central Europe on Computer Graphics and Visualization '98; pp. 1-7; retrieved from the Internet on Nov. 5, 2004, (http://wscg.zcu.cz/wscg98/wscg98.htm); Feb. 9-13, 1998.
Xia et al.; Three-Dimensional Virtual-Reality Surgical Planning and Soft-Tissue Prediction for Orthognathic Surgery; IEEE Transactions on Information Technology in Biomedicine; 5(2); pp. 97-107; Jun. 2001.
Yamamoto et al.; Optical Measurement of Dental Cast Profile and Application to Analysis of Three-Dimensional Tooth Movement in Orthodontics; Front. Med. Bioi. Eng., 1(2); pp. 119-130; (year of pub. sufficiently earlier than effective US filing date and any foreign priority date); 1988.
Yamamoto et al.; Three-Dimensional Measurement of Dental Cast Profiles and Its Applications to Orthodontics; Conf. Proc. IEEE Eng. Med. Biol. Soc.; 12(5); pp. 2052-2053; Nov. 1990.
Yamany et al.; A System for Human Jaw Modeling Using Intra-Oral Images; Proc. of the 20th Annual Conf. of the IEEE Engineering in Medicine and Biology Society; vol. 2; pp. 563-566; Oct. 1998.
Yoshii; Research on a New Orthodontic Appliance; The Dynamic Positioner (D.P.); 111. The General Concept of the D.P. Method and Its Therapeutic Effect, Part 1, Dental and Functional Reversed Occlusion Case Reports; Nippon Dental Review; 457; pp. 146-164: 43 pages; (Author Manuscript); Nov. 1980.
Yoshii; Research on a New Orthodontic Appliance: The Dynamic Positioner (D.P.); I. The D.P. Concept and Implementation of Transparent Silicone Resin (Orthocon); Nippon Dental Review; 452; pp. 61-74; 32 pages; (Author Manuscript); Jun. 1980.
Yoshii; Research on a New Orthodontic Appliance: The Dynamic Positioner (D.P.); II. The D.P. Manufacturing Procedure and Clinical Applications; Nippon Dental Review; 454; pp. 107-130; 48 pages; (Author Manuscript); Aug. 1980.
Yoshii; Research on a New Orthodontic Appliance: The Dynamic Positioner (D.P.); III—The General Concept of the D.P. Method and Its Therapeutic Effect, Part 2. Skeletal Reversed Occlusion Case Reports; Nippon Dental Review; 458; pp. 112-129; 40 pages; (Author Manuscript); Dec. 1980.
Zhou et al.; Biofuel cells for self-powered electrochemical biosensing and logic biosensing: A review; Electroanalysis; 24(2); pp. 197-209; Feb. 2012.
Zhou et al.; Bio-logic analysis of injury biomarker patterns in human serum samples; Talanta; 83(3); pp. 955-959; Jan. 15, 2011.

\* cited by examiner

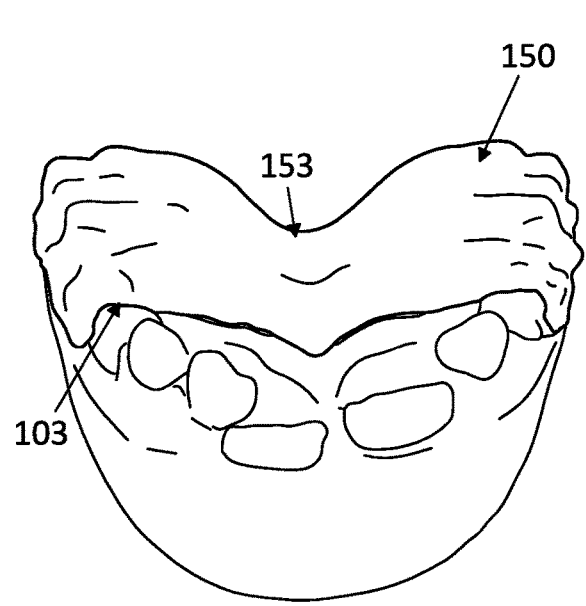 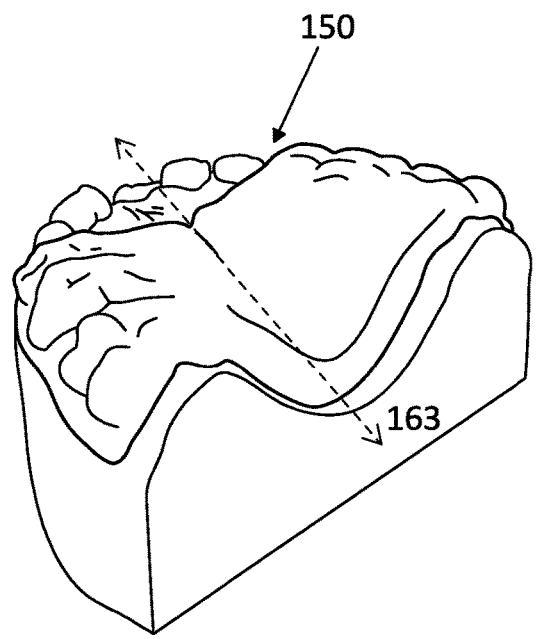
FIG. 1A  FIG. 1B
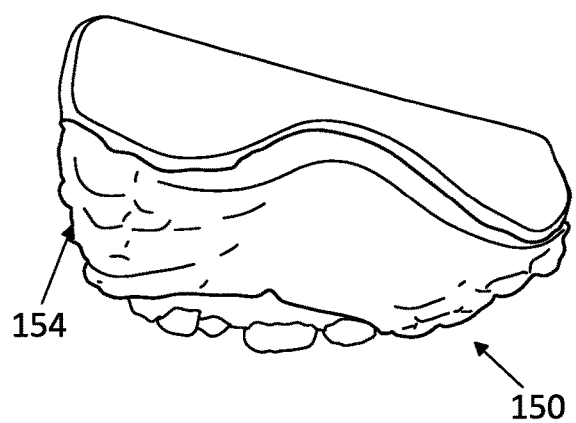 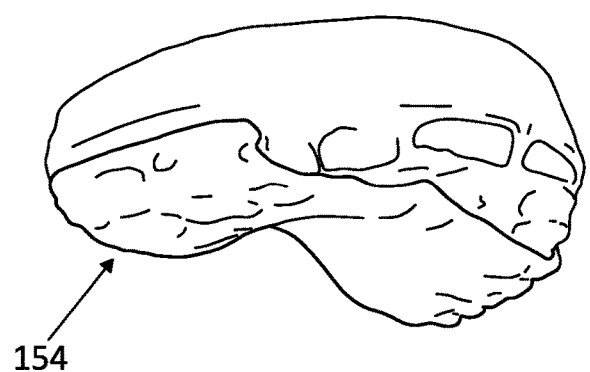
FIG. 1C  FIG. 1D

ATTACHMENT TEMPLATE

ACTIVE EXPANDERS

PASSIVE HOLDER (RETAINER)

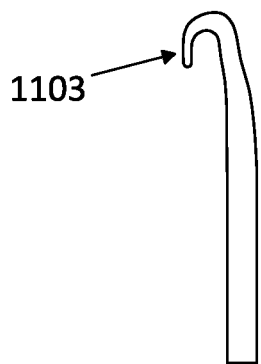
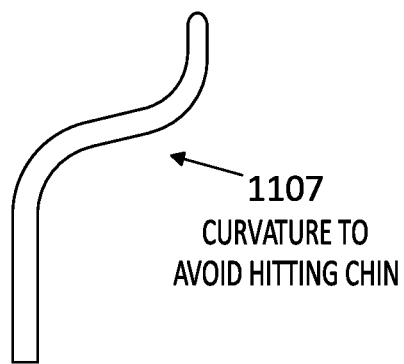
FIG. 11A
FIG. 11B
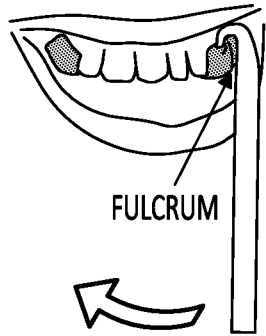
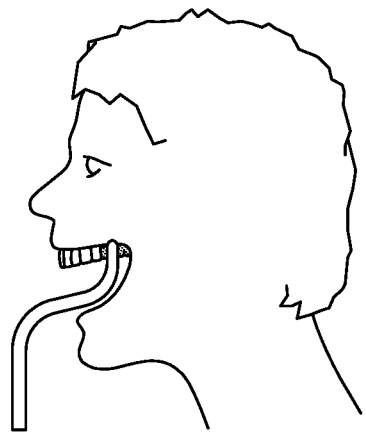
FIG. 11C
FIG. 11D
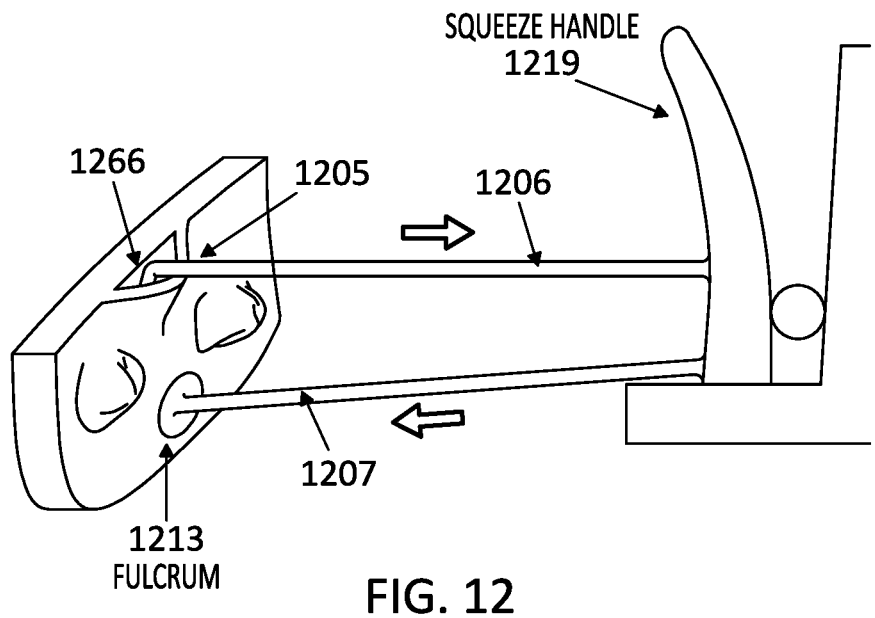
FIG. 12

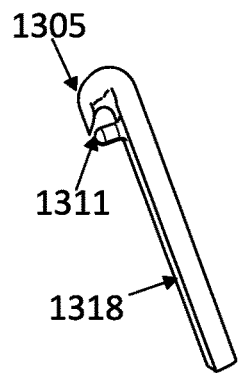
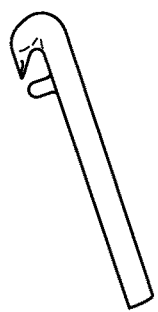
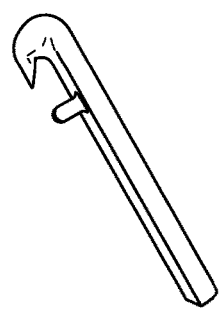
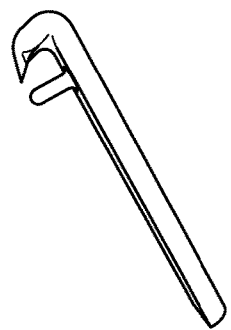
FIG. 13A     FIG. 13B     FIG. 13C     FIG. 13D
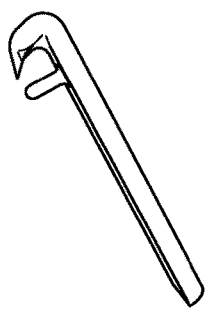
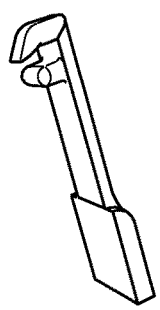
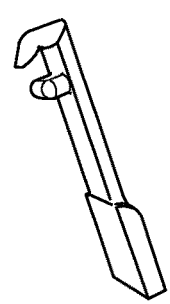
FIG. 13E     FIG. 13F     FIG. 13G
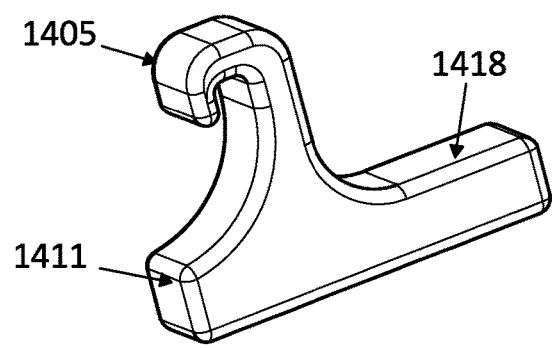
FIG. 14A

PALATE

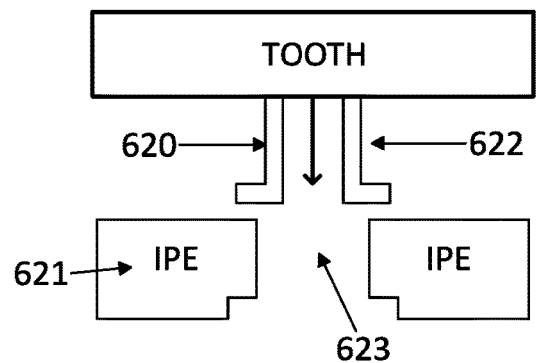
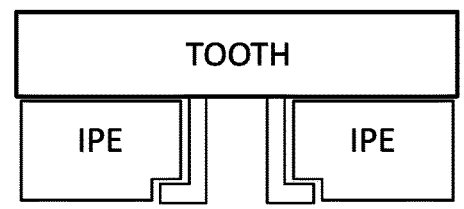
FIG. 22C
FIG. 22D
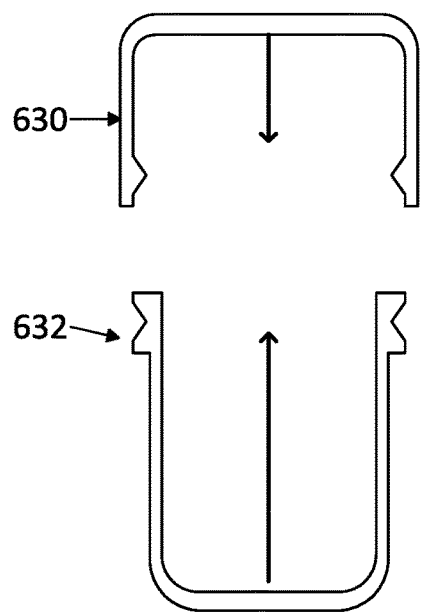
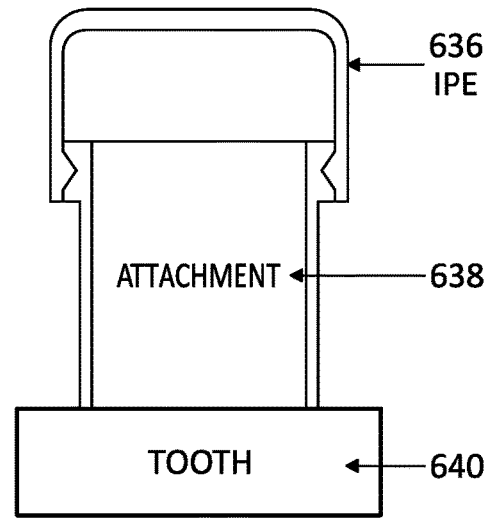
FIG. 22E
FIG. 22F

RELEASABLE PALATAL EXPANDERS

CROSS REFERENCE TO RELATED APPLICATIONS

This patent application claims priority to U.S. Provisional Patent Application No. 62/656,289, filed on Apr. 11, 2018, titled "RELEASABLE PALATAL EXPANDERS," and to U.S. Provisional Patent Application No. 62/735,658, filed on Sep. 24, 2018, titled "RELEASABLE PALATAL EXPANDERS," each of which is herein incorporated by reference in its entirety.

This patent application may also be related to U.S. patent application Ser. No. 15/831,159, titled "PALATAL EXPANDERS AND METHODS OF EXPANDING A PALATE," filed on Dec. 4, 2017, which claims priority to U.S. Provisional Patent Application No. 62/429,692, filed on Dec. 2, 2016 (titled "METHODS OF FABRICATING PALATAL EXPANDERS"), and U.S. Provisional Patent Application No. 62/542,750, filed on Aug. 8, 2017 (titled "PALATAL EXPANDERS AND METHODS OF EXPANDING A PALATE"), each of which is herein incorporated by reference in its entirety.

This application may be related to US Patent Application Publication No. 2016/0081768 (titled "ARCH EXPANDING APPLIANCE") and US Patent Application Publication No. 2016/0081769 (titled "ARCH ADJUSTMENT APPLIANCE"), each of which is herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The technical field relates to removable palatal expanders, methods of making and methods of using and/or removing palatal expanders.

BACKGROUND

A variety of orthodontic problems are linked with a narrow palate. In certain circumstances the maxilla of a patient is not sized to accommodate the patient's upper teeth. In other cases there is room for the upper teeth but the palate is so narrow that speech is impaired or made difficult. In other cases the palate is so high that it cuts down on the amount of air that can pass through the nose, so that deep breathing, without opening the mouth, is almost impossible. In all of these cases, palate expansion, including applying forces to separate, widen, and/or spread the maxilla, may be helpful.

While many conventional palatal expanders exist to separate, widen, spread, etc. a patient's maxilla, these appliances are often difficult to remove. As an example, many palatal expanders, when inserted in a patient's palate, exert a significant force on the patient's palate and/or arch. Due to these and other factors, it is often difficult to remove a palatal expander from a patient's mouth. These issues may persist for adult patients, but also apply to pediatric patients, patients who are less coordinated than an ordinary adult patient, or patient's whose palatal expander is removed by a caretaker, such as a parent. In addition, traditional technique of forming attachments on the patient's crowns utilizes thermoformed attachment templates and may be limited on the geometries that can be formed.

SUMMARY OF THE DISCLOSURE

Described herein are palatal expander apparatuses (including device and systems) that can be easily removed from a patient's mouth. Also described herein are removal tools that can be used to remove a palatal expander from a patient's mouth. The systems and techniques described herein allow a palatal expander to be easily removed (e.g., dismounted) from a patient's palate even when the palatal expander is attached to one or more attachments on the patient's teeth and/or palate. The implementations described herein may include a palatal expander (and/or series of palatal expanders) that include a breach region. A "breach region," as used herein, may refer to a region of a structure configured to facilitate breaking, bending, deformation, etc. of the structure through materials, geometry, location, and/or other properties of the breach region. In some implementations, the breach region may comprise a region of materials that are different from the materials used to form the rest of the palatal expander. Materials used to form a breach region may be softer, more brittle, or sufficiently different from materials used to form the rest of a palatal expander so that the palatal expander may be broken, bent, deformed, etc. at the breach region. In some implementations, a breach region may have a different contour or geometry than other regions of the palatal expander so that the palatal expander may be broken, bent, deformed, etc. at the breach region.

A breach region may be strategically placed at locations of a palatal expander that absorb removal forces placed on the palatal expander. As an example, a breach region may be strategically placed on the other side of a fulcrum formed between the breach region and an edge of the palatal expander used to remove the palatal expander from a palate. A breach region may absorb a removal energy generated through a removal force more effectively than other areas of the palatal expander. A break, bend, deformation, etc. of the breach regions may cause a sufficient force to remove the palatal expander from a patient's palate. As noted further herein, the side or edge of the palatal expander may have one or more detachment regions that may include one or more edge geometries that interface with one or more expander removal tools (including fingers, tools with hooks and/or other structures). The edge geometries may facilitate transfer of a removal force to the breach regions through fulcrums and/or other structures. In some implementations, the edge geometries are on the buccal side of any of tooth engagement regions. The removal force may, but need not, comprise a "pulling force," that is a force moving in a direction away from a patient's dentition. In some implementations, the force may cause the breach region to "predictably" bend, break, deform, etc., or break according to a substantially predictable manner and/or in a substantially predicable arrangement.

Methods of removing a palatal expander having breach regions are disclosed herein. Methods of designing and/or manufacturing a palatal expander with breach regions are also disclosed herein.

In some implementations, the apparatuses (such as devices and systems) are used with progressive expansion of a palate of a patient with a series of palatal expanders. Provided herein are methods and apparatuses (including systems and devices) for progressive palatal expansion.

These palatal expanders may be adapted for comfort, efficacy and/or for ease of removal. For example described herein are systems for palatal expansion that may include a series of incremental expanders including a first incremental expander having a geometry selected to expand the palate, one or more intermediate expanders having geometries selected to progressively expand the palate to a target desired breadth.

Typically, palatal expanders have been described as preformed devices having a first molar-engaging (or molar/premolar-engaging) region adapted to engage upper molars on a first side of the upper jaw, a second molar-engaging (or molar/premolar-engaging) region adapted to engage upper molars on a second side of the upper jaw and palatal region with a geometry configured to fit adjacent to the shape of the palate while providing lateral force to incrementally expand the palate. The palatal expanders may be referred to as simply "expanders" or "palatal expander apparatuses" for convenience. Each of the palatal expanders in a series of expanders may comprise two molar regions (which may also be configured to include premolars), one on each side, each with one or more cavities, each cavity being adapted to fit over one of the patient's molars (or molars and/or premolars). In an embodiment each molar region may comprise two (or more) cavities that are configured to fit over two (or more) posterior molars or premolars. Each palatal expander may include a palatal region, which separates the two molar regions and fits against the patient's palate. Typically, the distance between the molar regions in the series of expanders is sequentially greater, in the order that they are to be worn.

The palatal region of the device may provide force to stretch or expand the mid-palatal region. Although energy-enhancing features may be placed in this region (e.g., springs and thermally active materials), in addition, this region may include one or more adaptations, such as struts, supports, cross-beams, ribs, gaps/windows, attachments, and the like which may distribute the forces applied in a more nuanced manner than previously described. For example, these devices may be configured so that the forces applied are distributed in a predetermined and/or desired pattern by arranging one or more points of contact between the palatal expander and the patient's mouth (e.g., in the gingiva and/or preferably along an upper or lower lateral portion of the patient's teeth, including their molars). The curvature (e.g., concavity) of the device may also be adjusted, to distribute the forces applied, while allowing clearance between the palate and the device, and/or allowing clearance for the user's tongue.

Any of the palatal expander apparatuses (e.g., devices, systems, etc.) for expanding a patient's palate described herein may include one or more locks. Locks may secure the palatal expander to the patient's teeth by locking the buccal side of the palatal expander to one or more attachments bonded to the teeth, allowing the lateral force from the palatal expander to apply the proper expansion force to the upper palate in the proper region. The locks may be manually unlocked, e.g., by actuating a control (e.g., tab, etc.) or otherwise applying a release force to disengage the lock. Multiple locks may be used, and may operate to keep the lateral force from disengaging the palatal expander until the locks are unlocked.

For example, a palatal expander (e.g., a palatal expander system) may include: a palatal expander having a first tooth engagement region, a second tooth engagement region and a palatal region connecting the first and second tooth engagement regions and configured to apply a lateral force between the first tooth engagement region and the second tooth engagement region; a plurality of attachment coupling regions on the buccal sides of the first tooth engagement region and the second tooth engagement region; a plurality of locks, wherein each attachment coupling region of the plurality of attachment coupling regions is associated with a lock of the plurality of lock, further wherein each lock is configured to engage with an attachment within the attachment coupling region to lock the palatal expander onto the patient's teeth.

The attachment coupling regions may be recesses, openings, or the like into or through the palatal expander for engaging with one or more attachments bonded to the teeth. For example, the attachment coupling regions may be windows (e.g., attachment windows) through the buccal side of the palatal expander.

The locks may generally include a release control that engages with a stay. The release control may be on the palatal expander and the stay may be on the attachment, or the stay may be on the palatal expander and the release control on the attachment. For example, the lock may include a release control comprising a latch, lever, switch, hook, tab, arm, snap, bar, pin, etc. that engages, through the attachment coupling region with a stay (e.g., a channel, hollow, check, cleat, catch, clasp, hasp, protrusion, etc.).

For example, a palatal expander system for expanding a patient's palate may include: a palatal expander comprising a first tooth engagement region, a second tooth engagement region and a palatal region connecting the first and second tooth engagement regions and configured to apply a lateral force between the first tooth engagement region and the second tooth engagement region; a first attachment coupling region on a buccal side of the first tooth engagement region; a first lock on the buccal side of the first tooth engagement region, wherein the first lock comprises a first release control configured to extend into the first attachment coupling region to engage with a stay on a first attachment within the first attachment coupling region to lock the palatal expander onto the patient's teeth until the first lock is released; a second attachment coupling region on a buccal side of the second tooth engagement region; and a second lock on the buccal side of the second tooth engagement region, wherein the second lock comprises a second release control configured to extend into the second attachment coupling region to engage with a stay on an second attachment within the second attachment coupling region to lock the palatal expander onto the patient's teeth. The palatal expander system may also include the attachments, e.g., the first attachment and the second attachment, wherein the first attachment and the second attachment are configured to be bonded to the patient's teeth.

The stay on each of the first attachment and the second attachment may comprise one or more of a: channel, hollow, check, cleat, catch, clasp, and hasp. The first and second release controls may each comprises one or more of a: latch, lever, switch, tab, hook, arm, snap, prong, bar, and pin. For example, the first release control may comprise a latch configured to slide into a channel in the stay of the first attachment. In some examples, the first release control comprises a hook configured to engage the stay of the first attachment. In any of these examples, the first release control may comprise one or more flexible protrusions. The first release control may comprise a locked configuration in which the first release control extends into the first attachment coupling region and an unlocked configuration in which the first release control is retracted from the first attachment coupling region.

The first and second locks may be symmetrically arranged on the palatal expander about a midline through the palatal expander, wherein the palatal expander is symmetrical about the midline A palatal expander system for expanding a patient's palate may include a palatal expander comprising: a first tooth engagement region, a second tooth engagement region and a palatal region connecting the first and second tooth engagement regions and configured to apply a lateral force between the first tooth engagement region and the second tooth engagement region; a plurality of attachment coupling regions on a buccal side of the first tooth engagement region and the second tooth engagement region; a plurality of locks on the buccal side of the first tooth engagement region and the second tooth engagement region, wherein each lock comprises a release control having a locked configuration in which the release control extends into an attachment coupling region of the plurality of attachment coupling regions and an unlocked configuration in which the release control is retracted from the attachment coupling region; and a plurality of attachments, wherein each attachment in the plurality of attachment comprises a stay configured to engage with the release control in the locked configuration to lock the palatal expander onto the patient's teeth.

A series of palatal expanders as described herein may be configured to expand the patient's palate by a predetermined distance (e.g., the distance between the molar regions of one expander may differ from the distance between the molar regions of the prior expander by not more than 2 mm, by between 0.1 and 2 mm, by between 0.25 and 1 mm, etc.) and/or by a predetermined force (e.g., limiting the force applied to less than 180 Newtons (N), to between 8-200 N, between 8-90 N, between 8-80 N, between 8-70 N, between 8-60 N, between 8-50 N, between 8-40 N, between 8-30 N, between 30-60 N, between 30-70 N, between 40-60 N, between 40-70 N, between 60-200 N, between 70-180 N, between 70-160 N, etc., including any range there between).

In any of the apparatuses described herein (and methods of fabricating them), the expanders may be formed out of a polymeric (e.g., acrylic, thermoplastics, thermosets, etc.) and/or a metal material, including stainless steel, nickel titanium, copper nickel titanium, etc. Any of these apparatuses may be formed by 3D printing and/or by a lamination process, in which the apparatuses are formed for layers of material that may be formed and/or adhered together (e.g., to form a unitary device); different layers may have different mechanical and/or chemical properties, and may include different thicknesses or regions of thickness. For example, an apparatus may include laminated materials that are bonded together.

Also described herein are apparatuses and method of forming them by direct fabrication techniques. For example, an apparatus (including a series of palatal expanders) may be digitally designed and fabricated by a direct printing (e.g., 3D printing); alternatively or additionally the fabrication method may include 3D printing of models of the teeth, gingiva and palate that have been digitally configured to form one or more of the series applying the palatal expansion.

Also described herein are methods of expanding the palate of a patient using any of the apparatuses described herein, which may include positioning each expander in a series of expanders in position to expand the palate, leaving the expander in position for a period of time and replacing the expander with the next expander in the series until the desired palatal expansion has occurred and then applying a palatal expander that is configured to retain the palate in the final position at the target desired breadth.

In general, the palatal expanders described herein may be referred to as palatal expander shell apparatuses. The tooth engagement regions (e.g., the molar or molar/premolar engagement regions) may be configured as shells that fit over the patient's teeth, as described above.

Any of the palatal expanders described herein may be configured or adapted to enhance removal of the palatal expander. For example, a palatal expander (e.g., palatal expander shell apparatus) for expanding a patient's palate that is configured for ease of removal may include: a pair of tooth engagement regions each extending anteriorly to posteriorly, and configured to be worn over the patient's teeth, wherein the tooth engagement regions each comprise an occlusal side and a buccal side; a palatal region connecting the pair of tooth engagement regions, wherein the palatal region is configured to apply a lateral force between the pair of tooth engagement regions when the apparatus is worn by the patient. In any of these palatal expanders may also include a breach region extending anteriorly to posteriorly, the breach region configured to predictably bend or break when a pulling force is applied to the buccal side of either or both of the pair of tooth engagement regions.

The pair of tooth engagement regions may be the molar (and/or molar/premolar) regions configured to hold the patient's teeth within a pocket, hollow, chamber, region or channel, or a series of interconnected pockets, formed by the molar region of the shell apparatus, to hold the patient's molar/premolar teeth on one side of the patient's mouth. The first tooth engagement region, which may be referred to as a first molar (or molar/premolar) engagement region, may extend from an anterior (e.g., towards the front of the patient's mouth when worn), to a posterior (e.g., towards the back of the patient's mouth when worn) configuration. The first molar (or molar/premolar) engagement region may typically extend anteriorly to posteriorly in the patient's mouth when worn.

The tooth engagement region (e.g., the molar or molar/premolar engagement region may generally each include an occlusal side and a buccal side. The buccal side typically faces outward from the mouth when the apparatus is worn by the patient, over the buccal surface of the molars/premolars. The occlusal surface typically lies adjacent to the occlusal (bite) surface of the teeth. As described above, the pair of tooth engagement regions may be connected by a palatal region connecting the pair of tooth engagement regions and configured to span between them and adjacent to the patient's palate when worn by the patient.

In general, the breach region is a region of lower mechanical strength compared to the mechanical strength of regions adjacent to either side of the breach region. Thus, the palatal expander may preferentially bend or break along the breach region. In general, the breach region may be a line, channel, pattern, etc. that extends from a posterior to an anterior direction. The breach region may extend part of the way from the posterior to anterior direction or all of the way from the anterior to posterior direction along the apparatus. The breach region may be continuous (e.g., as a continuous line or curve) or discontinuous (e.g., a series of lower mechanical strength regions arranged in a line or curve, such as a dashed line, perforation, etc.). The mechanical strength of the breach region may be a fraction of the mechanical strength of the region adjacent to it (e.g., less than about 0.95× the strength, less than about 0.9× the strength, less than about 0.85× the strength, less than about 0.8× the strength, less than about 0.75× the strength, less than about 0.7× the strength, less than about 0.65× the strength, less than about 0.6× the strength, less than about 0.55× the strength, less than about 0.5× the strength, less than about 0.45× the strength, etc.). The lower mechanical strength in the breach may allow it to bend, collapse, give, etc. when force is applied, and particularly a force that is a pull force that is directed (or includes a vector component directed) in a laterally outward direction when the palatal expander is worn by the patient.

For example, the breach region may be a perforated region that is formed by regions (holes, pits, dots, islands, etc.) of lower strength regions that are arranged in a linear (straight line or curved line) arrangement along the apparatus. The lower-strength region(s) may be a crease or channel. The lower-strength regions may be one or more voids within the palatal expander shell apparatus.

In any of the apparatuses and methods described herein, the lower-strength breach region(s) may be formed using a multiple material construction. For example, the breach region(s) may be formed of a more elastic material than the adjacent regions. The application of a pre-determined force to the appliance will therefore cause the breach region to bend and allow the appliance to be removed without requiring substantial additional force. Thus, any of these appliances may include a small amount of an elastic material strategically located at the breach ("hinge") region to assist with the bending. This may be used in addition to, or instead of, using creating a void in the appliance. The apparatus may be configured so that the elastic material in the breach region may return to its original (unbent) shape after bending.

The breach region may be arranged along one or both tooth engagement regions, and/or they may be arranged along the palatal region. More than one breach region may be included, such as a first breach region along the occlusal side of a first tooth engagement region, and/or a second breach region along the occlusal side of a second tooth engagement region and/or a palatal breach region along the palatal region. For example, the breach region may extend across the occlusive side of one of the pair of tooth engagement regions. As mentioned, the breach regions may be arranged in an anterior to posterior (e.g., anteriorly to posteriorly) pattern.

In some variations, the breach region is configured to form a hinge or hinge region. Alternatively or additionally, the breach region may be configured to break when a pulling force of greater than a predetermined breaking value is applied to the buccal side of one of the pair of tooth engagement regions in a laterally outward direction. Thus, in some variations, the breach region may be configured to bend in a hinged manner when a pulling force of greater than a predetermined value (e.g., predetermined bending value) is applied to the buccal side of one of the pair of tooth engagement regions in a laterally outward direction.

The predetermined bending or breaking value may be set to a value that is within the pulling force that may be applied by a human hand/finger, or that may be reasonably applied by a tool for removing the apparatus, as described in greater detail below. For example, the predetermined bending or breaking value may be about 5 N or more, about 6 N or more about 7 N or more about 8 N or more, about 9 N or more about 10 N or more, about 11 N or more, about 12 N or more, about 15 N or more, about 20 N or more, between about 5 N and 100 N, between about 7.5 N and 100 N, between about 10 N and 100 N, etc.

In some variations, the breach region is configured to preferentially break (or break along at least a portion of the length). In other variations, the breach region is configured to preferentially bend along at least a portion of the length. In some variations the breach region may be configured to initially bend at a first predetermined bending value, then to break at a second (e.g., higher) predetermined breaking value.

The breach region may be marked or visible. In some variations the breach region is marked to show the line for bending and/or breakage by a different color, texture, crease, etc. In some variations, the breach region is not visible.

The breach region may extend completely across the length of the palatal expander, or just partially along the length (e.g., the anterior to posterior length) of the palatal expander, e.g., from the front of the patient's mouth toward the back of the patient's mouth. For example, the breach region may extend from an anterior end of the palatal expander shell apparatus to a posterior end of the palatal expander shell apparatus. Alternatively, in some variations, the breach region may along just a portion of the anterior-to-posterior length.

Any of the palatal expanders described herein may include a plurality of attachment regions each configured to couple to an attachment bonded to the patient's teeth. The breach region may extends adjacent to one or more of the attachment regions along an anterior to posterior axis.

Any of the palatal expanders described herein may also include one or more detachment regions, e.g., on the buccal side of at least one of the pair of pair of tooth engagement regions, that is configured to receive the pulling force. The detachment region may be configured as a protrusion, cavity, tab, etc. for engaging with a removal tool and/or the user's finger to apply a pulling force having a laterally outward component for removing the palatal expander, typically by bending or breaking the breach region to disengage the palatal expander from the teeth (including from any attachment on the teeth or between the teeth and the palatal expander), so that the palatal expander can be removed. For example a detachment region may be one or more of a slot, ledge, notch, lip, or gap on or adjacent to a lower edge of the buccal side. The detachment region may be sized to receive the tool and/or finger or fingernail. For example, the detachment region may include a pocket, gap, etc. that is between about 1 mm and 15 mm (e.g., between about 1 mm and 12 mm, between about 1 mm and 10 mm, between about 1 mm and 8 mm, between about 1 mm and 5 mm, etc.).

Any of these apparatuses may include one or more (e.g., a plurality of) vertical slots or slits extending from a bottom of the buccal side toward the breach region. These slots or slits may allow a portion of the buccal side (particularly on either side of one or more attachments) to bend or pull away from the gingiva and teeth and to disengage from the one or more attachments.

For example, a palatal expander shell apparatus may be configured to be easily removed for expanding a patient's palate, the apparatus may comprise: a pair of tooth engagement regions each extending anteriorly to posteriorly, and configured to be worn over the patient's teeth, wherein the tooth engagement regions each comprise an occlusal side and a buccal side; a palatal region connecting the pair of tooth engagement regions, wherein the palatal region is configured to apply a lateral force between the pair of tooth engagement regions when the apparatus is worn by the patient; and a breach region extending anteriorly to posteriorly, the breach region having a mechanical strength that is less than the mechanical strength of regions adjacent to either side of the breach region so that the breach region predictably bends or breaks when a pulling force having a laterally outward component is applied to the buccal side of either or both of the pair of tooth engagement regions.

Any of the apparatuses described herein may be adapted to make removing the palatal expander easier without reducing the retention or the ability of the palatal expander to remain held in position on the patient. For example, any of these palatal expanders may include the breach region. Any of these apparatuses may also or alternatively include a detachment region on one or both buccal side of the palatal expander. As mentioned, the detachment region (which may be referred to as a removal grip, a removal cavity, a removal handle, a removal attachment, removal slot, etc.) may include a gap, slot, opening, etc., on an upward- or downward-facing side that may be adapted to allow a user to insert a fingernail and/or removal tool therein to remove the palatal expander from the teeth. The detachment region may be configured to deform or break the breach region and release the palatal expander from the patient's teeth. The detachment region may be configured as a lip, ledge, or protrusion on the buccal side of the palatal expander. The breach region may therefore form a hinge region; in some variations, this hinge region is between the occlusal surface and the buccal side, so that operating the detachment region may pull the buccal side of the palatal expander away from the patient's teeth and/or off of any attachment so that it may be removed. Any of these palatal expanders may include a slit, slot, gap, etc. that extends upward from the edge of the palatal expander toward the occlusal surface on the buccal side permitting all or a portion of the palatal expander to pull upward and disengage from the teeth.

Also described herein are palatal expanders that are adapted for comfort to have a thickness that varies. For example, in any of these variations, the palatal expander may include an inner bottom surface in the palatal arch portion of the palatal expander that faces the patient' tongue when worn that is smooth or flattened compared to the opposite surface (matching the patient's palate where the palatal expander is worn. This tongue-facing side may have a surface that is rounded and does not include any rapid transitions in topology compared with the patient's actual palate. In any of these examples, the apparatuses described herein may have a different (including variable) thickness. In some variations, the apparatus may include a palatal region that is narrower toward the anterior of the palatal expander apparatus. In any of these variations, the poster portion of the palatal expander may be thinner and/or cut away (removed from) the palatal expander, which may prevent or limit gagging.

The palatal expanders described herein may be removed by applying a force (e.g., a pulling force) to cause the breach region to bend and/or break. For example, described herein are methods of removing a palatal expander shell apparatus from a patient's teeth that may include the steps of: applying a pulling force to a buccal side of the palatal expander shell apparatus while a first tooth engagement region is worn on a first portion of the patient's teeth, a second tooth engagement region is worn on a second portion of the patient's teeth, and while a palatal region extending between the first tooth engagement region and the second tooth engagement region is applying a lateral force between the first tooth engagement region and the second tooth engagement region, wherein the pulling force causes a breach region of the palatal expander shell apparatus to break or bend along the breach region and to disengage the palatal expander shell apparatus from the first or second set of the patient's teeth; and removing the palatal expander shell apparatus from the patient's oral cavity.

The pulling force may be any appropriate force, as mentioned above. For example, applying the pulling force comprises applying about 100 N, about 90 N, about 80 N, about 70 N, about 60 N, about 50 N, about 40 N, about 30 N, about 20 N, etc. The pulling force applied may be about 5 N or greater, about 7.5 N or greater, about 8 N or greater, about 10 N or greater, about 12 N or greater, about 15 N or greater, etc. (e.g., between about 5-100 N, etc.). The pulling force applied may refer to the laterally outward component of the force. In general, this laterally outward force may also be directed downward or between the laterally outward (e.g., parallel to the plane of the palatal expander, and/or the plane of the patient's upper palate when worn) and downward (e.g., away from the outer occlusal surface, and/or toward the lower jaw when the palatal expander is worn on the upper jaw). In some variations, the force may be applied in a direction that is between the laterally outward and downward directions when the palatal expander is worn. Applying the pulling force may comprise pulling the buccal side of the palatal expander with a force having a laterally outward force component, or a laterally outward force component and a downward component. For example, applying the pulling force may comprise pulling the edge of the buccal side of the palatal expander.

In general, applying the puling force may cause the breach region to bend or break along the breach region so that the palatal expander shell apparatus disengages from the teeth, including disengaging from one or more attachments between the palatal expander shell apparatus and the patient's teeth. Applying the puling force may cause the breach region to bend along the breach region in a hinged manner. Applying the puling force may cause the breach region to break along the breach region.

The pulling force may be applied by the user manually, using their finer or a tool, such as applying the pulling force comprises using a tool to apply a pulling force. The tool may include a long arm and a fulcrum region that leverages against a portion of the palatal expander. In some variations, applying the pulling force comprises using a fingernail to apply a pulling force. Applying the pulling force may comprise pulling on a detachment region on the buccal side of the palatal expander shell apparatus.

A method of removing a palatal expander shell apparatus from a patient's teeth may include: applying a pulling force to a buccal side of the palatal expander shell apparatus while a first tooth engagement region is worn on a first set of the patient's teeth and a second tooth engagement region is worn on a second set of the patient's teeth, and while a palatal region extending between the first tooth engagement region and the second tooth engagement region is applying a lateral force between the first tooth engagement region and the second tooth engagement region, wherein the pulling force causes a breach region of the palatal expander shell apparatus to break or bend at a predetermined location and disengage from the first or second set of the patient's teeth, wherein the breach region extends anteriorly to posteriorly along the palatal expander shell and comprise one or more regions having a mechanical strength that is less than the material strength of the regions of the palatal expander surrounding to the breach region; and removing the palatal expander shell apparatus from the patient's oral cavity.

Also described herein are methods for forming one or a series of palatal expanders and methods of making and using them in which the palatal expander is configured to include one or more gaps or spacing regions between the patient's upper arch and the upper (e.g., palate-facing) surface of the palatal expander. For example, any of these apparatuses may be configured to include a gap or concave channel or region to prevent impingement near the gingival line (e.g., on the buccal and/or on the lingual side of the apparatus. Any of these apparatuses may be configured to include a gap between the upper (e.g., palate-facing) surface of the palatal expander and the palate.

Methods and apparatuses for performing palatal expansion using any of these apparatuses are also described. For example, described herein are methods an apparatuses for scanning a patient's intraoral cavity (including in particular the upper arch) sufficiently so that the palatal expander apparatuses described herein may be formed.

Methods of applying or attaching the palatal expanders described herein are described, including methods for the patient to apply the palatal expander to her/his own teeth. Also described herein are attachments (which may alternatively be referred to as retaining attachments, retaining posts, etc.) and templates for attaching the attachments to a patient's teeth that may be configured to releasably secure the palatal expander to the patient's teeth. Methods of forming the attachment template, and/or attaching the attachments to the teeth are also described.

Also described herein are methods and apparatuses for removing the palatal expanders from a patient's teeth. For example, described herein are removal tools to assist a person (and particularly, but not limited to, the patient) in removing the palatal expander when secured onto the patient's teeth.

Also described herein are methods of making any of the apparatuses described herein.

For example, described herein are palatal expander apparatuses for expanding a patient's palate. A palatal expander apparatus may include: a pair of tooth engagement regions connected by a palatal region and two or more attachment regions each configured to couple to an attachment bonded to the patient's teeth, wherein the palatal region is configured to apply between 8 and 160 N of force between the pair of tooth engagement regions when worn by the patient; wherein the tooth engagement regions each comprise an occlusal side and a buccal side, further wherein the occlusal side is thinner than the palatal region, and the buccal side is thinner than the occlusal side.

The palatal region may be between about 1-5 mm thick (e.g., between 1.5 to 3 mm, between 2 and 2.5 mm thick, etc.). The occlusal side may have a thickness of between about 0.5-2 mm (e.g., between 0.5 to 1.75 mm, between 0.75 to 1.7 mm, etc.). The buccal side may have a thickness of between about 0.25-1 mm (e.g., between 0.35 and 0.85 mm, between about 0.4 and 0.8 mm, etc.).

As mentioned, any of these apparatuses may include a detachment region on a buccal side of the apparatus to help remove the device once attached to the patient's teeth. The forces being applied to widen the palate may make it difficult to easily remove the apparatus. A buccally-located detachment region (e.g., a notch, gap, handle, tab, slot, etc.) may be used to more easily remove the apparatus from the teeth, particularly when attachments are used to hold the apparatus on the teeth. A detachment region may provide a handle or grip region for applying a pulling force to remove the palatal expander. The detachment region may be on or extend from the buccal side(s) and may be spaced from the patient's gingiva by at least 0.25 to 1 mm when the apparatus is being worn and may be near the bottom edge (or extending from the bottom edge, or over the bottom edge) of the buccal side of the apparatus. For example, the bottom edge of the buccal side may be configured as a detachment region extending from the buccal side of the device, along all or a side (e.g., between 1 mm and 5 cm, e.g. 1 mm to 4 cm, 1 mm to 3 cm, 5 mm to 4 cm, etc.) of the buccal region. The extension may be configured to extend below and away from the patient's gingiva, e.g., to form a gap of between about 0.25-1 mm when the apparatus is worn by a patient. Any of these apparatuses may include one or a plurality of vertical slots or slits extending from a bottom of the buccal side toward the occlusal side. In particular, these slots or slits may be on either side of the detachment region.

Any of these apparatuses may be smoothed on the tongue-facing side of the apparatus. For example, the palatal region may comprise an upper convex surface having a first surface curvature comprising a plurality of grooves and ridges that align with grooves and ridges in the patient's palate; further wherein the palatal region comprises a lower, concave surface having a second surface curvature that is smoother than the first surface curvature. Smoother may mean having fewer and/or less extensive (deep, high) grooves and/or ridges.

Also described herein are methods of making a palatal expander apparatus, the method comprising: receiving a model of a patient's upper arch (e.g., a digital model, a manual model, etc.); and forming a palatal expander having a pair of tooth engagement regions connected by a palatal region and one or more breach regions extending anteriorly. The method may also include forming the palatal expander to include two or more attachment regions each configured to couple to an attachment bonded to the patient's teeth, wherein the tooth engagement regions are each configured to fit over the patient's teeth and each comprise an occlusal side and a buccal side, further wherein the occlusal side comprises a detachment region configured to engage with the patient's fingernail to disengage at least one of the attachment regions from an attachment on the patient's teeth. Forming the apparatus may include forming any of the features described herein, including detachment regions, slits/slots, smoothing the tongue-facing side, forming an opening in the apparatus, varying the thickness of the different regions relative to each other and/or within each region, etc. For example, forming may comprise forming the palatal region by smoothing a bottom surface of the palatal region relative to an opposite top surface of the palatal region.

For example, a method of making a palatal expander apparatus may include: receiving a model of a patient's upper arch; forming a palatal expander having a pair of tooth engagement regions connected by a palatal region and two or more attachment regions each configured to couple to an attachment bonded to the patient's teeth; forming a breach region extending anteriorly to posteriorly one or more of the palatal region, the first tooth engagement region (e.g., along the buccal side, the occlusal side, between the buccal and occlusal side, etc.), the second tooth engagement region (along the buccal side, the occlusal side, between the buccal and occlusal side, etc.). The tooth engagement regions may each be configured to fit over the patient's teeth and each comprise an occlusal side and a buccal side. The method may also include forming a detachment region on the buccal side having a gap that is configured to engage with the patient's fingernail or an elongate tool and to disengage at least one of the attachment regions from an attachment on the patient's teeth.

In any of these methods, the tooth engagement region may comprise an extension of the buccal side of the tooth engagement region that extends from the patient's gingiva to form a gap of between about 0.25-1 mm when the apparatus is worn by a patient. The tooth engagement region may comprise a projection extending from the buccal side of the tooth engagement region. The palatal expander may be configured to contact a lingual side of the patient's teeth when worn by the patient and to apply between 8 and 160 N of force between the tooth engagement regions. The palatal expander may be configured not to contact either or both the gingiva adjacent to a lingual side of the patient's teeth when worn by the patient and the midline of the patient's palate.

The apparatus may be formed in any appropriate manner, including forming comprises forming by three-dimensional (3D) printing. For example, receiving a model of the patient's upper arch may comprise receiving a digital model of the patient's teeth, gingiva and palatal region.

In general, any of these palatal expanders may be configured so that all or a portion (e.g., the mid-palatal region, e.g., configured to be positioned opposite of the suture) is spaced apart from the patient's palate when the device is worn, by some minimum distance, e.g., between 0.01 and 5 mm (e.g., 0.02 mm or greater, 0.03 mm or greater, 0.04 mm or greater, than 0.05 mm or greater, 0.06 mm or greater, 0.07 mm or greater, 0.1 mm or greater, 0.15 mm or greater, 0.2 mm or greater, 0.25 mm or greater, etc.) This minimum distance may be determined when forming the palatal expander by modeling (e.g., from a digital model) the patient's dental arch, including the palatal region. Including this minimal distance may be particularly helpful, for example, to prevent sores or irritation of the soft and/or hard palate when wearing the palatal expander(s).

This space between the palatal-facing surface of the palatal region of the palatal expander and the patient's palate may be referred to as clearance. This spacing may be positive (e.g., forming a gap) or, in some areas of the palate region, negative, e.g., impinging on the patient's palate, in order to provide force to expand the palate. Negative clearance may be identified by comparing an actual or predicted (e.g., for later stages of the expansion treatment) model of the patient's palate with the palatal expander outer (palate-facing) surface. Actual or predated models may be digital (virtual) or casts of the patient's dental arch. In later stages of treatment, the clearance may be estimated from a digital model in which the patient's palatal region morphology is predicted by morphing the palatal region r to reflect the treatment progression.

For example, contact with soft palate regions of the patient's palate may be avoided by include positive clearance of greater than some minimum (e.g., see above, such as 0.1 mm, 0.2 mm, etc.) in regions configured to be worn opposite of the soft palatal region). In general, any of these apparatuses may be configured so that the mid palatal regions (e.g., opposite the mid palatal suture) are offset from the patient's palate when worn. In some variations the separation distance may be at a maximum in this mid palatal region. In some variations the separation distance may decrease laterally, and negative clearance (e.g., force-applying contact) may be present laterally. The clearance may vary over a sequence or series of aligners. For example, the initial (early) stages may be configured to have a lower maximum positive clearance than later stages, which may have greater maximum clearance. Any of these apparatuses may have greater positive clearance posterior than anteriorly. In some variations, the maximum positive clearance may taper from a maximum at the mid-palatal region towards the teeth.

For example, in some variations, the palatal region may be configured to have a clearance of greater than 0.1 mm from the patient's mid-palatal region when the device is worn by the patient.

Any of these apparatuses may include two or more attachment regions each configured to couple to an attachment bonded to the patient's teeth. Attachment regions may be openings, pits, slots, channels, or the like for securing to an attachment bonded to the patient's teeth. The attachment regions may be configured to secure to the patient's teeth, but to allow removal of the apparatus from the attachment by flexing a portion (e.g., a detachment region) of the palatal expander, which may be on the buccal side, including extending from the buccal side.

In general, as mentioned above, any of the palatal expanders described herein may include a variable thickness (e.g., transverse thickness perpendicularly between the opposite upper and lower surfaces). For example, the average and/or maximum thickness of the palatal region may be greater than the average or maximum thickness of the occlusal surface (e.g., the side worn against the occlusal surface of the teeth); the average or maximum thickness of the buccal surface (e.g., the side worn against the buccal surface of the teeth) may be less than the average or maximal thickness of the occlusal surface and/or the palatal surface. Alternatively or additionally, in some variations all or a portion of the occlusal surface may be cut away. In general, an anterior portion of the palatal region may have a different average thickness than a posterior portion of the palatal region. For example, the anterior portion of the palatal region may be thinner than a posterior portion of the palatal region; alternatively, the anterior portion of the palatal expander may be thicker than the posterior portion.

As mentioned, any of these apparatuses may include an extension extending from the buccal side of the apparatus, wherein the extension is configured to extend adjacent and away from the patient's gingiva to form a gap of between about 0.25 and 1 mm when the apparatus is worn by a patient. The length of the extension may be determined so that it does not contact the inner cheek surface.

Also described herein are palatal expander systems for expanding a patient's palate. These systems may include any of the palatal expanders described herein. Thus, described herein are systems including any of these apparatuses (and series of these apparatuses). Also described herein are methods of expanding a patient's palate using a series of patient-removable palatal expanders, the method comprising: sequentially wearing each of a plurality of palatal expanders except a last palatal expander from the series of patient-removable palatal expanders in a predetermined sequence of progressively increasing widths, wherein: each palatal expander comprises a pair of tooth engagement regions connected by a palatal region and two or more attachment regions, wherein the tooth engagement regions are worn over the patient's teeth with the attachment regions coupled to attachments on the patient's teeth, wherein at least one of the palatal expanders include a breach region for removal as described herein. Each palatal expander may be worn for between 0.5 and 14 days; and each palatal expander may be removed by applying a pulling force as described herein, to bend or break a breach region to disengage at least one of the attachment regions from the attachment on the patient's teeth. Thus wearing the apparatus may include removing the apparatus for less than some percentage (e.g., 2%, 5%, 7%, 10%, etc.) of the time worn during that period (e.g., for a few minutes to an hour a day, etc.

A method of forming a palatal expander is provided. The method may include: gathering a virtual representation of a palatal surface, the palatal surface having a convex surface geometry, the convex surface geometry configured to mate with a palate of a patient when the palatal expander is inserted into the palate of the patient; gathering a virtual representation of a lingual surface opposite to the palatal surface, the lingual surface having a concave surface geometry configured to provide a gap between a tongue of the patient and the palatal expander when the palatal expander is inserted into the palate; gathering a virtual representation of a plurality of sidewalls surrounding at least a portion of the palatal surface and the lingual surface, the plurality of sidewalls configured to exert a sidewall force against one or more of the palate and a lingual region of teeth of the patient when the palatal expander is inserted into the palate, the plurality of sidewalls having at least one removal structure to receive a removal force; gathering a virtual representation of a body, the body having a first deformation measure corresponding to a substantial first deformation of the body in response to application of a removal force to the removal structure; gathering a virtual representation of one or more breach regions, the one or more breach regions having a second deformation measure corresponding to a substantial second deformation of the one or more breach regions in response to the application of the removal force to the removal structure, the second deformation measure being greater than the first deformation measure; and providing instructions to manufacture the palatal expander using the virtual representation of a palatal surface, the virtual representation of a lingual surface, the virtual representation of the plurality of sidewalls, the virtual representation of the body, and the virtual representation of the one or more breach regions.

Any of the gathering steps may be performed as a single step or as sub-parts of a single step. For example, gathering the virtual representation of the palatal surface, the lingual surface opposite to the palatal surface, and/or the plurality of sidewalls surrounding at least a portion of the palatal surface and the lingual surface may be performed together. Gathering this information may include scanning (e.g., taking a digital scan) of the patient's oral cavity and/or a model (e.g., physical model) of the patient's oral cavity.

A palatal expander may comprise: a palatal surface having a convex surface geometry, the convex surface geometry configured to mate with a palate of a patient when the palatal expander is inserted into the palate of the patient; a lingual surface opposite to the palatal surface, the lingual surface having a concave surface geometry configured to provide a gap between a tongue of the patient and the palatal expander when the palatal expander is inserted into the palate; a plurality of sidewalls surrounding at least a portion of the palatal surface and the lingual surface, the plurality of sidewalls configured to exert a sidewall force against one or more of the palate and a lingual region of teeth of the patient when the palatal expander is inserted into the palate, the plurality of sidewalls having at least one removal structure to receive a removal force; a body having a first deformation measure corresponding to a substantial first deformation of the body in response to application of a removal force to the removal structure; and one or more means for breaching a portion of the palatal expander in response to the removal force, the one or more means for breaching the portion of the palatal expander having a second deformation measure corresponding to a substantial second deformation of the one or more breach regions in response to the application of the removal force to the removal structure, the second deformation measure being greater than the first deformation measure.

Any of the methods of applying and removing the palatal expanders described herein may be configured as a method of applying a palatal expander that includes engaging the palatal expander onto the patient's teeth by placing the one or more attachments into the attachment coupling region(s) and locking the attachments to the palatal expander. The lock may be automatically engaged by driving the attachment into the attachment coupling region, e.g., by driving the release control against the stay; the release control may be biased (e.g., spring loaded) to extend into the attachment coupling region and engage with a stay.

A method of removing a palatal expander shell apparatus from a patient's teeth, wherein the palatal expander shell apparatus comprises a first tooth engagement region, a second tooth engagement region, and a palatal region between the first and second tooth engagement regions applying a lateral force between the first and second tooth engagement regions, may include: unlocking the palatal expander shell apparatus from the first tooth engagement region by disengaging a first lock from a first attachment on the patient's teeth; unlocking the palatal expander shell apparatus from the second tooth engagement region by disengaging a second lock from a second attachment on the patient's teeth; wherein disengaging either or both the first and second locks causes the palatal expander shell apparatus to release from the patient's teeth; and removing the palatal expander shell apparatus from the patient's oral cavity.

Unlocking the palatal expander shell apparatus from the first tooth engagement region may comprise operating a release control on the palatal expander shell to disengage from a stay on the first attachment. For example, operating the release control on the palatal expander shell to disengage from the stay on the first attachment may comprise sliding a latch from one or a channel or cavity in the stay. Operating the release control on the palatal expander shell to disengage from the stay on the first attachment may comprise disengaging a protrusion member from the stay wherein the stay comprises a bracket having a channel.

Disengaging the first lock from a first attachment on the patient's teeth may comprise unsnapping the release control from the stay.

Operating the release control on the palatal expander shell to disengage from the stay on the first attachment may comprise operating a release control comprising one of a: latch, lever, switch, tab, arm, snap, bar, or pin that engages with the stay on the first attachment.

The first lock and the second lock may be disengaged concurrently. Alternatively, the first lock and the second lock may be disengaged separately. The locks may be manually disengaged (e.g., by the patient or caregiver's fingers) and/or using a tool. In some variations disengaging a first lock from a first attachment on the patient's teeth comprises retracting a spring to disengage. Disengaging the first lock from the first attachment on the patient's teeth may comprise applying a disengaging force to the first lock that is less than the lateral force (e.g., less than 30 N, less than 20 N, etc.).

BRIEF DESCRIPTION OF THE DRAWINGS

The novel features of the apparatuses and methods described herein are set forth with particularity in the claims that follow. A better understanding of the features and advantages will be obtained by reference to the following detailed description that sets forth illustrative embodiments, in which the principles of the invention are utilized, and the accompanying drawings of which:

FIGS. 1A-1G illustrate an example of a palatal expander that may be part of a series of palatal expanders used to expand a patient's palate. FIG. 1A is a front perspective view of a bottom side (tongue-facing side) of an example of a palatal expander, shown attached on a model of a patient's upper dental arch. FIG. 1B is a back perspective view of an example of a palatal expander; the dashed line 163 shows a midline of the palatal expander. FIG. 1C is another back perspective view of an example of a palatal expander. FIG. 1D is a front side perspective view of an example of a palatal expander of FIG. 1A. FIG. 1E is a side perspective view of an example of a palatal expander. FIG. 1F is another back perspective view of an example of a palatal expander. FIG. 1G is a top perspective view of an example of a palatal expander, showing the tooth-receiving cavities and the palate-facing top surface.

In FIG. 7A, two detachment regions are shown and each include a protruding fulcrum region.

In FIG. 10A, the removal tool is configured as a ring. The ring can be used on either hand (e.g., may be reversible).

FIGS. 11A-11D illustrate another example of a tool for removal of a palatal expander by applying a pulling force. In FIG. 11A, the tool is shown in a front view. FIG. 11B shows a side view of the tool of 11A. FIG. 11C is an example of a method of using the tool of FIGS. 11A-11B to apply a pulling force to remove a palatal expander worn on a patient's upper arch. FIG. 11D shows another view of the tool being used to remove a palatal expander from a patient.

FIG. 12 illustrates another example of a tool for removal of a palatal expander by applying a pulling force. In FIG. 12, the tool includes a support arm and a pull arm that is actuated by a control on the tool (e.g., a squeeze handle in this example).

FIGS. 13A-13G illustrate examples of removal tools for applying a pulling force to remove a palatal expander. Each of these examples include a support (e.g., fulcrum) arm on the tool that may be braced against the palatal expander to aid in applying the pulling (removal) force.

FIG. 14A illustrates another example of a removal tool for applying force to remove a palatal expander as described herein.

in FIG. 14C, the tool may be used on either the patient's right or left sides.

FIGS. 22C and 22D illustrates a palatal expander having prongs for prolonged snap fit.

FIGS. 22E and 22F illustrates a palatal expander for snap-on fit.

DETAILED DESCRIPTION

Figure 1:
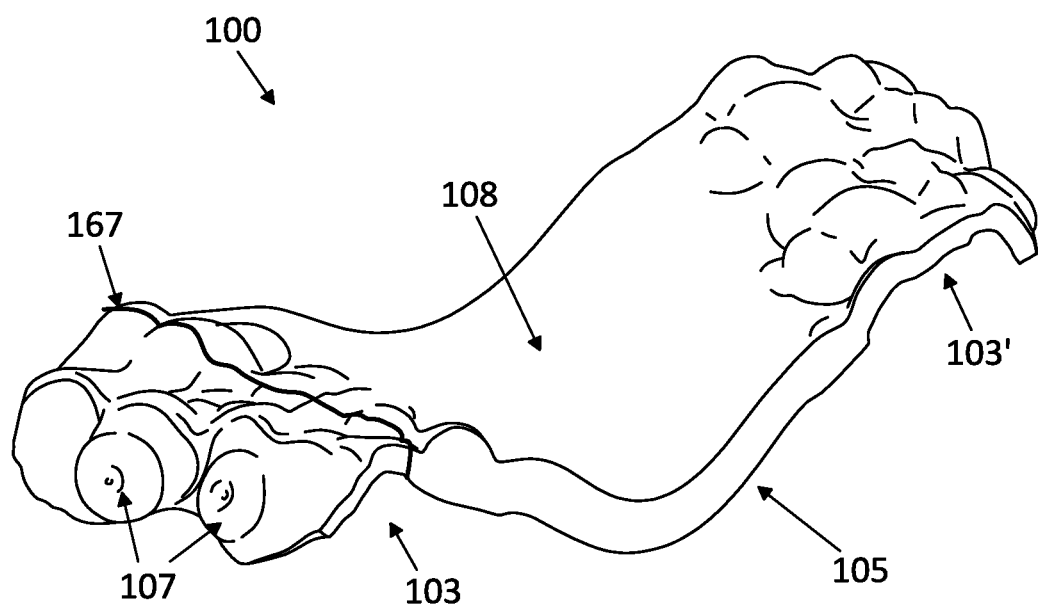
FIG. 1 illustrates one example of a palatal expander including an enclosed attachment that may aid in retention within the oral cavity.
Figure 1E:
Figure 1F:
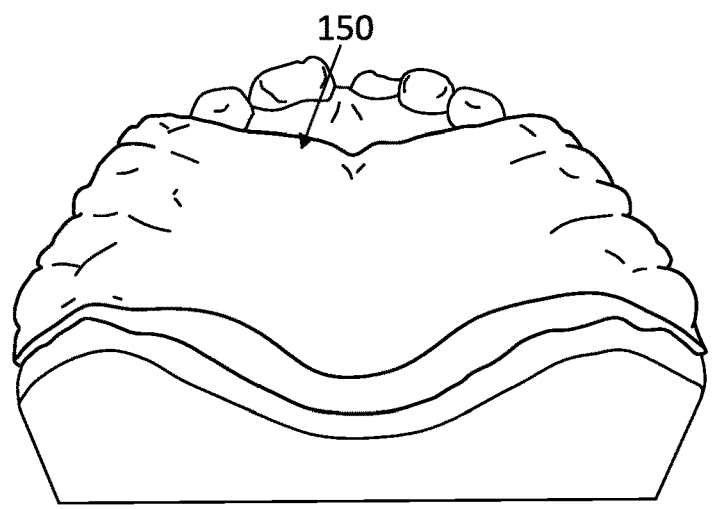
Figure 1G:
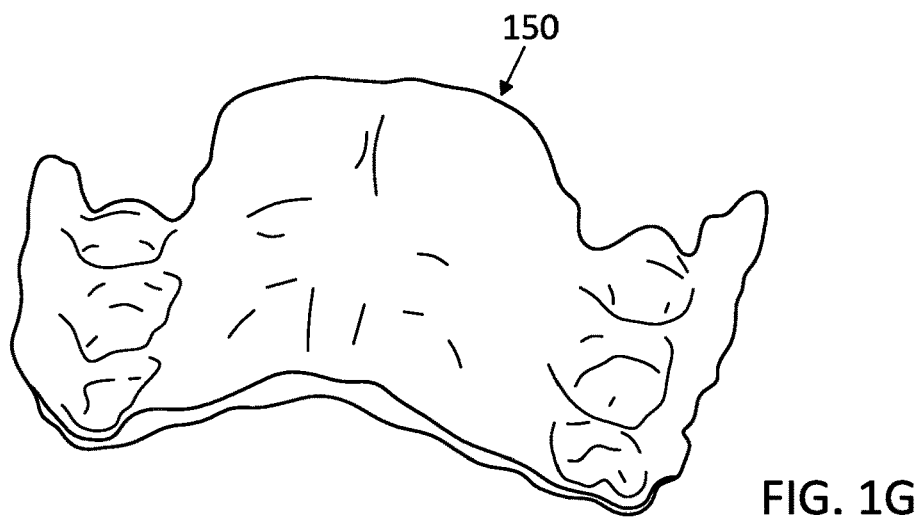

The palatal expansion apparatuses (devices and systems, including palatal expanders) described herein are configured to expand a patient's palate and are typically configured to be removed and/or inserted by the patient or a patient's caregiver (e.g., parent, guardian, etc.). A series of expanders may be worn by a patient to expand the patient's palate over time.

Various properties and characteristics of the inventive palatal expanders are described herein both in general and with reference to specific examples. Any of these features and characteristics, including the arrangement of features, may be incorporated into a palatal expander. These palatal expanders, which may be interchangeably referred to as palatal expansion shell apparatuses, may be configured to apply force within the patient's mouth to expand the patient's maxilla. The patients may be any appropriate patient, and particularly (but not limited to) children from ages 7 to 9 years old, e.g., following eruption of the first permanent molars. These apparatuses may be used to expand the patient's palate between 4 and 12 mm or more.

In use, the series of palatal expanders may be applied and/or removed by the patient (or a caregiver, e.g., parent) and may be adapted for securely attaching to the patient's teeth with sufficient strength to move the patient's palate, while being removable without excessive force or difficulty (e.g., using a finger and/or tool to remove). The apparatus may attach over two, three or more off the patient's teeth on either side of the upper arch, e.g., attach to the last three teeth (e.g., attaching over and/or to the first permanent molar and first and second primary molars). In general, the apparatuses described herein create sufficient force to open the patient's suture, e.g., apply between 8 N and 120 N (or greater than 8 N, greater than 9 N, greater than 10 N, greater than 20 N, greater than 30 N, greater than 40 N, greater than 50 N, greater than 60 N, etc.) against either side of the upper palate and/or lingual side of the teeth, yet require substantially less force to remove.

In any of the apparatuses and methods described herein, the apparatus may be configured so that it may be both securely attached to the patient's teeth, either with or without connecting to attachments bonded to the patient's teeth, while still being readily removable by the patient and/or caregiver. Specifically, any of the palatal expanders described herein may include a breach region that is configured to preferentially and controllably bend or break when a removal (e.g., pulling) force is applied; the pulling force may cause the breach region of the palatal expander shell apparatus to break or bend along the breach region and to disengage the palatal expander shell apparatus from the first or second set of the patient's teeth.

Any of the palatal expanders described herein may include an attachment that may be locked onto the patient's teeth by engaging onto an attachment on the patient's teeth. In some variations, the palatal expander may have (e.g., on a lateral side, such as the buccal side of the palatal expander) a lock that engages with an attachment bonded to the patient's teeth, to prevent removal of the palatal expander until the lock is disengaged. In some variations, the lock may be disengaged by manually moving, bending, pulling, pushing, displacing, or otherwise operating a release control. The release control may be a latch, lever, switch, tab, arm, snap, etc. The lock and release control may mechanically engage with each other and/or with the attachment on the patient's tooth/teeth. Alternatively or additionally, the lock, release and/or attachment may magnetically engage with each other.

Any of the apparatuses described herein may be configured so that the upper, convex surface of the palatal region matches the patient's palate, e.g., including any grooves, ridges, troughs, etc. that are present in the patient's particular anatomy. The upper convex surface may match the patient's palate, but may be configured to be separated or offset from it, e.g., by 0.5 mm or more, particularly at the more central region (e.g., opposite from the palatal midline suture). In some variations the apparatus may be offset from the patient's palate, and force may be applied primarily against the lingual sides of the teeth (e.g., molars); alternatively or additionally, the apparatus may be configured to apply force against the lateral side regions of the palate, above the molars; in this case, the upper convex surface of the palatal region may be configured to have a negative offset, e.g., may push against the palate, when worn.

The palatal expanders described herein may be formed of a single, monolithic material (e.g., by an additive, e.g., 3D printing, technique, etc.) or they may be formed in parts, e.g., by layering, thermosetting, etc. The apparatuses (e.g., devices, systems, etc.) may have a uniform or variable thickness. For example, the palatal region may be thinner in more anterior regions (e.g., the anterior half) compared to more posterior regions (e.g., the posterior half). Alternatively, the posterior half of the apparatus may be thinner than the anterior half. The posterior portion may be curved inward (e.g., toward the anterior region), or may include a cutout region in the posterior end.

The shape of the apparatus (e.g., the expander), and therefore the load applied by the apparatus when worn, may be controlled and selected during the fabrication process. It may be particularly advantageous to provide a digital planning process in which a digital model of the patients upper jaw (e.g., teeth, palate and gingiva), and in some cases the subject's lower jaw (e.g., teeth and/or gingiva) may be modified to plan the series of expanders that morph between the patient's initial anatomy to an expanded configuration in which the final expanded configuration is described.

The palatal expanders described herein may include a tooth engagement region for engaging at least a portion of the teeth in the patient's upper jaw, in particular the molars and/or premolars, and a palatal region extending between the tooth engaging region that is configured to be positioned adjacent and opposite from the patient's palate when the device is worn by the patient. For example, FIG. 1 and FIGS. 1A-1G show an example of a palatal expander 100, 150 that includes a pair of tooth engagement regions 103, 103' on either side of the device, connected by a palatal region 105. The palatal expander may also include one or more attachment regions (e.g., attachment coupling regions) 107 that may couple with a pair of attachments (e.g., attachment connectors) bonded to the patient's teeth on either side of the device (on a buccal side of the patient's teeth; only one pair is visible in FIG. 1). Attachment connectors may also referred to herein as a connectors, pins, attachments, or the like, and may be secured to the teeth in a position that allows it to couple (e.g., removably couple) to the attachment region(s) on the expander. An attachment connector may be bonded (glued, etc.) to the teeth as part of an initial step prior to wearing the series of expanders. In FIG. 1, the bottom, concave surface 108 of the palatal region of the palatal expander is shown; the opposite surface is the top, convex surface. FIG. 1 also illustrates one example of a breach region 167 of a palatal expander, configured as a line extending anteriorly to posteriorly through the occlusal side of one of the tooth engagement region 103 in this example. Although in FIG. 1 the breach region extends in a line, it may have any appropriate thickness and encompasses a region having less material strength than the adjacent, surrounding regions. The lower strength may be achieved by using a different material and/or a different thickness and/or inclusion of gaps or openings. Other examples of breach regions are provided below.

The tooth engagement regions may be formed of the same material(s) as the palatal region, or they may include different materials. In some variations, the breach region may be formed at the junction between the palatal region and the occlusal region, between the occlusal region and the buccal region, etc. The thickness of the tooth engagement regions and the palatal regions may be different or the same. In particular, the palatal region may be thicker than the tooth engagement region. The thickness of the tooth engagement region may be thicker along the lateral (e.g., buccal and/or lingual) sides of the device and thinner (or removed from) across all or a portion of the top of the tooth engagement region. The palatal region may have a non-uniform thickness. For example, the palatal expander may be thicker near the midline of the device. Any of the palatal expanders may include ribs or other supports (e.g., extending transversely between the tooth engagement regions and/or perpendicular to the tooth engagement regions). These ribs may be formed of the same material as the rest of the palatal region (e.g., but be thicker and/or shaped to have a cylindrical cross-sectional profile).

The inner (cavity) portion of the tooth engagement region is typically configured to conform to the outer contour of the patient's teeth, and to rest directly against the teeth and/or a portion of the gingiva (or to avoid the gingiva) to apply force thereto. The upper surface of the palatal region which is positioned adjacent to the palate when worn by the patient may be contoured to match the actual or predicted shape of the patient's palate. As mentioned above, all or a significant portion of the palatal region may be separated or spaced from the patient's palate when worn, which may enhance comfort and minimize disruption of speech.

In some variations, a portion of the palatal region extending between the opposite tooth engagement regions on either side of the device (e.g., a portion of the palatal region extending approximately z % of the distance between the tooth engagement regions, where z is greater than about 30%, 40%, 50%, 60%, 70%, 80%, 90%, etc.) may be flat or straight, rather than curved, so that it does not necessarily follow the contour of the patient's mouth. This portion may be one or more transverse ribs, struts or supports, or it may be the flat sheet. Such a flat or straight portion may provide increase force. Alternatively or additionally, the palatal region (e.g., one or more ribs, the sheet, etc.) may be curved in an arc similar to the arc of the patient's palate, but may have a much larger radius of curvature (appearing as a shallower concavity) than the patient's palate.

Any of the palatal expanders described herein may include one or more attachment regions or sites (also referred to herein as attachment opening, attachment couplers, etc.) for coupling to an attachment connector on the patient's teeth. In particular, it may be helpful to use one or more (e.g., a pair) of attachment regions on each side of the device. Furthermore, the attachment sites may preferably be openings through the expander. An open structure (attachment site) on the orthodontic expander may interact with attachments (attachment connectors) located on teeth to improve the overall retention of the appliance and in some cases may be used to generate advantageous force features for teeth alignment, including limiting or preventing rolling of the teeth buccally as the palate is expanded. Such features may be helpful, in particular, when included as part of a directly fabricated (e.g., 3D printed) device for rapid (e.g., phase 1) palatal expansion. Further, although the attachment connector is typically bonded to one or more teeth and projects into a complimentary opening or cavity on the expander, this configuration may be revered in some or all of these; for example, the protruding attachment connector may be part of the expander which may insert into an opening/cavity bonded to the user's teeth. In some variations, a 3D printer that prints in multiple materials (including more elastic and/or lower strength materials) may be used directly print the apparatuses described herein, including the breach region(s) and/or locks.

Any appropriate attachment region may be used, and in particular any appropriate size and/or shape may be used. As mentioned, the attachment region may be an open structure on the appliance which may improve retention of the appliance over the attachments and possibly include force features for teeth alignment. For example the attachment region may comprise a round, oval, square, rectangular, triangular, etc. opening through the expander (e.g., at a lateral, e.g., buccal, side of the tooth regaining region of the expander. The attachment region may be keyed relative to the attachment connector; in general the attachment connector may be configured to mate with the attachment region in one or a particular orientation.

Figure 4A:
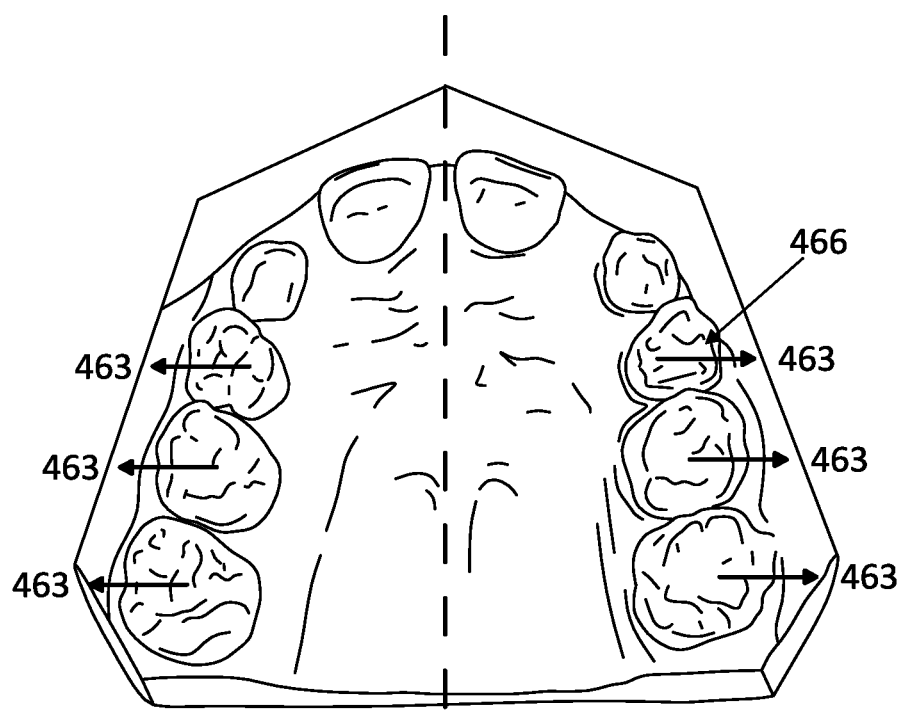
FIG. 4A illustrates examples of translational forces that may be applied to a patient's palate (arrows) to expand the palate, braking and separating the palatal midline suture (e.g., median palatine suture, etc.).

The exemplary palatal expander 150 in FIGS. 1A-1G is shown from different perspectives. This example may also include a breach region (not visible in FIGS. 1A-1G), to allow preferential breaking and/or bending. These or similar palatal expanders may include any of the features described herein, separately or collectively. In this example, the palatal expander is configured as a removable, e.g., patient-removable (with or without the use of a removing tool) that may be formed of any appropriate material, including, e.g., a biocompatible nylon material. A series of palatal expanders may be used and incrementally staged to expand a patient's palate. In particular, the methods and apparatuses described herein may be configured for treatment of children and young adults. The palatal expanders may be configured so that the transpalatal arch region 153 balances the load deflection for patient comfort. For example, transverse forces 463 may be distributed across three posterior teeth 466 on each side, as shown in FIG. 4A, and or on a lateral side of the palate. The occlusal surface 154 thickness may be optimized for structural integrity and patient comfort. The palatal expander apparatus may include a plurality of attachments (not visible in FIGS. 1A-1G). The attachments may be configured to allow easy appliance insertion and retention. As will be described in greater detail herein, the palatal expanders may also include one or more removal features to allow the patient to remove the apparatus once attached.

As mentioned above in the additional detail below, the forces applied by the apparatus to expand a patient's palate may be applied to the teeth (e.g., the lingual side of the D, E or 6 teeth) and/or the palate, and particularly the lateral side of the palate, above gingival line but below the midline, either uniformly along the anterior-to-posterior direction (typically symmetrically on either side of the midline) or at different regions along the anterior-to-posterior direction.

In any of the palatal expanders described herein, openings or holes formed through the palatal expander may be included. For example, in some variations the region of the palatal expander otherwise covering the occlusive surface of the patient's teeth may be removed. For example, allowing a more natural bite. In some variations, the anterior (front region) of the palatal region extending between the opposite sides of the upper arch (e.g., the opposite tooth-receiving portions of the apparatus) may be removed or curved inward, so as to avoid interfering with speech. Alternatively or additionally, the poster (e.g., back) end of the palatal expander may be removed or curved in, anteriorly, to minimize or reduce invoking a gag reflex. In any of these variations the thicknesses may also be adjusted in addition or alternatively. For example, the thickness in the posterior region (e.g., the back 10%, 20% 30%, etc.) of the palatal expander may be thinner than the more anterior regions.

Figure 2A:
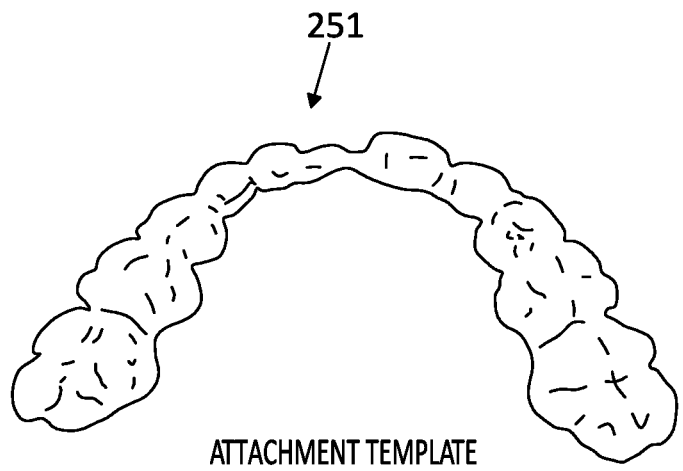
FIGS. 2A-2C illustrate an example of a system for expanding a patient's palate, including an attachment template (shown in a perspective view in FIG. 2A), series of progressive palatal expanders (shown in FIG. 2B) and a passive holder (e.g., retainer shown in FIG. 2C).
Figure 2B:
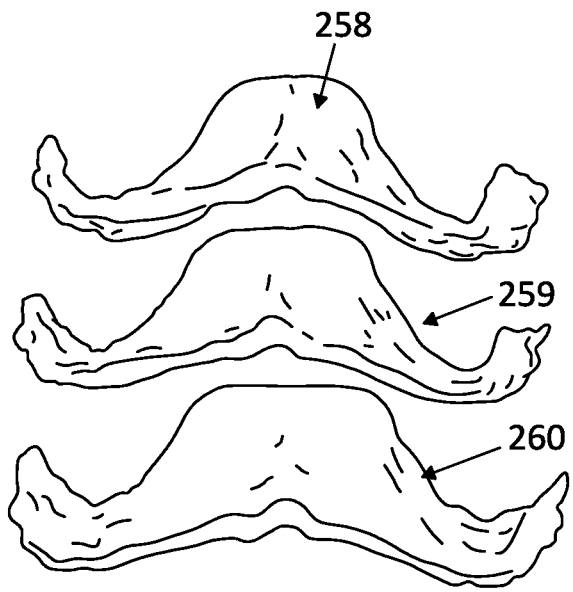
Figure 2C:
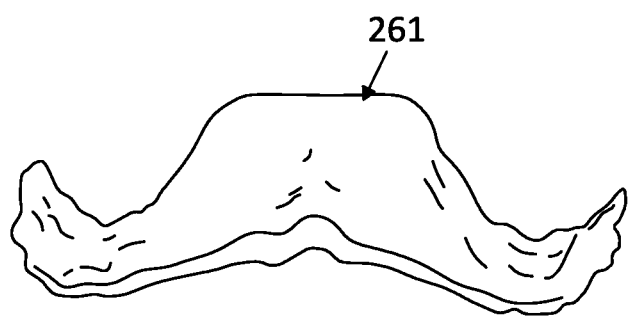

The apparatuses described herein may be configured as a system including attachments and an attachment template for positioning the attachments on the teeth, a series of palatal expanders that progressive expand the patient's palate, and a passive holder (e.g., retainer) to be worn after the series has widened the palate. For example, FIG. 2A-2C illustrate these components of such a system. FIG. 2A shows an example of an attachment template 251; a plurality of attachments (not shown in FIG. 2A) may be attached to the patient's teeth at predetermined locations that may correspond to the locations of receiving sites on each of palatal expanders. FIG. 2B shows an example of a series of palatal expanders that get progressively broader (e.g., wider) to progressively expand the patient's palate. For example, the upper palatal expander 258 is narrower than the intermediate palatal expander 259 and a final palatal expander 260. FIG. 2C illustrate and example of a passive holder (e.g., retainer) 261 that may be worn after the series has completed expanding the patient's palate. In this example, the palatal expander retainer 261 is similar or identical to the last of the palatal expanders in the sequence, although it may have a different configuration.

Any of the examples described herein may be configured to include, for example: a detachment region (e.g., removal tab, slot, etc.), for example at the gingival edge gap and/or an extension to assist with appliance removal, a palatal expander identification marking (e.g., an expander identification number), etc.

Figure 4D:
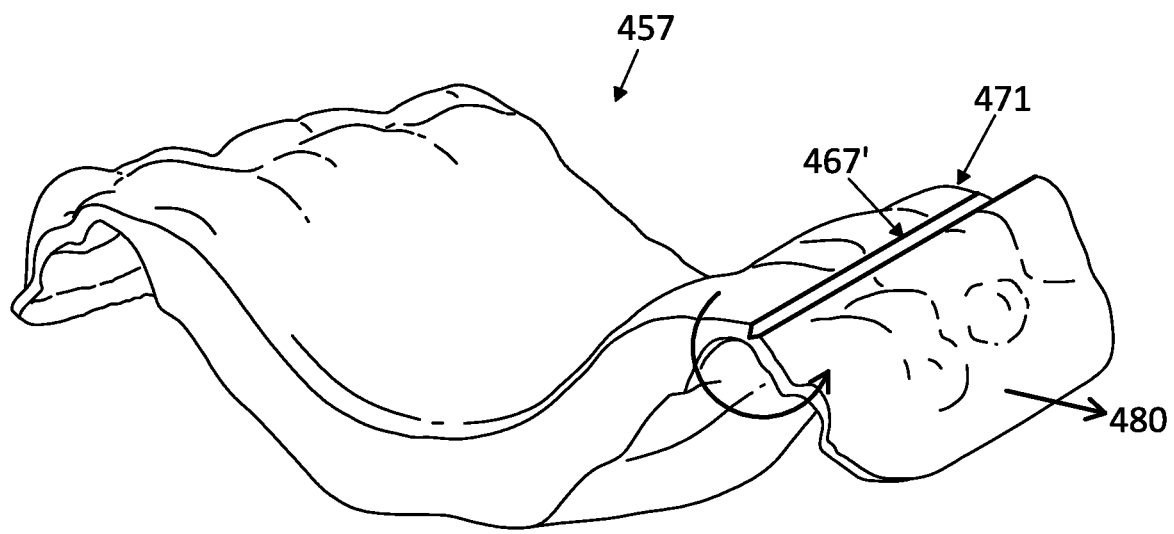
FIG. 4D illustrates another example of a palatal expander including a breach region, shown extending along the occlusal surface of a first tooth engagement region. A pulling force is also illustrated.
Figure 4E:
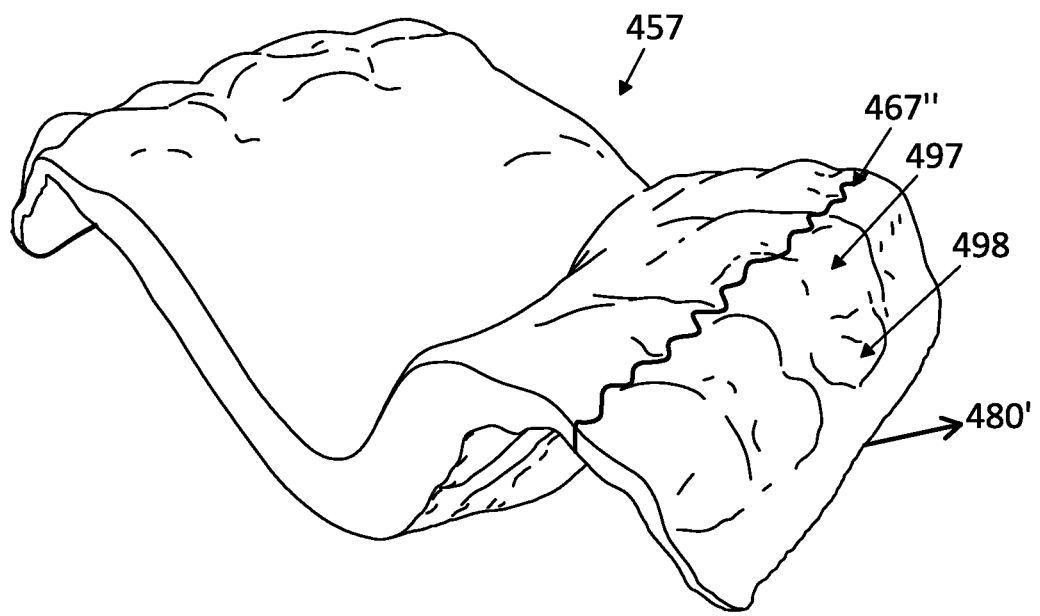
FIG. 4E illustrates another example of a palatal expander including a breach region, in which the breach region is a line or channel that is not straight but extends in an anterior-to posterior direction across the occlusal side of a first tooth engagement region.
Figure 4F:
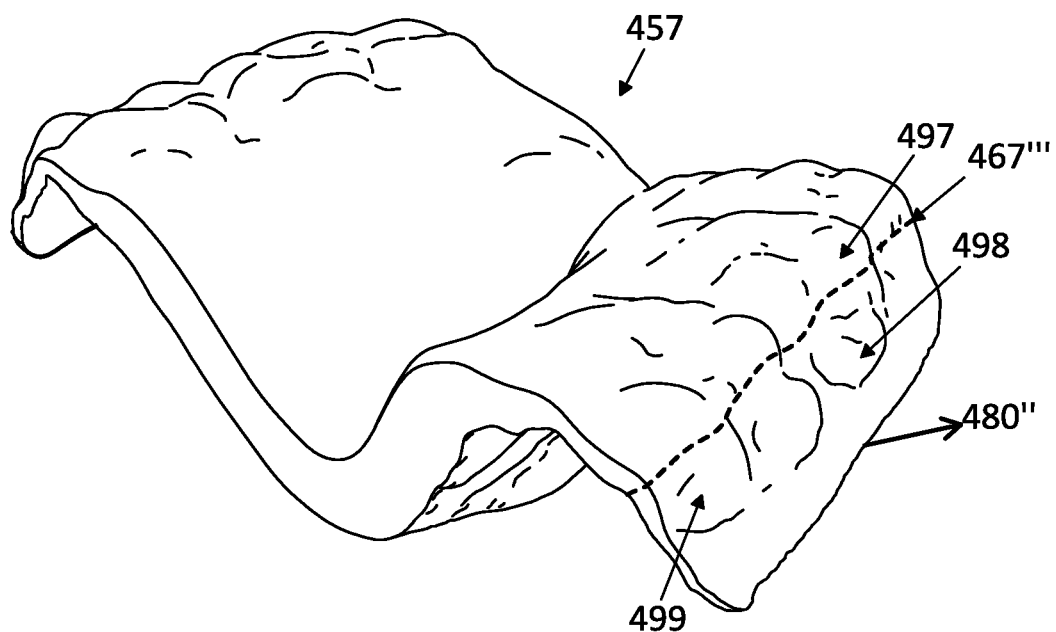
FIG. 4F illustrates another example of a palatal expander including a breach region extending in an anterior-to-posterior direction across the buccal side of a first tooth engagement region.
Figure 4G:
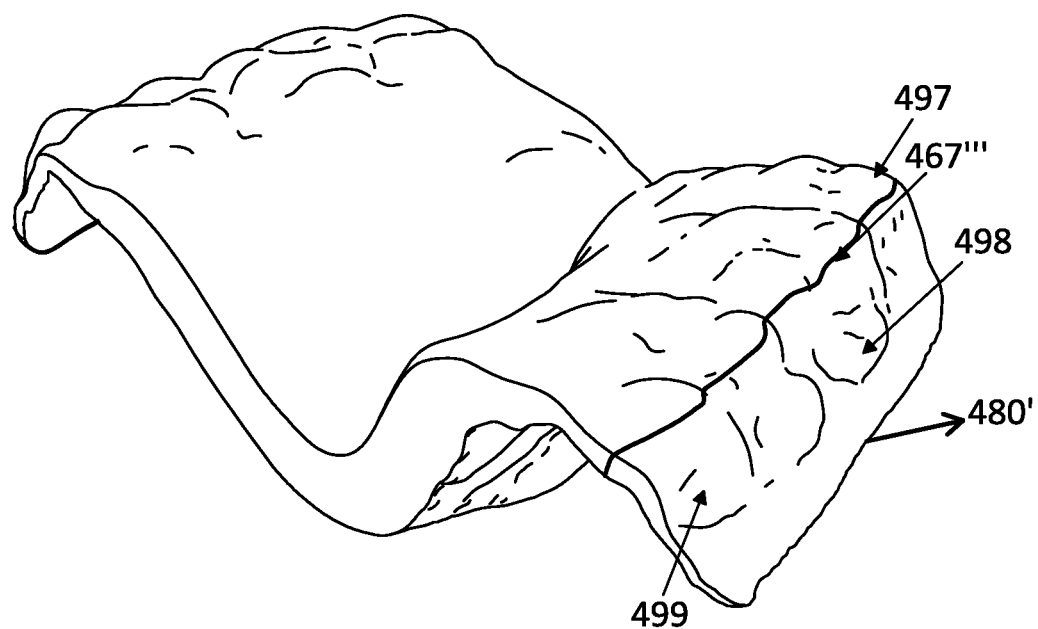
FIG. 4G illustrates another example of a palatal expander including a breach region extending in an anterior-to-posterior direction on the border between the buccal and occlusal sides of a first tooth engagement region.
Figure 5:
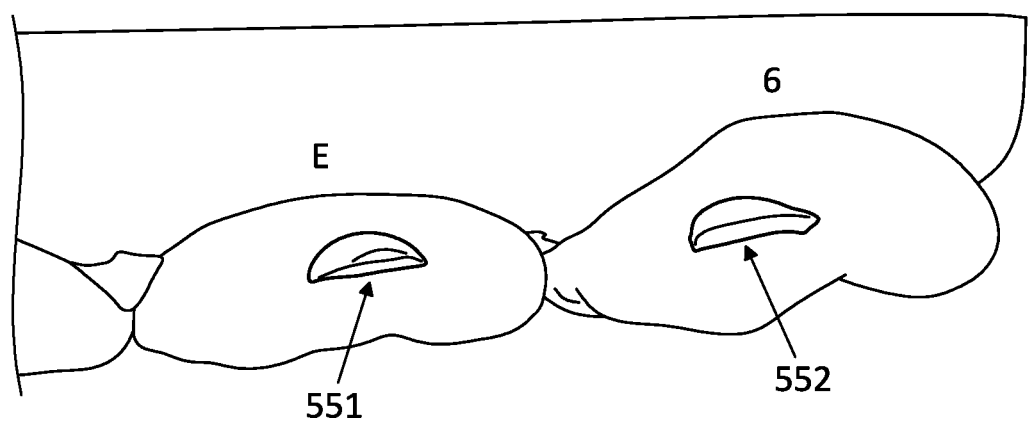
FIG. 5 illustrates an example of attachments on teeth that may mate with a palatal expander in predetermined positons; in this example, four attachments (two on either side) may be used to secure each palatal expander to the teeth during treatment.

FIG. 5 illustrates an enlarged view of attachments placed on the patient's teeth. FIG. 5 shows two attachments 551, 552, one on the E's (center of crown) molar and another on the 6's (Mesial Cusp) molar region. The attachments may be bonded to the teeth. In this example, four attachments are used, two on either sides. The attachments may engage with an attachment region on a palatal expander (see, e.g., attachment region 498 in FIGS. 4D-4G).

Figure 4B:
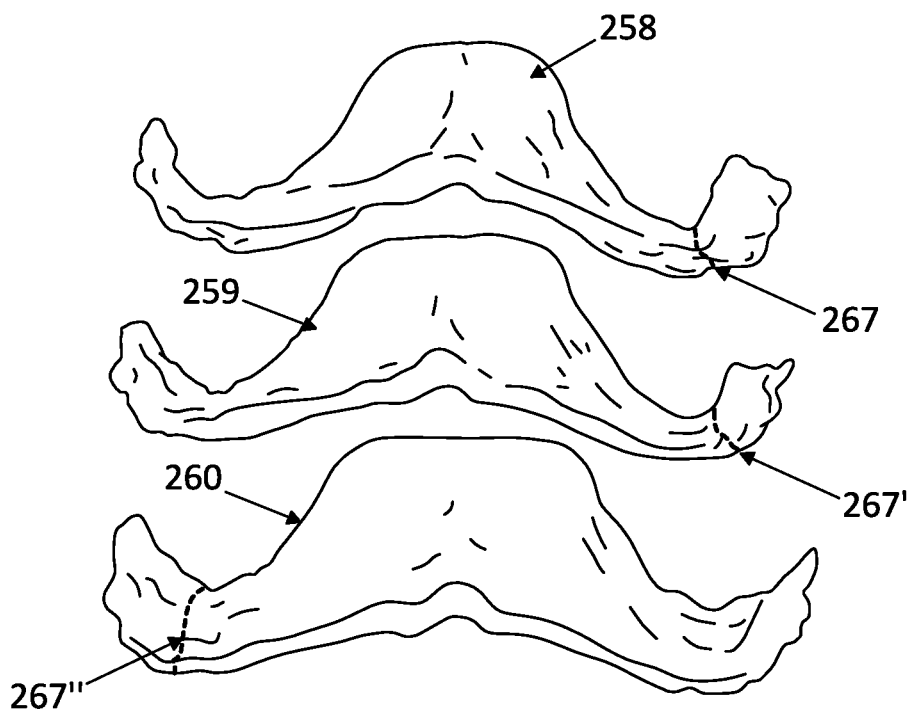
FIG. 4B illustrates a series of example palatal expanders that are configured to progressively expand the suture (e.g., the expanders shown in FIG. 4B may be examples taken from an entire sequence, e.g., of 8 or more expanders, and do not necessarily represent three immediately sequential expanders).

In the exemplary active palatal expanders illustrated in FIGS. 2B and 4B, the expanders may be configured for daily wear (e.g., 23-24 hours of wear). In these examples, the palatal expanders may be configured to provide a predetermined amount of total arch width activation per stage (e.g., approximately 0.15 mm, 0.20 mm, 0.25 mm, etc.) similar to screw activation expanders. Each expander of the series may include a breach region 267, 267', 267" extending in the anterior-to-posterior direction. As mentioned, different palatal expanders in the series may each include breach regions, but the location of these breach regions may be different or the same between different palatal expanders in the series. A holder or retainer (e.g., FIG. 2C) may be provided to the patient to be worn after completing the sequence. In some variations the holder, e.g., passive palatal expander, includes a breach region that is configured to flex or bend along the breach region to disengage the palatal expander shell apparatus from the patient's teeth; alternatively in some variations the holder does not include a breach region. In general, each of the palatal expanders in a series may be worn for up to two weeks; similarly a holder may be worn for up to two weeks holding device.

Figure 4C:
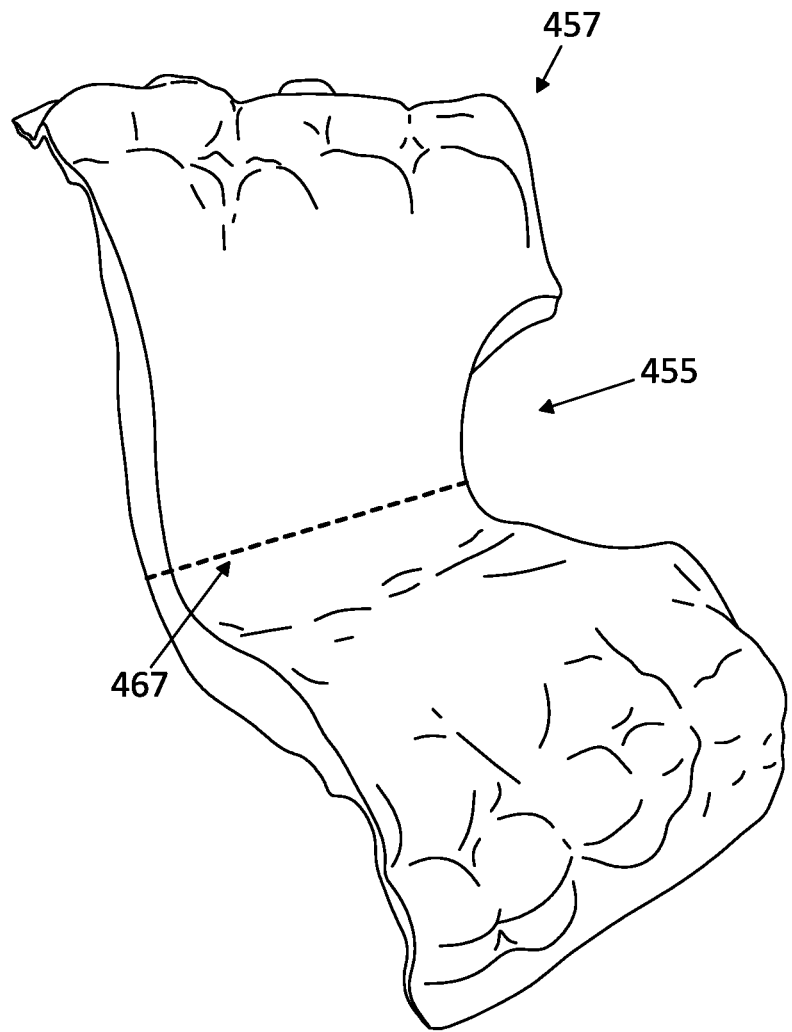
FIG. 4C illustrates an example of a palatal expander in which a portion of the palatal region has been removed from the anterior region; similarly, other regions of the apparatus, e.g., from the posterior region may be removed. Alternatively or additionally, any of these apparatuses may have a hole cut in other regions, including in the center region. This example also shows a breach region extending along a midline of the palatal expander.

FIGS. 4C-4G illustrate examples of palatal expander apparatuses that include one or more breach regions. In FIG. 4C, the palatal expander includes a breach region 467 extending in an anterior (e.g., front of the patient's mouth when worn) to a posterior (e.g., back of the patient's mouth when worn), direction. The breach region may be visible or not visible in the apparatus. In some variations, the breach region is a continuous, or mostly (e.g., >60%, >65>, >70%, >75%, >80%, >85%, >90%, etc.) continuous line of lower strength, or a perforated line comprising discontinuous region of lower strength pockets extending long at least a portion of the length of the apparatus, such as along the anterior-to-posterior length through one of a tooth engagement regions (e.g., along one or more of an occlusal side, a buccal side or a lingual side of the tooth engagement region, or between them), and/or through a palatal region (or between the palatal region and a tooth engagement region). In FIG. 4C, the breach region extends down the midline of the apparatus, though the midline of the palatal region.

In general, the methods and apparatuses described herein may avoid the application of removal force on the attachment that is bonded to the patient's teeth, as this force may break and/or remove the attachment from the patient's teeth and may also interfere with the removal effort. Typically, the appliance itself is fairly rigid and resistant to bending, thus, bending may preferentially occur at the breach region(s). A breach region (e.g., bending region) may be formed in an appliance in a size and location so that when applying a force (e.g., pulling force), the appliance, or a region or the appliance typically over the attachments, will deflect in a pre-designed direction to des-engage the appliance from the attachments.

In addition to bending or breaking at a predetermined location and/or with a predetermined force profile, the breach regions described herein may be configured to create a spring effect to help with clasping the teeth when the appliance is mounted on the teeth. For removal, a controlled breakage may provide one way of making the removal easier. Controlled breakage of the breach region may be particularly useful for appliances that are disposable, e.g., single-use or "one time wear" appliances. Under a pre-determined force, the appliance will break in a way that will be easy to remove without additional force being necessary.

Any of these apparatuses may be configured so that the broken edge(s) are atraumatic (e.g., not sharp) and/or configured to cleanly break without forming sharp edges, and/or avoiding small fragments. In some variations, a layer of film or coating on the appliance to avoid the spread of debris (or fragments or particles) in the mouth. The breach region may be configured as a breakage feature that permits the apparatus to break under a relatively low force that is applied in a specific location and/or orientation (e.g., a pulling force applied from the buccal side, etc.). The breach region may be configured as a breakage feature and may be combined with a folding feature so that at a lower force threshold the appliance may bend at the breach region, but a higher force may cause the appliance to controllably bend. In some variations the one or more breach regions may include a portion that breaks and a portion that bends, preventing small pieces from being released into the mouth. For example, approximately half of the breach region may break, while the remainder merely bends, releasing the device as a single (albeit broken) piece.

The breach region 467 shown in FIG. 4C is shown as a dashed line that extends along the entire anterior-to-posterior length of the palatal expander. The poster region of the palatal expander 457 includes cut-out region 455 that may enhance patient comfort when wearing the apparatus, providing additional space for the tongue in the posterior of the mouth (e.g., enhancing comfort, preventing problems with speech, or the like). The breach region in this example may be a region that is perforated, e.g., by including sections or pockets that have a weaker material strength than the adjacent region on either side of the breach region because, for example, they include voids (e.g., regions of lower density, including, in some variations air pockets). The breach region may be formed of the same material as the adjacent regions. The breach region may be formed to include a structural feature, such as a thinning, cut-out region, channel, etc. In some variations, the breach region is formed of a different material than the region(s) adjacent to the breach region. For example, the breach region may be formed of a material that is more flexible and/or less dense than the adjacent region(s).

FIG. 4D illustrates another example of a breach region 467' in a palatal expander. In FIG. 4D, the breach region 467' is formed as a channel through an occlusal side 471 of a tooth engagement region of a palatal expander. This channel may be a region having a local thinning of the profile of the palatal expander. The thinner region may be formed abruptly (e.g., having step, including a rounded-step) profile to form the channel shown. The breach region may therefore act as a hinge region along which the palatal expander may breach or bend when a pulling force 480 is applied to the palatal expander, as will be described in greater detail below. In FIG. 4D, the breach region extends along the full anterior-to-posterior length; however in other variations, the breach region may extend only partially across the palatal expander.

FIG. 4E illustrates another example of a palatal expander showing a breach region 467" extending in an anterior-to-posterior direction in the occlusal portion 497 of a first tooth engagement region. In this example, the breach region does not extend in a straight line, but extends in a sinusoidal, e.g., zig-zag pattern. A pulling force may be applied to a bottom edge of the buccal side of the first tooth engagement region 480 (and/or to a detachment region, as will be illustrated below) to detach the palatal expander from the teeth, including by detaching one or more attachment regions 498 on the palatal expander from an attachment bonded to the patient's teeth. The breach region in this example may be a frangible region that breaks when a pulling force of sufficient strength is applied.

FIG. 4F shows another example of a palatal expander 457 having a breach region 467''' that may bend or break when an appropriate pulling force 480'' is applied. In FIG. 4F, the breach region is located on the buccal side 499 of the first tooth engagement region, extending in an anterior-to-posterior direction. The apparatus also includes a pair of attachment regions 498, configured to hold an attachment bonded to a patient's teeth. An attachment region 498 in this example may be a cavity that is formed on the buccal side of the tooth engagement region that can hold the attachment when the apparatus is worn on the teeth. The breach region extends above the attachment region(s). In this example, a pulling force 480'' applied to pull the buccal side (e.g., from the bottom edge of the buccal side or from a detachment region on the buccal side) laterally outward and/or downward (e.g., towards the lower jaw when the apparatus is worn on the upper arch) may allow the breach region to bend or flex, hinge-like, so that at least a portion of the buccal side disengages from the teeth, including any attachments, and allows the apparatus to be removed from the teeth, despite the force being applied by the palatal region laterally to expand the palate, which may otherwise lock the apparatus in position.

Another example of a palatal expander 457 with a breach region 467'''' is shown in FIG. 4G. The breach region 467'''' may bend or break when an appropriate pulling force 480'' is applied. In FIG. 4F, the breach region is located at the transition between the occlusal side 497 and the buccal side 499 of the first tooth engagement region, extending in an anterior-to-posterior direction. In this example, a pulling force 480''' applied to pull the buccal side (e.g., from the bottom edge of the buccal side or from a detachment region on the buccal side) laterally outward and/or downward (e.g., towards the lower jaw when the apparatus is worn on the upper arch) may allow the breach region to bend or flex, hinge-like, so that the buccal side disengages from the teeth, including any attachments, and allows the apparatus to be removed from the teeth.

Figure 3A:
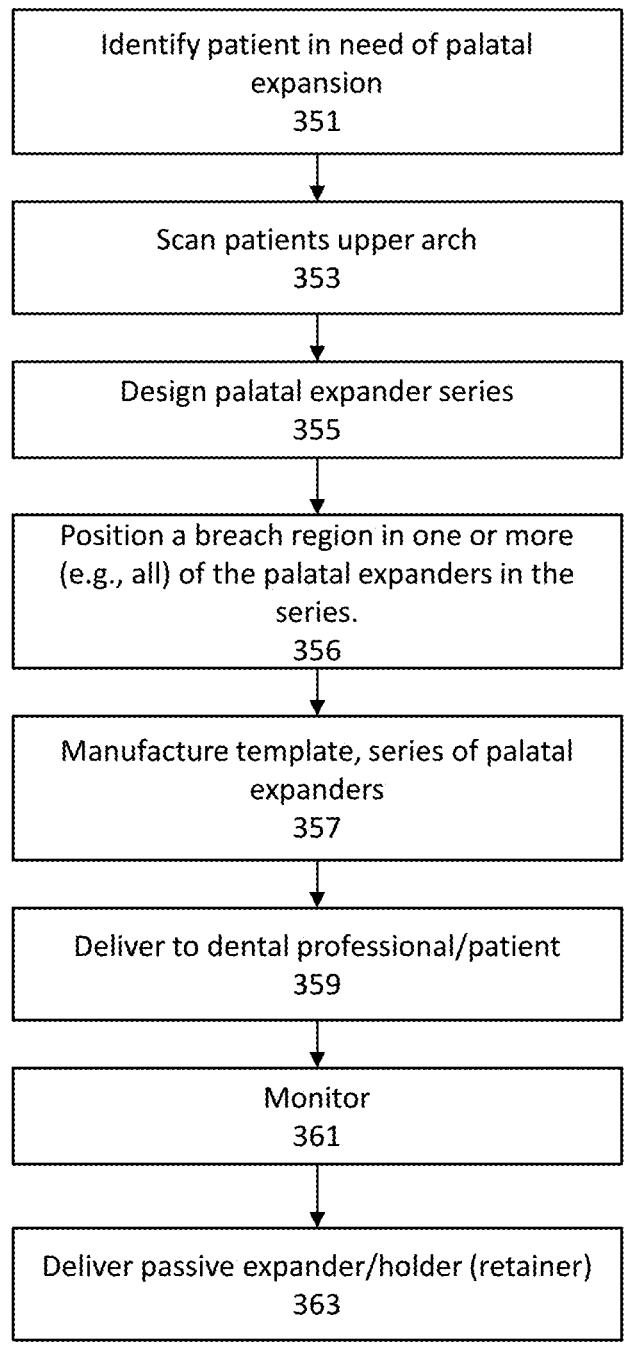
FIG. 3A illustrates an example of a method of treating a patient to expand the patient's palate using the palatal expanders described herein.

FIG. 3A illustrates an exemplary method for providing a treatment plan for a patient to expand the patient's palate. The first step illustrated may include identifying a patient in need of palatal expansion 351. The patient may be a child, teenager, young adult or adult. Once the patient is identified, the dental arch, including the palate, teeth, and at least a portion of the gingiva may optionally be digitally scanned 353. Alternatively, the upper dental arch may be modeled manually (e.g., using a dental impression). When scanning is used, any appropriate scanner may be used, including, but not limited to an intraoral scanner that can directly scan the teeth, gingiva and palate.

Once the upper arch has been modeled (e.g., scanned, manually modeled, etc.), the palatal expanders may be designed 355. Typically, these designs may be configured to include any of the features described herein, and in particular, the breach region 356. The design process may include planning the final position of the teeth and/or palate, and designing intermediate palatal expanders to achieve the final configuration. The design process may include providing the location of the attachments on the teeth in order to provide both secure attachment as well as to move the teeth, and/or prevent substantial tipping of the teeth during expansion. The design process may be digitally performed using the digital model of the patient's upper arch. The design process may be automated or semi-automated.

In planning the treatment plan, including adding the breach region(s), the apparatus may be configured to include a breach region 356, as discussed above. The breach region may be positioned in different regions of the apparatus, so as to avoid interfering with the forces being applied to expand the subject's palate and/or move the subject's teeth. For example in some apparatuses in the series, the breach region may be located on a first (e.g., left) tooth engagement region, while in some palatal expanders, the breach region may be positioned on the second (e.g., right) tooth engagement region and/or on the palatal region, and/or between the palatal region and a tooth engagement region. The palatal expanders may or alternatively be configured to include one or more detachment regions; during the design process, the location and size of a detachment regions (including a fulcrum portion, if included) may be included. Each patient may need a custom design of the appliance features, such as the breach region and/or detachment regions; the shape, size, and/or location of attachments on the teeth may be configured to best cope with the patient specific dentition and the features, and thus the detachment features such as the breach region, attachment regions, detachment regions and/or base (fulcrum) regions may be adapted accordingly.

Once designed, the series of palatal expanders may be fabricated 357, and the template may be manufactured at the same time. Any appropriate fabrication technique may be used. For example, the method may include 3D printing, and/or lamination. Examples of these methods are provided below. The manufactured palatal expanders may then be sent 359 to the patient and/or to the dental professional who may instruct the patient in applying and removing the palatal expanders. The treatment may then be optionally monitored 361 to track the palatal expansion, including taking periodic (e.g., daily, weekly, bi-weekly, etc.) scans of all or a portion of the upper arch (palate, teeth, gingiva, etc.). The treatment may be adjusted to increase or decrease the rate of expansion, e.g., by redesigning the series of palatal expander and/or refabricating the palatal expanders. Once the sequence of palatal expanders has been worn, the patient may then wear the holder (e.g., retainer) to prevent relapse of the palate; the holder may be worn until the palatal suture has healed. The holder may be provided to the patient with the series of palatal expanders, or it may be (optionally) sent during the treatment or immediately after treatment 363.

Figure 3B:
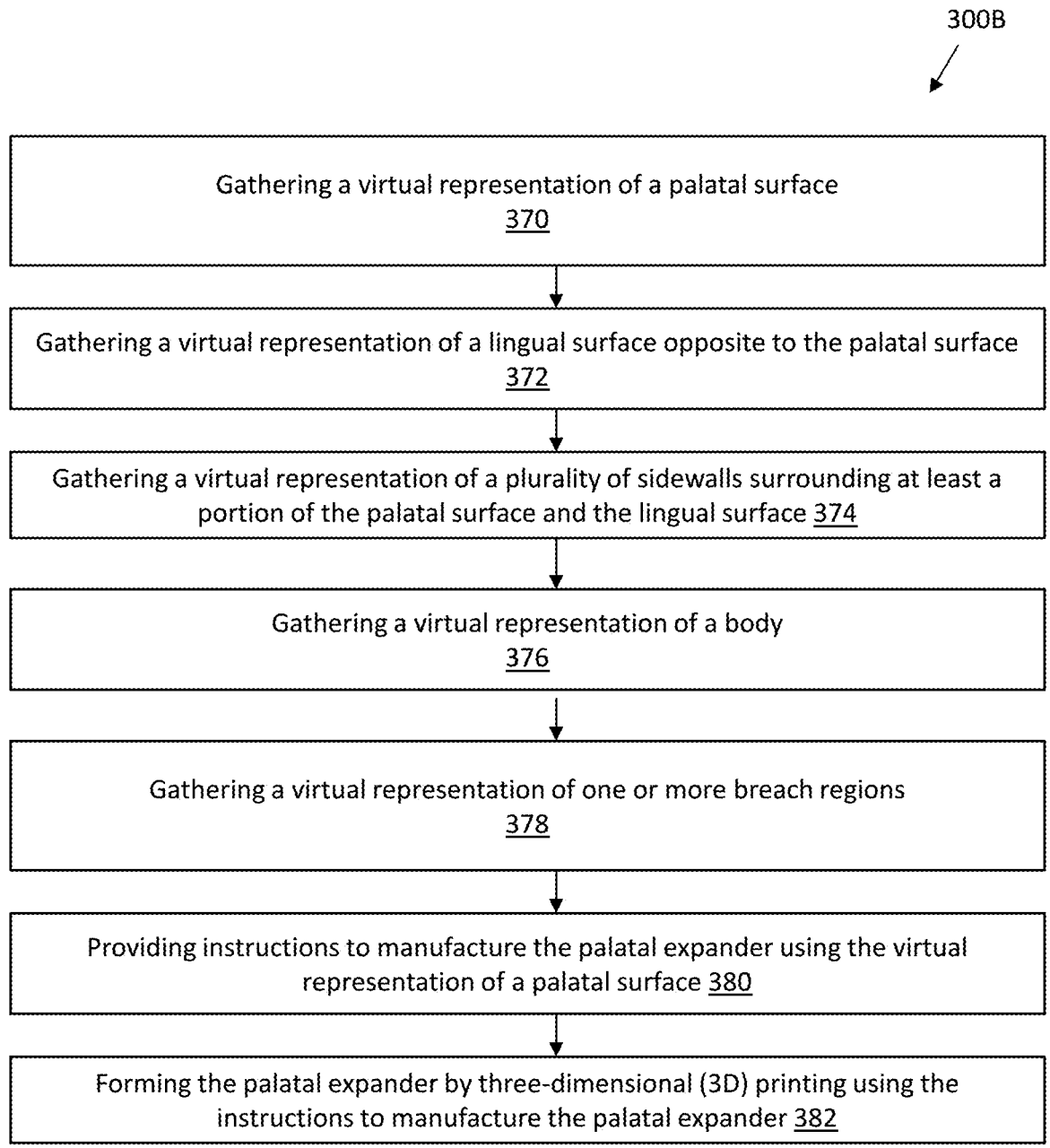
FIG. 3B illustrates an example method for forming a palatal expander.

FIG. 3B illustrates an example method 300B for forming a palatal expander. The method 300B is shown in conjunction with other structures discussed herein, including but not limited to the structures described in the context of other figures. In some implementations, the method 300B is executed by a computing device having memory and one or more processors. The memory may store computer-program instructions. The one or more processors may execute the computer program instructions to perform one or more operations of the method 300B.

At an operation 370, a virtual representation of a palatal surface may be gathered. The palatal surface may have a convex surface geometry with a size and a shape that mates with a palate of a patient. In some implementations, the size, shape, and/or other properties of the palatal surface are formed using impressions of a patient's palate, scans of a patient's palate, and/or incremental estimations of a patient's palate according to an orthodontic treatment plan. In various implementations, the size, shape, and/or other properties of the palatal surface are formed using visualization tools that display a 3D virtual rendering of the palatal surface as part of a 3D model of a palatal expander.

At an operation 372, a virtual representation of a lingual surface opposite to the palatal surface may be gathered. A "lingual surface" of a palatal expander, as used herein, may refer to a portion of a palatal expander that faces a patient's tongue when inserted into the patient's palate. The lingual surface of a palatal expander need not correspond to the lingual surface of teeth. The lingual surface of the palatal expander may have a concave surface geometry and may provide an air gap between the palatal expander and a patient's tongue. In various implementations, size, shape, thickness, contours, etc. of the lingual surface are formed using impressions of a patient's mouth and/or teeth, scans of a patient's mouth and/or teeth, and/or incremental estimations of a patient's mouth and/or teeth according to an orthodontic treatment plan. In various implementations, the size, shape, and/or other properties of the lingual surface are formed using visualization tools that display a 3D virtual rendering of the lingual surface as part of a 3D model of a palatal expander.

At an operation 374, a virtual representation of a plurality of sidewalls surrounding at least a portion of the palatal surface and the lingual surface may be gathered. At an operation 376, a virtual representation of a body may be gathered. The virtual representations of the sidewalls and/or the body may be formed using, again, impressions of a patient's mouth and/or teeth, scans of a patient's mouth and/or teeth, and/or incremental estimations of a patient's mouth and/or teeth according to an orthodontic treatment plan. The virtual representations of the sidewalls and/or the body may be formed using visualization tools that display a 3D virtual rendering of these structures as part of a 3D model of a palatal expander. In some implementations, the virtual representations of the sidewalls and/or the body may provide virtual representations of force(s) that result when the resulting palatal expander has been inserted into a patient's mouth. These forces may be modeled by force system(s) and/or other virtual systems described herein.

At an operation 378, a virtual representation of one or more breach regions may be gathered. In various implementations, breach regions may be identified on the virtual representation of the body of the palatal expander. As examples, a designer and/or an automated agent may identify specific regions of the body that can absorb removal forces and cause the palatal expander to deform when those removal forces are applied. A designer and/or automated agent may identify one or more fulcra to direct removal forces to various breach regions as well. The designer and/or automated agent may identify and/or gather materials, shape(s), etc. that form the basis of breach regions. In some implementations, the breach region(s) are modeled on the 3D virtual representation of the body of the palatal expander.

At an operation 380, instructions to manufacture the palatal expander using the virtual representation of a palatal surface may be provided. In various implementations, a computer-aided design (CAD) file or model is stored, streamed, etc. on a system that can manufacture the palatal expander. At an operation 382, the palatal expander may be formed by three-dimensional (3D) printing using the instructions to manufacture the palatal expander. More specifically, a 3D printer may use the CAD file or model to create various features of a palatal expander that can be removed from a patient's mouth.

Figure 6A:
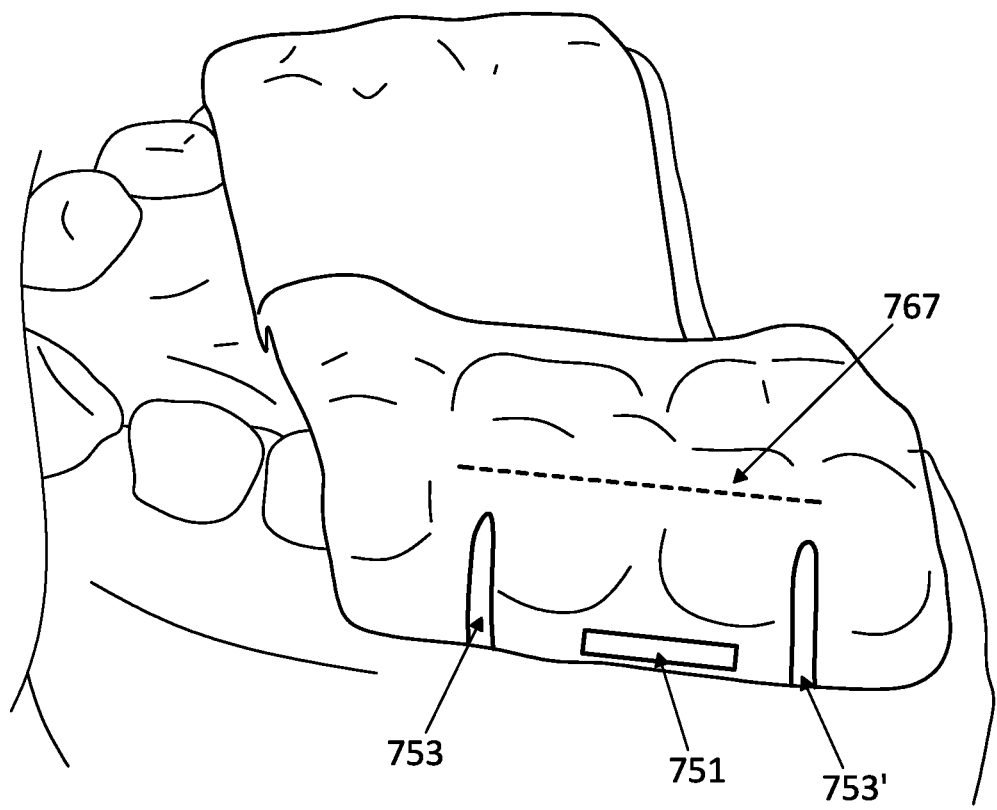
FIG. 6A illustrates an example of a palatal expander including a detachment region (e.g., a removal grip or tab) and two or more lateral hinge region(s) (e.g., slot, cut-out, slit, flex region, etc.) extending from the lateral edge (e.g., the edge of the buccal side) towards the occlusal surface, which may be used to help remove the apparatus from the subject's mouth, and a breach region extending partially across the anterior-to-posterior direction on the buccal side of a tooth engagement region.
Figure 6B:
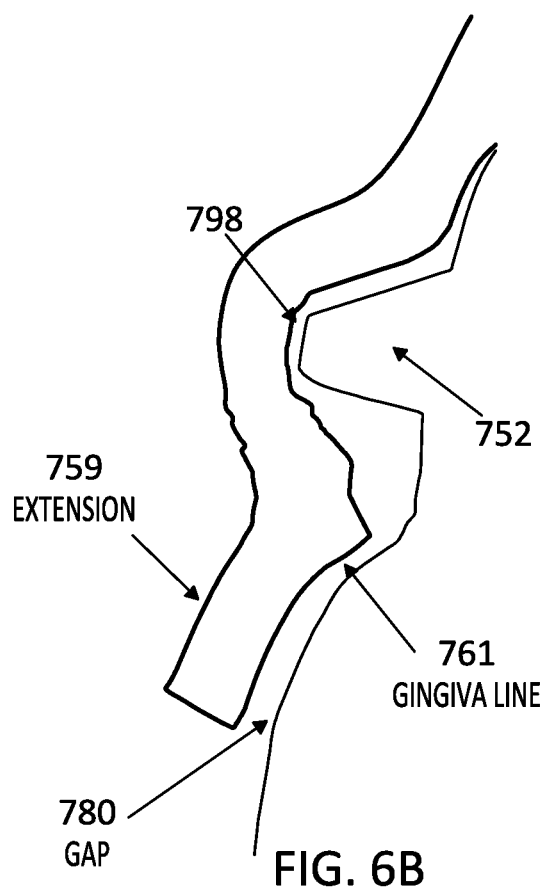
FIG. 6B illustrates a section through a portion of a palatal expander that is configured to include a detachment region in which the outer (e.g., buccal) edge of the palatal expander is formed with a gap separating it from the teeth and/or gingiva sized and configured so that the patient's fingernail and/or a removal device may be inserted to pull the apparatus off of the teeth, including off of the attachment on the teeth.

As mentioned above, any of these methods and apparatuses may include palatal expanders with one or more removal/release features including a breach region. FIGS. 6A-6B illustrate an example of a palatal expander having one or more removal/release features that permit a patient to manually detach and disengage the palatal expander from the teeth once it has been applied. In FIG. 6A, the palatal expander includes both a detachment region (configured as a removal tab 751) and a breach region 767. The detachment region in this example is a tab or protrusion extending along or near the bottom (e.g., bottom side) of the lateral (buccal) outer side of the palatal expander. The detachment region 751 may include a slot or opening into which the patient's fingernail and/or a removal tool may be inserted, to allow the buccal side of the palatal expander to be separated and pulled away from the teeth, so that any attachment(s) on the palatal expander may be disengaged. The device may then be pulled down off of the teeth.

In FIG. 6A, the design also includes a pair (though one or more may be used) of slits, slots, cut-out regions, etc. 753, 753' extending from the bottom edge of the buccal side up towards the breach region 767. These slots, slits, etc. may provide a region that can be separated from the palatal expander when a pulling force is applied to bend or break the breach region of the palatal expander. This may allow detachment of the attachment(s) from the patient's teeth so that it can be removed. The one or more slit(s) 753, 753' on an outside of the attachment cavities of the device may allow a portion of the palatal expander (e.g., a portion of the buccal side) to be removed or bent away from the teeth, begin the disengagement process.

In FIG. 6B a profile of the region between the slits 753, 753' is shown, showing a slight gap 780 between the gingiva and the bottom edge of the buccal side of the apparatus. This gap may be small enough to minimize food trapping by the apparatus, but large enough to prevent irritation of the gingiva and/or to allow it to act as a detachment site for applying a pulling force to remove the apparatus. The profile of FIG. 6B shows the attachment 752 on the patient's tooth within the attachment region (e.g., cavity) 798 on the palatal expander shell apparatus.

The design (size, shape, prominence and location) of the attachments on the teeth and/or the apparatus may be configured to assist with insertion and still be highly retentive. Similarly, the detachment (release) features may be configured to allow retention until release is manually triggered by the patient.

In general, any of the shell apparatuses described herein may include a breach region that is configured as a hinge region. The breach region may be located on the apparatus before the occlusal surface but above the attachment regions (if present) coupling to one or more tooth attachment(s). The breach region may break of bend to disengage the apparatus from the teeth. For example, a hinge design with a finger access may be included to allow disengaging the device from the retention attachment for easier removal.

In some variations, the release mechanism may include a lock or other region that may require activation (e.g., by deforming, squeezing, etc.) before it can be released. For example, the palatal expander may be squeezed or deformed (e.g., by biting down on the palatal expander first) before pulling at a release on the palatal expander (e.g., using a fingernail) to release the aligner when also releasing the biting down onto the palatal expander. Thus, another part of the device may be modified or deformed begin disengaging the device from the retention attachment.

Figure 7A:
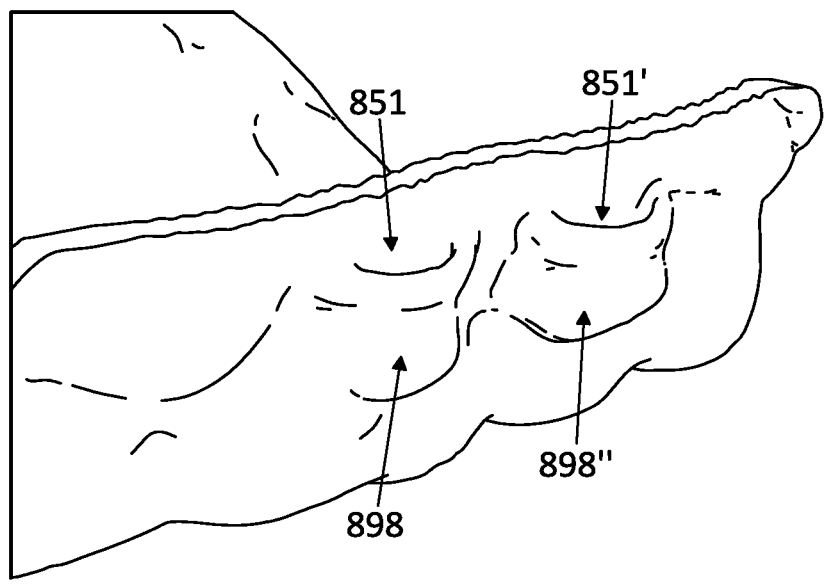
FIG. 7A illustrates one example of a palatal expander having a detachment region on the buccal side of the palatal expander shell apparatus.
Figure 7B:
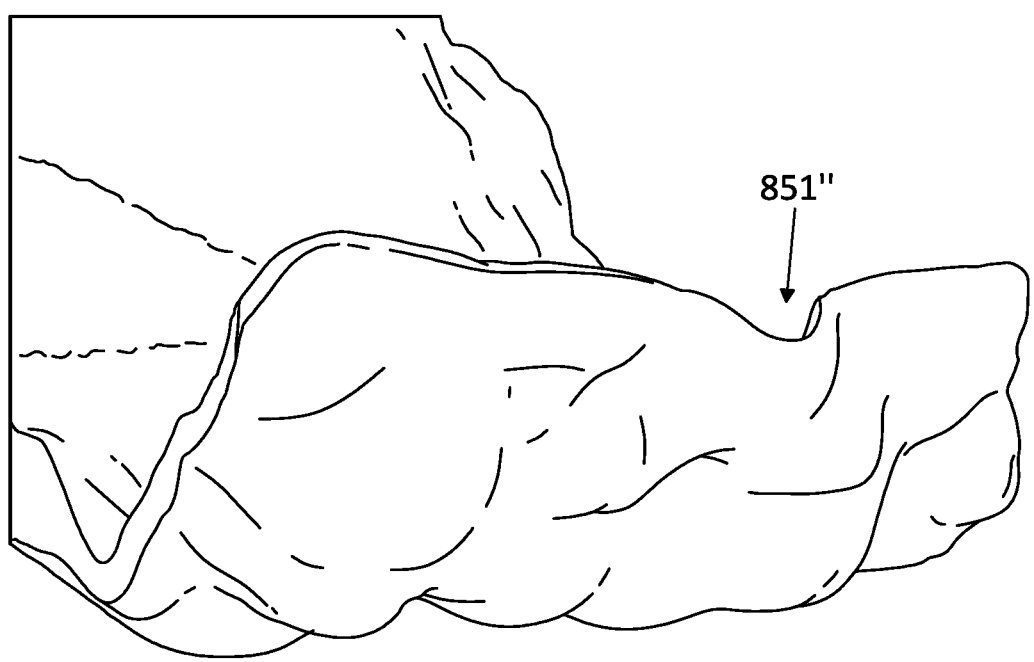
FIG. 7B illustrates another example of a palatal expander having a bottom edge region of the buccal side of the palatal expander shell configured as a detachment region.

FIGS. 7A and 7B illustrate examples of detachment regions that may be used with a tool and/or a user or patient's fingernail. In FIG. 7A two detachment regions 851, 851' are shown on the buccal side of one of the tooth engagement region of an apparatus to be worn on the teeth. In FIG. 7A, the apparatus also includes a pair of engagement regions 898, 898' that are configured to engage with attachments mounted on the patient's teeth. In FIG. 7A, the detachment regions are configured as upward-facing (e.g., facing away from the occlusal surface of the patient's teeth when worn) pockets or tabs. A protruding region on the apparatus that is positioned downward (e.g., towards the outer occlusal surface of the palatal expander when worn) may act as a base or fulcrum for a removal tool that may engage with one or both of these detachment regions, as will be described in greater detail below. In FIG. 7A, the base or fulcrum region may be the outer surface of the attachment region, or a region that is offset from the attachment region downward, towards the occlusal side of the apparatus.

In FIG. 7B, the bottom edge of the buccal side of the apparatus is configured as a detachment region forming an upward-facing pocket that can engage with a detachment/removal tool (and/or a fingernail). Thus, any of the apparatuses described herein may include a release (e.g., detachment region) that is formed at least in part by a lip or ledge forming a finger gap that can be manipulated by a patient's finger (e.g., fingernail). In some variation, such as shown in FIG. 7B, the gap may be formed as an outwardly extending buccal edge of the apparatus. In FIG. 6B the gap 780 or separation between the palatal expander and the gingiva may be along all or a portion of the bottom of the palatal expander and may be sized to permit the patient's finger/fingernail or a detachment (e.g., removal) tool to engage and pull the palatal expander away from the palate. The palatal expander may include an extension 759 at the bottom edge of the buccal side of the palatal expander. The extension may be specifically designed to leave a gap between the palatal expander and the gingiva, e.g., up to the gingival line 761. The extension of the buccal section below the gingival line by the extension, as well as the separation between the gingiva and the palatal expander may provide for better removal.

Figure 7C:
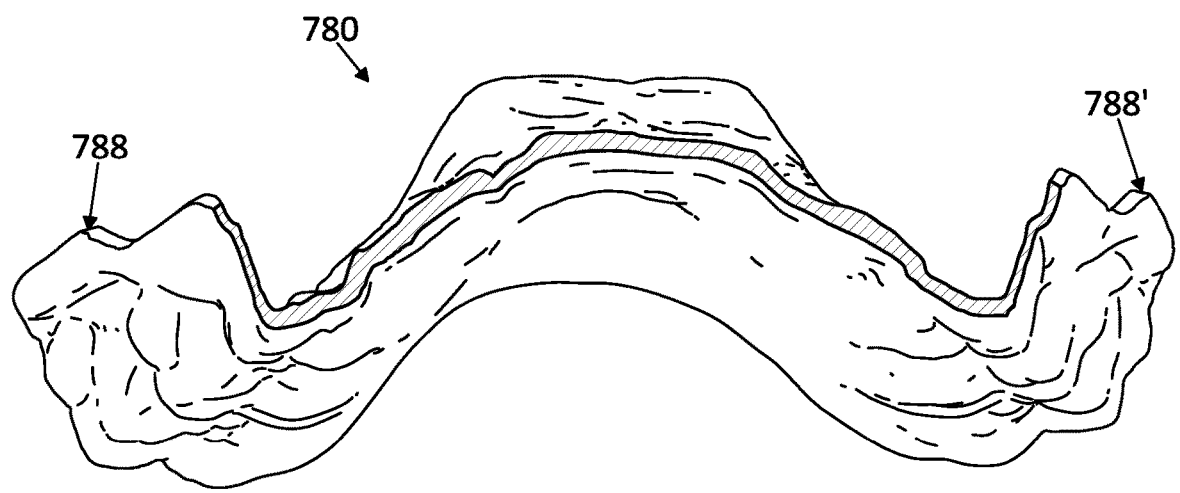
FIG. 7C shows another example of a palatal expander having a bottom edge region configured as a detachment region, configured to provide a handle on each side of the palatal expander.

FIGS. 7C-7F illustrate another example of a palatal expander 780 having one or more detachment regions 788, 788' that may be used with a tool and/or a user or patient's fingernail. In FIG. 7C two detachment regions are shown on the buccal side of the apparatus to be worn on the teeth. The apparatus may also include one or more (including one or more pairs) of engagement regions that may be configured to engage with attachments mounted on the patient's teeth. In FIG. 7C the detachment regions are configured as handle regions that are offset from the bottom (gingival) edge of the palatal expander. As described in the profile shown in FIG. 6B the handle or detachment region may be offset (in a direction normal to the buccal side of the teeth) from the cavity retaining the attachment when the device is worn by the patient. The offset in this outward direction may provide a reasonable angle for disengaging the attachment from the palatal expander.

Figure 7D:
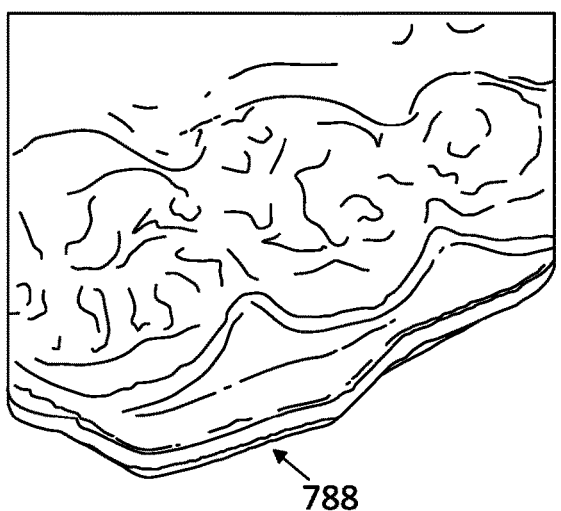
FIG. 7D shows an enlarged bottom view of the handle region of FIG. 7C.
Figure 7E:
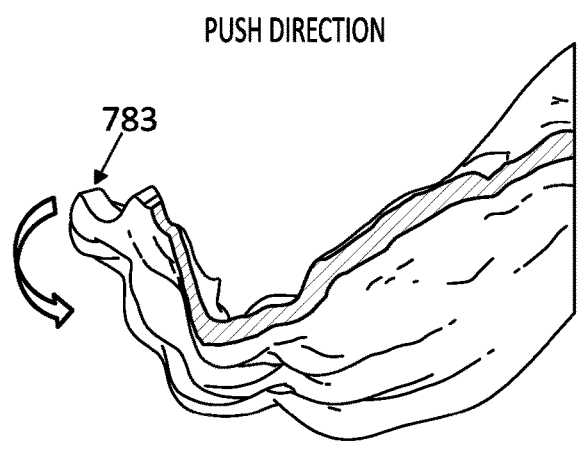
FIG. 7E shows a profile view illustrating operation of one of the detachment regions (handles) of the device shown in FIGS. 7C-7D.
Figure 7F:
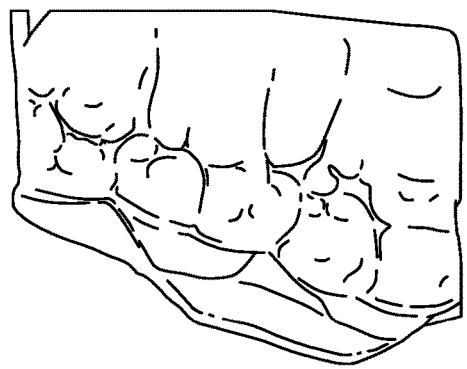
FIG. 7F shows an enlarged top view of the handle region of FIG. 7C.

FIGS. 7D and 7F show examples of the underside (bottom) and upper side (top) views of the handle portion, also referred to herein as a detachment region. The handle portion (e.g., handle, handle feature, detachment region, etc.) may be a small tab on the palatal expander designed to ease the removal process for parents/patients. This feature may also be configured to reduce unwanted shear forces applied to the retention attachments during device removal by providing a place to push with a finger or thumb to begin a rotational movement needed to disengage the device from the retention attachment system (attachments not shown). For example, FIG. 7E the user (patient, caregiver, etc.) may apply force against the top surface of the handle/detachment region and a twisting moment is generated at the handle/detachment region, as shown by the arrow in FIG. 7E, resulting in separating the palatal expander from the attachment and therefore from the patient's teeth. The detachment feature (e.g., handle) shown in FIGS. 7C-7F is longer than variations illustrated above, extending from one end of the molars/premolars to the other along a lateral length of the teeth in this region. The length and extent (protrusion) of the handle regions shown may be customized to the length of the use's teeth and/or the size of their oral cavity. In general, the handle region in this example extends outwards from the buccal side by between 0.5 and 10 mm (e.g., between about 0.5 and 5 mm, between about 0.5 and 4 mm, etc.). The length of the handle/detachment feature may depend on the spacing between, e.g., the patient's molars. Thus, this feature (the detachment feature and component parts) may be customized for each patient. It typically spans the distance between the retention attachments and can be located on either one or both sides of the palatal expander. A handle (e.g., detachment feature) may also eliminate the need to have an ideal size/strong fingernail or a separate tool to easily remove the palatal expander. These handle/detachment features may also be customized, e.g., hiding based on the space in the user's oral cavity.

In general, the handles/detachment features may be configured so that it/they do/does not protrude more than a short (e.g., 1-3 mm, e.g., 2-3 mm, 1-2 mm, etc.) distance beyond the distance offset from the buccal aspect of the teeth in the direction of the gums.

In FIG. 6B, the minimum gap at the soft palate (e.g., the mid-line region) may preferably be ~0.5 mm (e.g., between 0.01 mm and 1 mm, between 0.1 mm and 0.75 mm, etc.) to prevent any touch. Larger gaps may cause food entrapment. The gap between the palatal surface of a trans-palatal segment and the palate may be controllable across the palate. Extension of the buccal section below the gingival line; as mentioned above, to provide enough mechanical advantage (or moment) for ease of removal, the device trim line may be extended 1-3 mm lower than gingiva line. A gap of 0.25-1 mm between the extension and gingival may be provided to facilitate hooking of patient/parent's finger/nail for removal, as shown in FIG. 6B.

Figure 8:
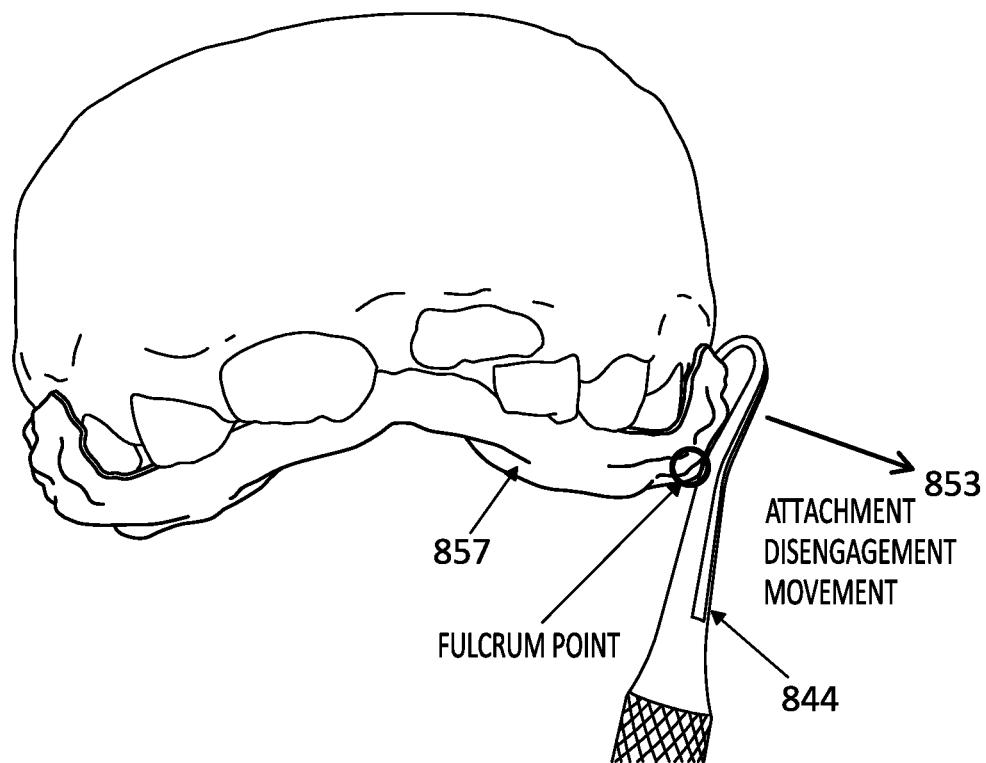
FIG. 8 illustrates an example of detachment of a palatal expander from a patient's upper arch using a removal tool. The tool may apply a pulling force to cause a breach region of the palatal expander shell apparatus to break or bend along the breach region and to disengage the palatal expander shell apparatus from the first or second set of the patient's teeth, including detaching the palatal expander for one or more attachments on the patient's teeth.

FIG. 8 illustrates one example of a removal tool 844 and removal of a palatal expander 857 worn on a patient's upper arch. In FIG. 8 the tool includes a hook and an elongate arm. A portion of the tool may rest against a fulcrum region (e.g., base region) to allow the tool leverage to apply a pulling force 853 to detach the apparatus from the patient. This pulling force may cause a breach region (not visible in FIG. 8) to bend or break. FIGS. 9-14 illustrate alternative examples of detachment tools (removal tools) that may be used.

Devices for removing a dental apparatus, and particularly a palatal expander, must have sufficient stiffness and leverage to apply the desired pulling force in an easy manner and without harming the patient. For example, in some apparatuses, there is a need to apply a significant force on the arch and palate during normal wear of the apparatus; this force may be greater than about 50 Newtons (N). As a result, the removal force (pulling force) may be considerable and the removal of the appliance may otherwise be difficult. As discussed above, the apparatuses described herein may address these issues, for example, by making the appliance easier to remove by including one or more breach regions enhancing bending and controlled breakage. The removal tools described herein may also address this need.

Any of the apparatuses described herein may be configured to interface with one or more customized tools or human finger. Optionally the interface between the removal tool and the appliance may create a force system that will direct all the force to bending in the designated direction of the breach region, thus enabling the removal of the appliance with minimal force.

In FIGS. 9-14C, the removal tools (also referred to as disengagement tools) may include a hook region that may be inserted into a pocket, tab, latch, etc. of a detachment region, and/or may be inserted between the teeth and the appliance. When the force is applied by the tool, the pulling force may be oriented to bend and/or break the breach region and disengage the attachment from the appliance (e.g., palatal expander) with minimal effort.

Figure 9:
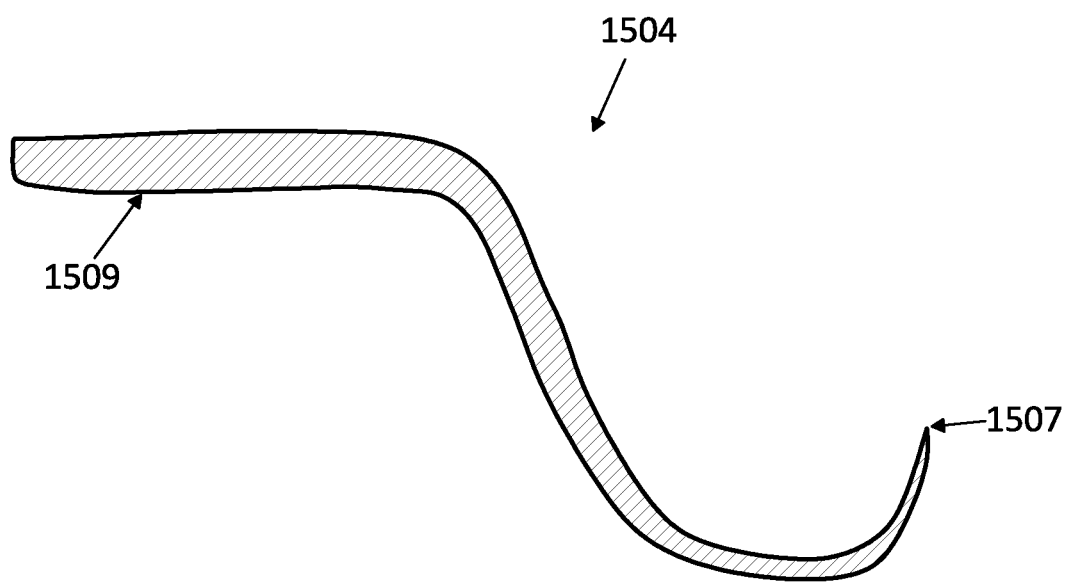
FIG. 9 illustrates an example of a tool that may be used to remove a palatal expander, including a proximal grip region and a distal palatal expander engaging region.

For example, FIG. 9 shows an example of a removal tool 1504. This example of a removal tool may be a metal (e.g., stainless steel) and may be shaped for easy access into the disengagement region (e.g., gap) of the palatal expander. As shown in FIG. 9, one end 1507 may be configured to enter the gap and apply the pulling force. The apparatus may also include a gripping region 1509 to allow easy control of the tool. In general, the detachment region (or removal grip, etc.) may be configured for use with a tool such as the removal tool shown in FIG. 9.

Figures 10A, 10B:
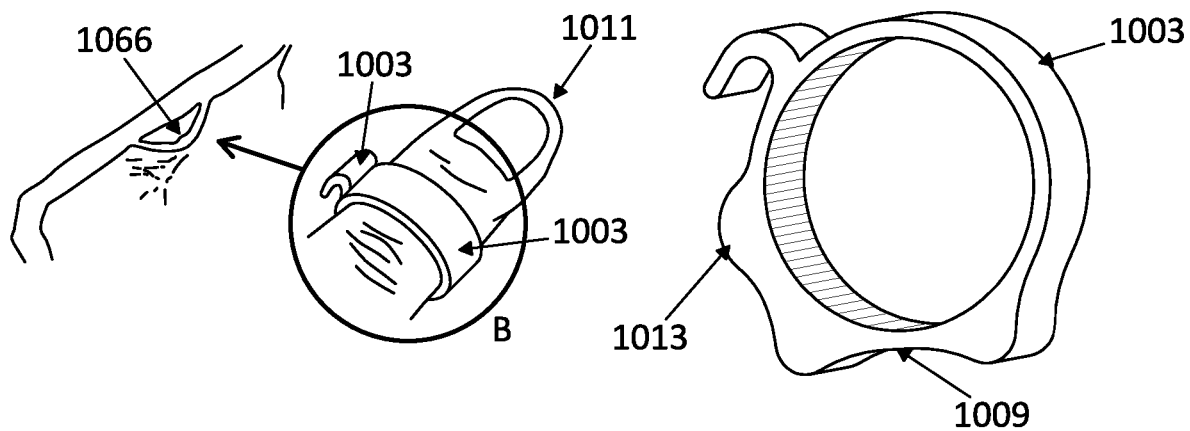
FIG. 10A illustrates another example of a removal tool configured to apply a pulling force and remove a palatal expander from a patient's dental arch.
FIG. 10B illustrates an enlarged view of the tool of FIG. 10A.
Figure 10C:
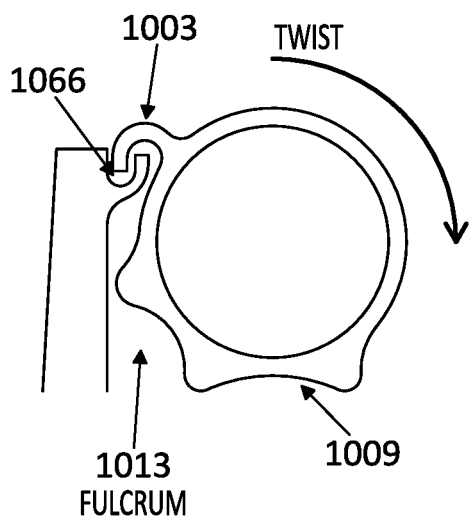
FIG. 10C illustrates operation of the tool of FIG. 10A-10B. The tool includes a flat region 1009 on the outer surface that may be used as a finger rest and to assist in using the fulcrum region, e.g., hold the ring stable when applying a pulling force by twisting or rotating (as shown) to remove the palatal expander appliance, preventing the ring from rotating around the finger.

FIGS. 10A-10C illustrate another example of a removal tool, configured as a ring 1003 having a hook 1005 that may engage with a detachment region 1066 of an apparatus such as a palatal expander. In this variation, the detachment or removal tool may be worn on a user's finger 1011. The tool may also include an outer region 1009 configured to stabilize the ring to prevent it from rotating around the user's finger when applying force. In FIGS. 10B-10C, the stabilizing outer region 1009 is configured as a flat or concave region on the outer ring surface that can be held by another finger or against an adjacent finger. A region of the tool may also be configured to act as a fulcrum 1013 against which force can be applied (against the appliance, e.g., palatal expander) when operating the tool to remove the appliance. This fulcrum region may be protrusion, extension or base. FIG. 10C illustrates operation of the tool to apply a pulling force on an appliance to remove it from a patient's teeth.

FIGS. 11A-11D illustrate another example of a removal tool (e.g., detachment tool). The detachment tool may include a curvature 1107 of the elongate arm (handle) region to avoid contact with the patient's face when operating the tool. The distal end of the tool is hooked or curved to engage with a detachment region (including a pocket and/or the bottom edge of the buccal side of the appliance). In this example, the hooked distal end region 1103 lies in a plane that is at an angle to the plane of the curvature 1107. In FIGS. 11A-11D, the angle is approximately 90 degrees, but may be +/−60 degrees from this angle (e.g., an angle of between 30 degrees and 150 degrees). FIGS. 11C-11D illustrates the operation of the apparatus to apply a pulling force on an appliance worn in the mouth. In FIG. 11C, the distal end also rests in part on a fulcrum region of the appliance to apply the pulling force so that the force is laterally outward and in the downward direction (e.g., including both a laterally outward and downward vector component). Applying the pulling force may bend or break a breach region on the appliance, as described above.

A removal tool may be configured to be actuated by a control. For example, FIG. 12 illustrates a conceptual model of a removal tool (e.g., disengagement tool) that includes a control for applying the pulling force. In FIG. 12, the appliance includes a hooked distal end portion 1205. The hooked distal end may engage with a detachment region (e.g., upward-facing pocket) 1266 on the appliance. The hooked distal end is at the end of an elongate support arm 1206. The tool of FIG. 12 also includes a second support arm 1207 that acts as a brace or lever arm against a fulcrum region 1213 on the appliance. In this example the first elongate support arm 1206 and hook 1215 are coupled to a control (shown as a squeeze handle) 1219 on the tool; when activated, the control causes the hook to pull with a laterally outward and downward pulling force (pushing against the fulcrum region) to disengage attachments and/or bend or break a breach region on the appliance.

FIGS. 13A-13G illustrate other examples and variations of a removal tool (e.g., detachment tool). Each of these examples includes a handle portion 1318 that may be held by the user, and a distal end with an engagement (hook) region 1305 that engages with an appliance, e.g., at an engagement region of the appliance. Each of these apparatuses includes a hook region with a fulcrum region 1311 for easy attachment disengagement. The variations shown in FIGS. 13A-13G have different spacing between the hook and fulcrum regions and some have different handle configurations. FIG. 14A shows another example of a removal tool having a hook 1405 and fulcrum region 1411 and handle portion 1418.

Figure 14B:
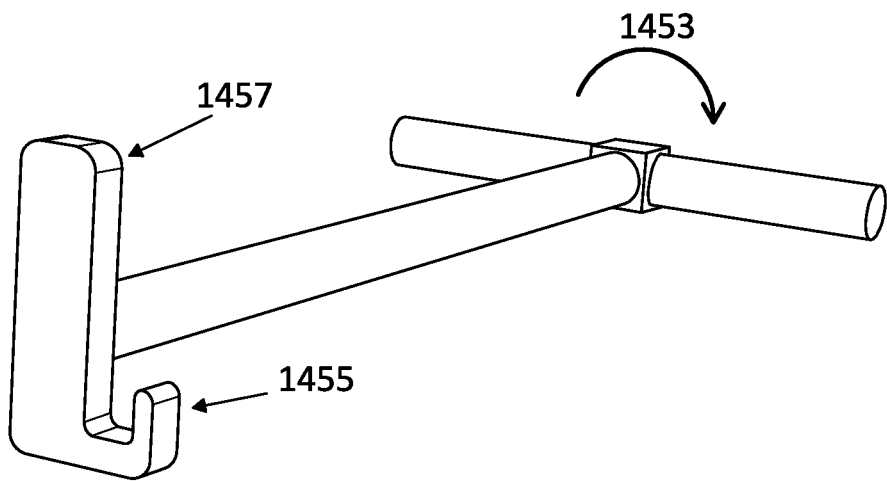
FIG. 14B shows another example of a removal tool for applying force to remove a palatal expander as described herein.
Figure 14C:
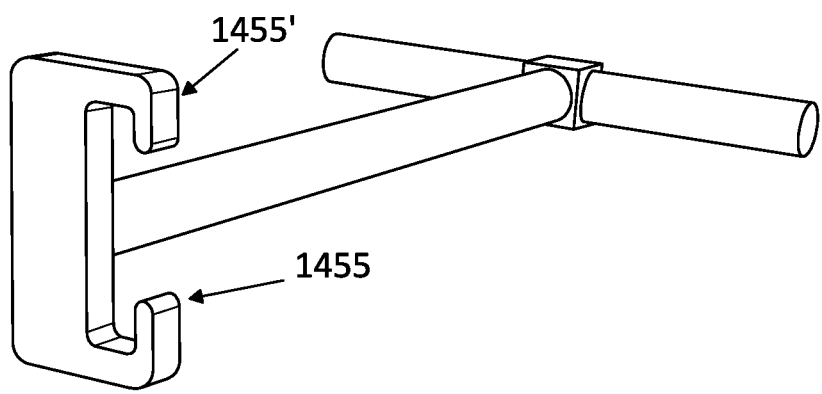
FIG. 14C is another example of a removal tool for applying force to remove a palatal expander.

FIGS. 14A and 14C illustrate two additional removal tools (e.g., detachment tools) that may be operated as described herein. For example, in FIG. 14A the detachment tool may be inserted so that it is on the patient's left side, and may be twisted 1453 by the user in a clockwise direction (shown by arrows 1419 in FIG. 14B). When twisted in this manner, the hook end portion 1455 engages with a disengagement member and/or under the gingival ledge formed as part of the palatal expander. The end of the device opposite from the hook 1455 is a cantilever region 1457 that may push against the palatal expander at a region that is on an opposite side of the attachment mating zone. The exemplary tool shown in FIG. 14C may be used in patient's in either orientation without disturbing the patient. For example, in FIG. 14C the tool shown has two hook end portions 1455, 1455', allowing the device to be inserted into and use on either the patient's left side or right side to disengage a palatal expander.

Figure 15A:
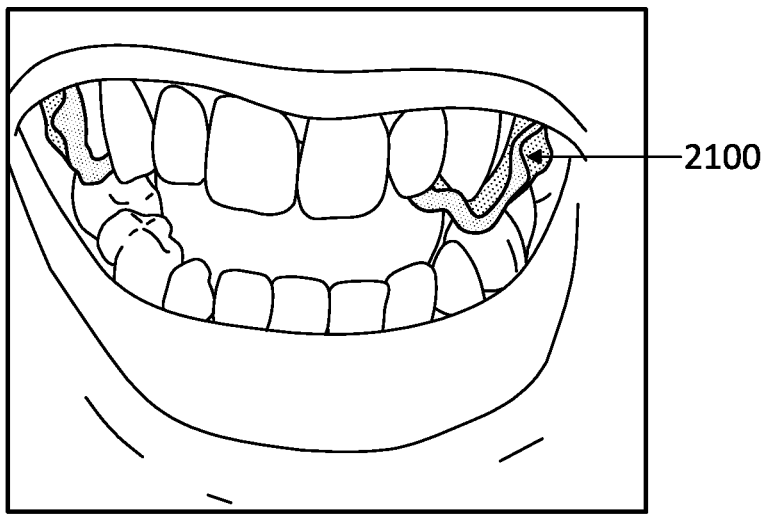
FIGS. 15A-15C illustrate an example of a method of inserting a palatal expander 2100 in a patients teeth including, placing the device in the patient's mouth on the upper dental arch (FIG. 15A), and biting down on the palatal expander apparatus (FIGS. 15B and 15C) to seat the device and secure it over the teeth, including in some examples, onto the attachments.
Figure 15B:
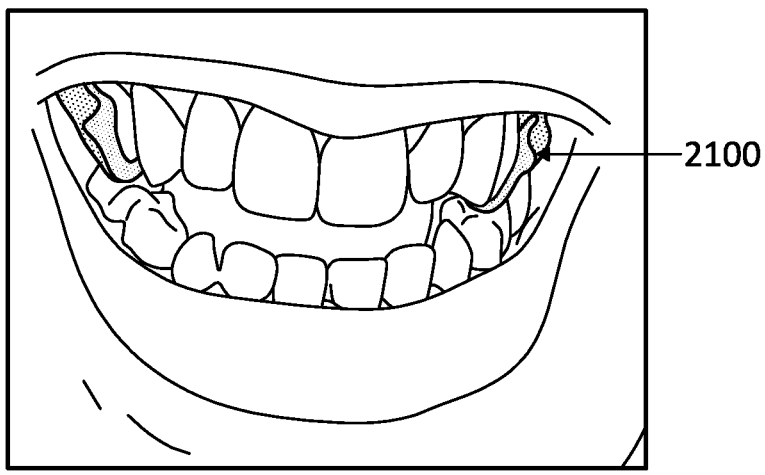
Figure 15C:
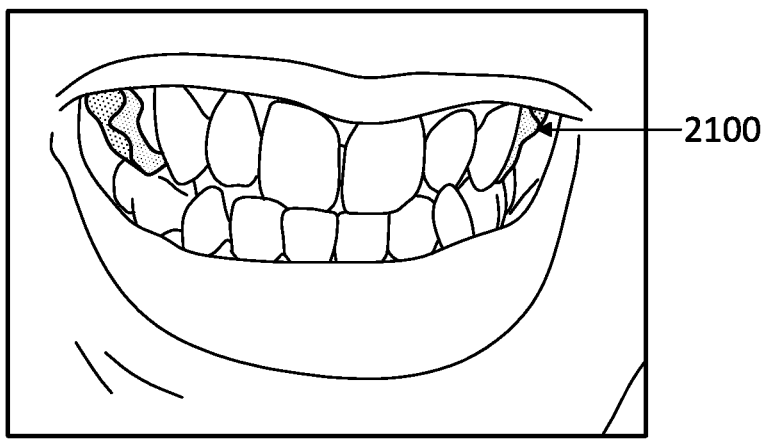

In use, any of the apparatuses described herein may be inserted by the patient, and/or by a dental professional. For example, a patient may be provided with instructions for inserting a palatal expander including first brushing and flossing the teeth. The patient may also confirm (e.g., by reading the markings on the palatal expander) that it is the correct device. The palatal expander may then be cleaned, e.g., with a soft bristle toothbrush, water and a small amount of toothpaste) and rinsed (e.g., with cold tap water). As shown in FIG. 15A, the device 2100 may then be inserted into the mouth, and, as shown in FIGS. 15B and 15C, the palatal expander may be fully engaged on one side of expander first, then applied over the teeth of the other side. The patient may then bite down to fully seat the device.

Figure 16A:
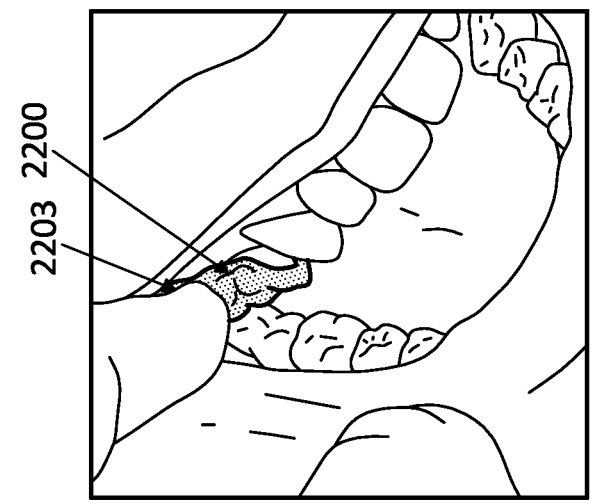
FIGS. 16A-16C illustrate removal of an example palatal expander apparatus including a detachment region by inserting a fingernail into the detachment region (FIG. 16A), pulling buccally away from the teeth (FIG. 16B) to disengage from any attachments, and then pulling down (FIG. 16C) to remove the apparatus from the teeth.
Figure 16B:
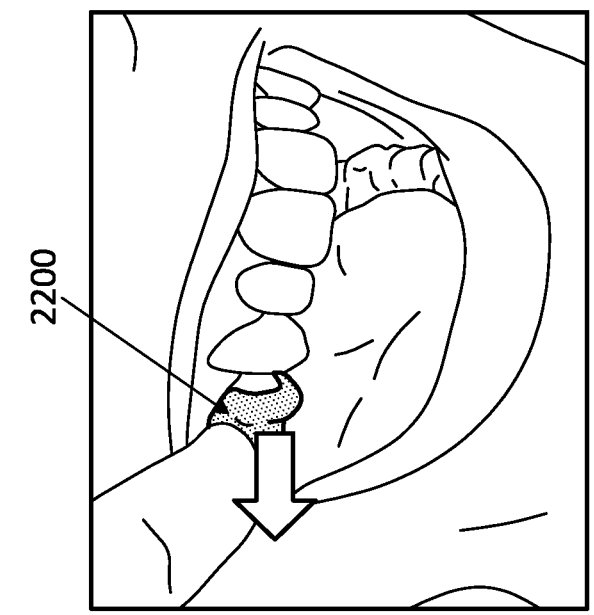
Figure 16C:
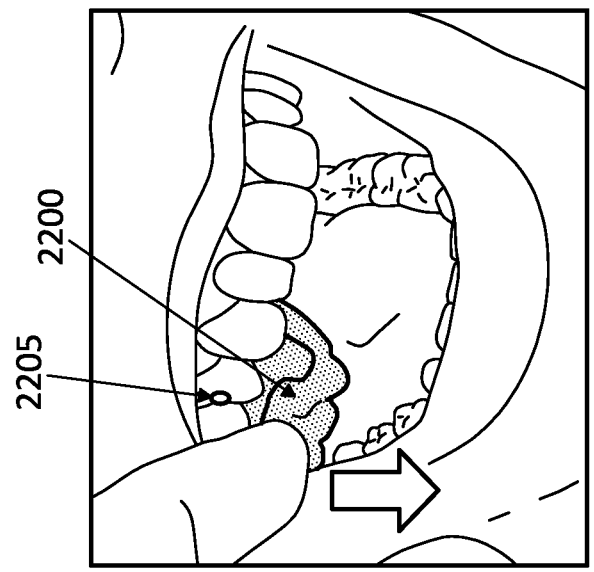

Similarly, the patient (or a patient's caregiver, parent, etc.) may remove the device, as shown in FIGS. 16A-16C. To remove the device, the patient (or caregiver) may insert a fingernail 2203 or a removal tool inside of a detachment region. The detachment region may be on a buccal side of the apparatus and/or it may be a gap at the bottom edge of the buccal side of the apparatus. A pulling force may then be applied to pull laterally outward and downward (e.g., towards the lower jaw) to disengage the appliance (e.g., palatal expander) 2200 from one or more attachments 2205 on at least one side, as shown in FIG. 16B. As described above, this may be achieved by bending or breaking the appliance along one or more breach regions. The appliance may then be pulled down and off of the teeth, as shown in FIG. 16C. Once removed, the palatal expander may be cleaned and/or stored or discarded, e.g., when moving to the next stage of treatment.

Figure 17A:
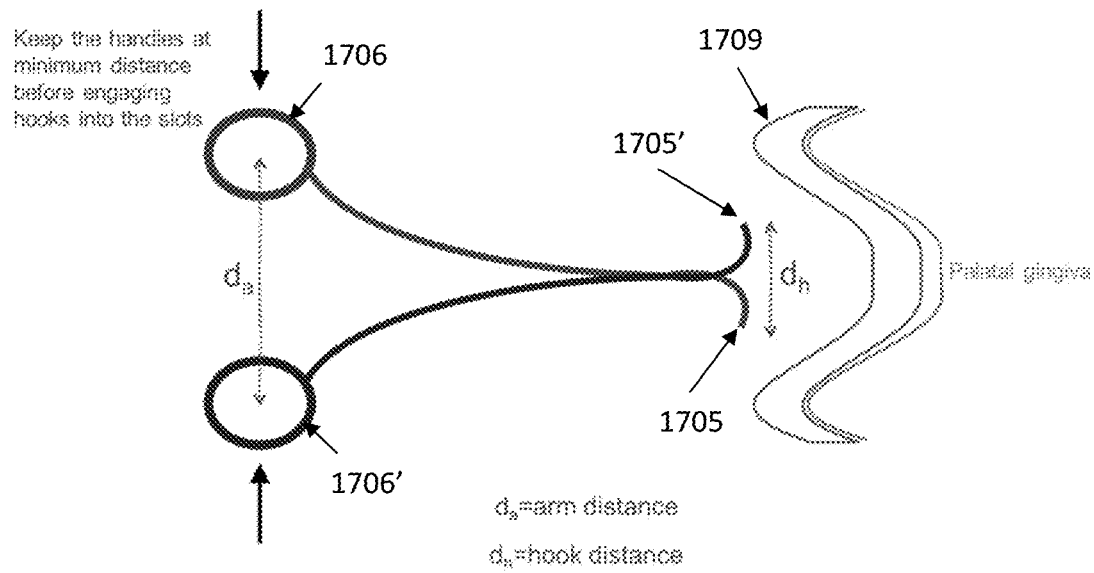
FIGS. 17A and 17B illustrate operation of another variation of an example tool for removing a palatal expander, configured to apply force from the palatal region of the apparatus to remove the palatal expander from the patient's teeth. The tool may apply a force to cause a breach region of the palatal expander shell apparatus to break or bend along the breach region (e.g., in the palatal region of the palatal expander) to disengage the palatal expander shell apparatus from the patient's teeth.

FIGS. 17A-17B and 18A-18B illustrate another example of a detachment tool; the tools shown in FIGS. 17A-17B and 18A-18B are configured to remove the apparatus by applying force in a laterally inward direction to the palatal region of a palatal expander appliance. For example, in FIG. 17A, the detachment tool (e.g., removal tool) is shown prior to engaging with detachment regions on the outward-facing palatal region of a palatal expander. In FIG. 17A, the tool includes handles 1706, 1706' that are compressed (to an arm distance of $d_a$ between each other), which also shortens the distance, $d_h$, between the air of engagement regions (e.g., hooks) 1705, 1705' at the distal end of the device.

Figure 17B:
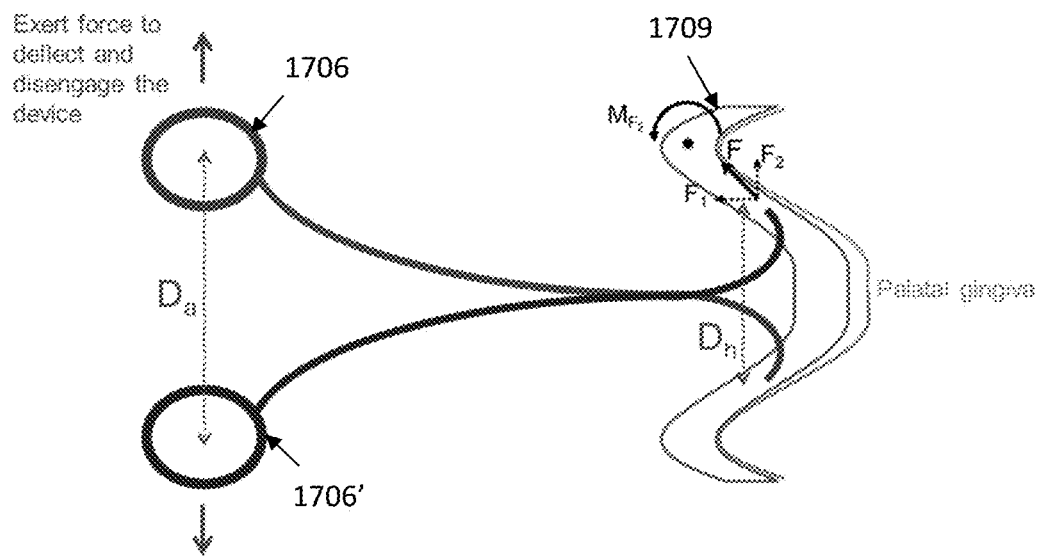

Once compressed, the engagement regions of the tool may be inserted securely into a pair of detachment regions on the palatal expander 1709. The handles may then be pulled away from each other (or released so that a bias, such as a spring, may separate them), so that the engagement regions can engage within the detachment regions of the appliance, as shown in FIG. 17B. Once engaged, the tool arms from which the engagement regions extend to the handles may allow the application of force to apply a laterally inward force to compress the palatal region. The force, F, applied may include vertical and horizontal components, depending on the coupling between the appliance and the tool. For example the applied force, F, may include a component force $F_2$ that exerts a moment around occlusal area while a second component force, $F_1$, may pull down the device (e.g., towards the opposite jaw). The force between the left side of hook and the slot may be distributed (as opposed to concentrated at one point). The angle of slot can be optimized to reach an optimal removal process.

Figure 18A:
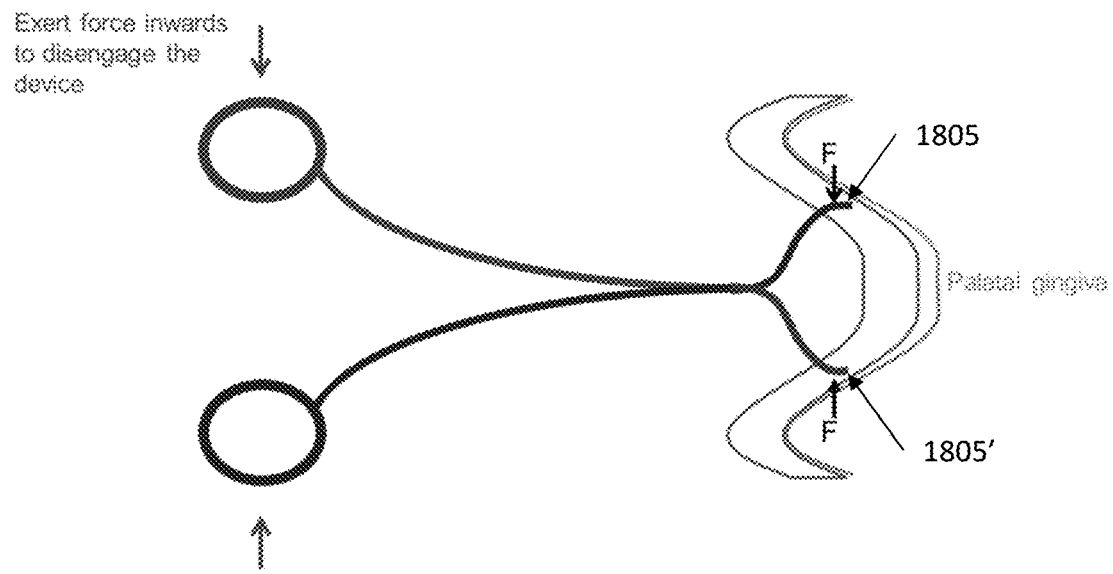
FIGS. 18A and 18B illustrate operation of another variation of an example tool for removing a palatal expander, configured to apply force from the palatal region of the apparatus to remove the palatal expander from the patient's teeth. The tool may apply a force to cause a breach region of the palatal expander shell apparatus to break or bend along the breach region (e.g., in the palatal region of the palatal expander) to disengage the palatal expander shell apparatus from the patient's teeth.
Figure 18B:
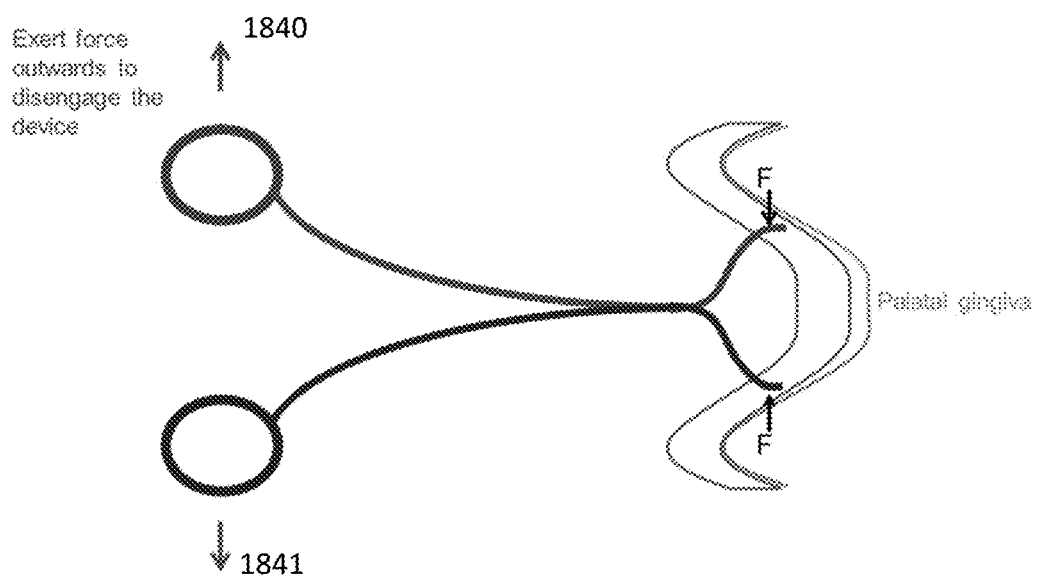

In some variations, the tool may engage securely with the appliance, so that the handles can again be brought closer together, opposing the laterally outward force applied by the appliance, and allowing it to compress; if a breach region is present (e.g., between the attachment sites) on the appliance, the appliance may bend or break at the breach region, making it easier to remove the apparatus. FIGS. 18A and 18B illustrate an example having this configuration.

In FIG. 18A, the engagement regions on the distal ends of the apparatus include hooks that are configured to be horizontal and/or inward curving, so a compressive force may be exerted to the palatal expander. By applying an amount of compressive (laterally inward) force on the appliance, e.g., on the palatal region of the appliance, the appliance may cause the apparatus to disengage from the teeth. The compressive force $F_c$ typically causes the device to bend or break (e.g., at a breach region) while remaining engaged with the appliance, allowing the appliance to be released from the patient's teeth. The direction of force exertion can be reversed as shown in FIG. 18B, by allowing the arms to bend or twist relative to each other so that they extend from a hinge region 1809 in the same side of a mirror axis through the tool as they approached the hinge region.

In FIG. 18A, the distal end engagement regions may attach to the inside (lingual) side of the appliance (or in some cases the occlusal side or buccal side) to apply a laterally inward force from either sides of the appliance. For example, in FIG. 18A, the distal engagement ends 1805, 1805' engage with the palatal region of the device and secure to it so that they handles can be pulled together to apply a compressive force (laterally inward). This compressive force may therefore bend or break a breach region, aiding in removal of the apparatus. In the variation shown in FIG. 18B, pulling the two handles apart (to increase the distance between them, as shown by arrows 1840, 1841) applies a compressive force to the appliance, and therefore bending or breaking a breach region to release the appliance from the patient's teeth.

Any of the variations the apparatuses described herein may be configured so that the palatal expander is locked onto the patients upper arch when worn, and may be unlocked to facilitate removal from the teeth. For example, the apparatuses described herein may include a lock which may include a release control (e.g., latch, lever, switch, tab, arm, snap, etc.) that engage with a stay to secure the palatal expander to the teeth until the lock is release, e.g., by operating the release control to disengage the lock from the stay. In some variations the lock and/or release control portion of the lock is on or integrated with the palatal expander. For example, the release control may be a latch, bar, pin, tab, snap, arm, switch, lever, etc., that is part of the palatal expander and engages a stay that is formed on and/or from an attachment bonded (or to be bonded) to the patient's teeth. Alternatively or additionally, the release control is part of the attachment bonded to the patient's teeth which engages a stay on the palatal expander. The stay may include a channel, hollow, check, cleat, hook, catch, clasp, hasp, etc., that engages with the release control to secure (or release) the lock.

The apparatuses described herein may generally be configured to provide sufficient retention under the palatal resistive force to prevent the palatal expander from moving, loosening, or accidental removal, but may be further configured to allow for removal with a physiologically-relevant amount of force, e.g., a force that can be easily applied by patient/caregiver, in order to release the device from the retention attachments. As mentioned, the retention attachments may be locking. Thus, the retention features described herein may provide high retention, e.g., when locked, but may have a relatively low force to disengage and/or dislodge the palatal expander from the retention attachments.

Additive manufacturing can make prefabricated attachments with complex geometries and accuracy. Also, complex logging features can be formed on palatal expanders as they are made via additive manufacturing. This disclosure introduces retention features that have the advantage of providing high retention, but requiring low force to dislodge from the retention attachments.

For example, described herein are attachments that may be configured as either the release control of the lock or as the stay to which the release control secures. For example, the attachment may be a stay configured to bond to the teeth and include a channel, hollow, cleat, hook or catch (generically, a stay) forming an opening and/or channel into which the release control on the palatal expander couples to releasably lock the palatal expander to the attachment and therefore to the patient's teeth.

Figure 19A:
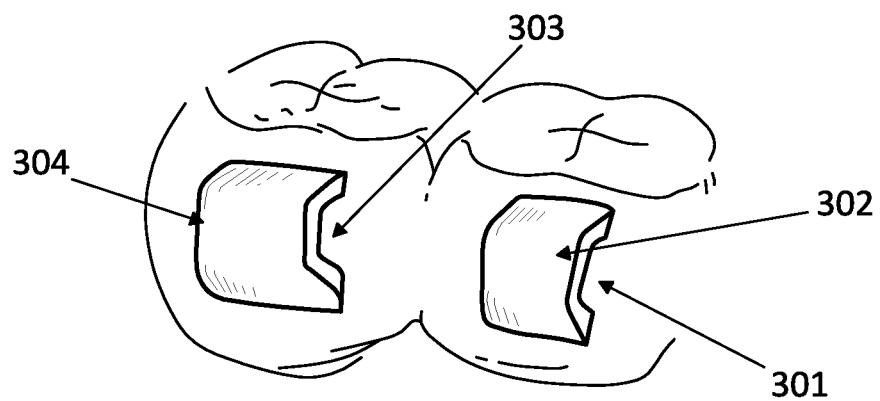
FIGS. 19A-19B illustrate one example of a palatal expander system with locks for easy dislodging of the palatal expander from the teeth.
Figure 19B:
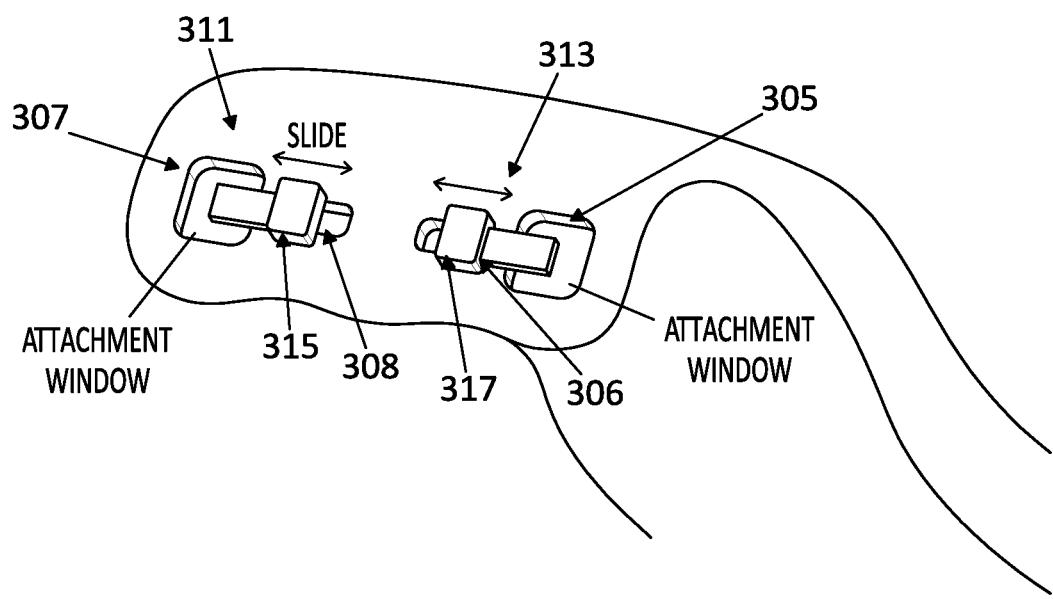

FIGS. 19A-19B illustrate an example of a palatal expander apparatus (e.g., system) with a lock having sliding and locking features. As shown in FIG. 19A, the attachments 302, 304 are configured to include a stay, formed into a bracket; each attachment in this example includes a bracket forming a channel 301, 303 into which a release control (e.g., latch) on or of the palatal expander may engage. The attachments are each bonded to the teeth in a position for the palatal expander to engage with them. The channels 301 and 303 in each bracket include openings that are properly sized such that they can fit over and retain latches 306 and 308 that may be slide to engage into the channels 301, 303 to lock the palatal expander in place. FIG. 19B shows the palatal expander with a pair of locks including a pair of release controls 311, 313; each release control includes a latch 306, 308, an attachment coupling region (e.g., attachment window) 305, 307 through the palatal expander to fit over the attachment, and a body portion 315, 317 that allows the latch to slide laterally across and/or into the attachment window opening in order to engage with the stay on the attachment (s). The latches can be moved laterally by the patient and/or caregiver to an unlocked position so that the palatal expander can be removed easily (e.g., withdrawn from out of the stay) or to a locked position (extending into the stay when the attachment is held in the attachment window. The attachment window may be an opening through the palatal expander or it may be an indentation (e.g., cavity, depression, hollow, etc.) into the palatal expander (e.g., the body of the palatal expander, such as the lateral, buccal side of the palatal expander).

Figure 20A:
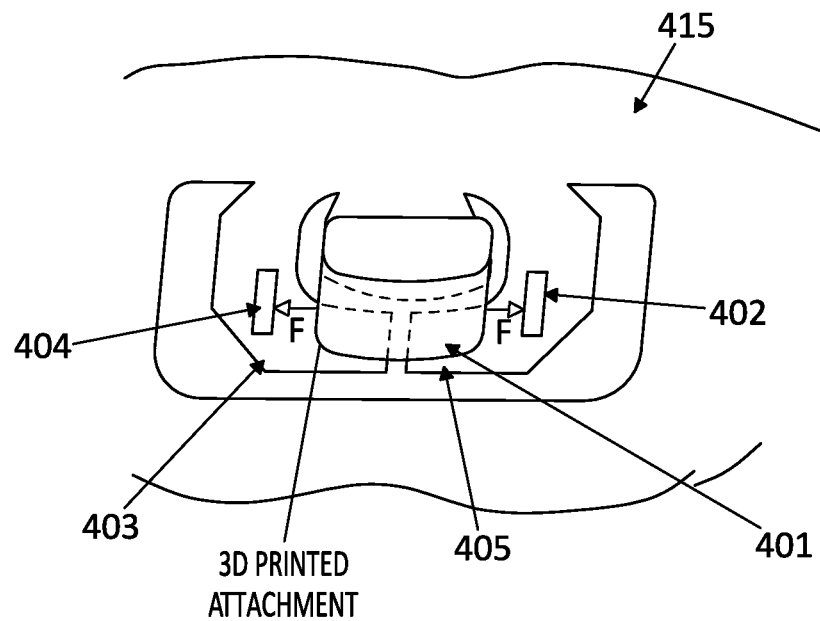
FIG. 20A illustrates a palatal expander with elastic hooking and dislodging for easy placement and release.

FIG. 20A illustrates another embodiment of the lock that may releasably couple the palatal expander to the patient's teeth. In this example, the palatal expander 415 include a pair of integrally-formed release controls configured as hooks 401, 403 forming arms that can be slightly deflected to engage through an attachment window of the palatal expander with a stay on the attachment bonded to the patient's teeth. The flexible (e.g., elastic, hinged or semi-elastic) arms 401 and 403 to place the palatal expander in a locked position when the expander is worn by the patient. The release control on the palatal expander may also include a tab 402, 404 on each arm of the release control that may help the patient and/or caregiver in applying force (F) to remove or release the lock by pushing the arms of the release control out of the stay so that they may bend or flex and release the palatal expander from the attachment. In FIG. 20A, the attachment include a stay that may be configured as a hook (e.g., open on three sides) as shown, or it may be a channel into which the arms of the release control may engage. In some variations the attachment is configured with a ramped surface, such as a camming surface, that the arms of the release control may engage against to automatically slide apart the arms allowing them to lock into the stay on the attachment. Because of the shape of the stay and the release control, pushing the apparatus (the palatal expander) onto the teeth and over the attachment may engage the lock automatically, but removing the lock may require the addition of force.

Figure 20B:
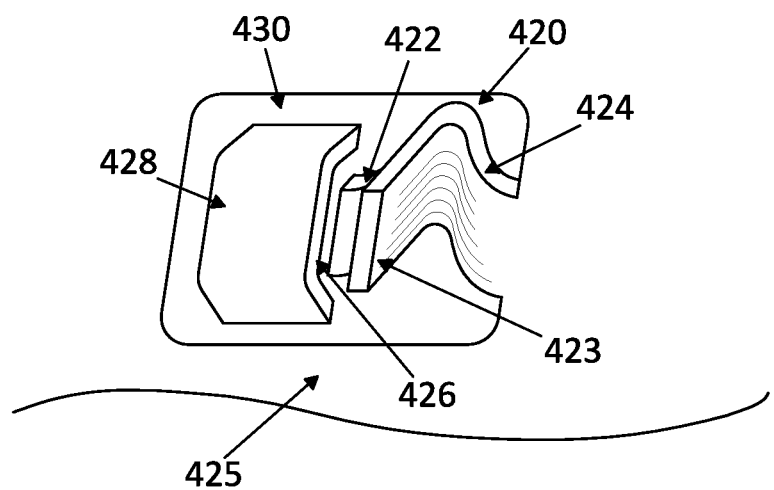
FIG. 20B Illustrates a palatal expander with an elastic lock engaged with the bracket.

FIG. 20B illustrates another embodiment of the invention. In this example, the attachment is configured to include a stay shown as a side-facing opening (e.g., with an opening in the anterior/posterior direction, along the lateral side of teeth, perpendicular to the occlusal surface when attached to the teeth). Thus, this stay is configured as a bracket 428 that may be bonded to the patient's teeth. The lock on the palatal expander 425 may therefore include a release control 420 that includes a protrusion arm or member 422 that is attached to a flexible elastic arch 424, which is integral with or attached to the palatal expander 425. The protrusion arm 422 extends into an attachment window 430 and is configured to fit with the stay's channel 226 to lock the palatal expander to the attachment when the palatal expander is worn by the patient. A low pulling force can be applied to the edge 423 (e.g., a tab), which may bend or compress the flexible arch 424 to disengage the protrusion arm 422 of the release control from the stay 428 on the attachment, thereby releasing the palatal expander from the teeth.

Figures 20C, 20D:
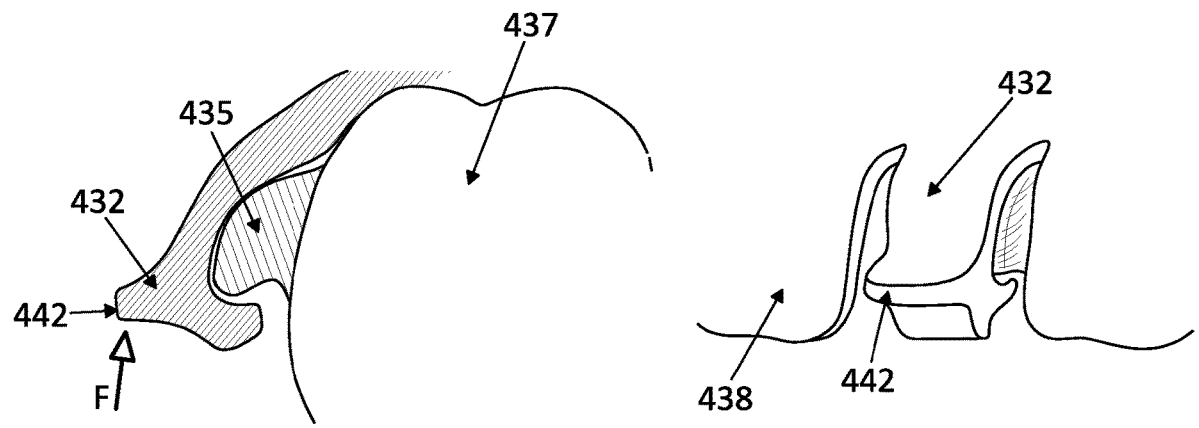
FIG. 20C-20D illustrate another example of a lock for a palatal expander configured to releasably engage with an attachment on a patient's tooth.

FIGS. 20C and 20D illustrate another example of a lock including a release control 432 that engages a stay 435 on an attachment bonded to a patient's tooth 437. FIG. 20C shows a side profile view, while FIG. 20D shows a front perspective view. In FIG. 20C the release control is a flexible arm 432 formed at the edge of the palatal expander 438; the release control may be deflected against the stay on the attachment as the palatal expander is attached over the teeth, including over the attachment(s) on the teeth, until it locks into a recess or cavity forming the stay on the bottom (gingival-facing) surface of the attachment, shown in FIG. 20D. The release control also include a tab 442 on the release control that the patient or caregiver may manually (or via tool) apply force F against to bend the release control away from the attachment and disengage it from the stay.

Any of the variations described herein may also aid in removal of the palatal expander by allowing the palatal expander to be, in a relaxed state, biased to uncouple from the patient's palate and/or teeth so that it can be removed readily unless the lock(s) holding the palatal expander to the teeth are disengaged.

Figure 21:
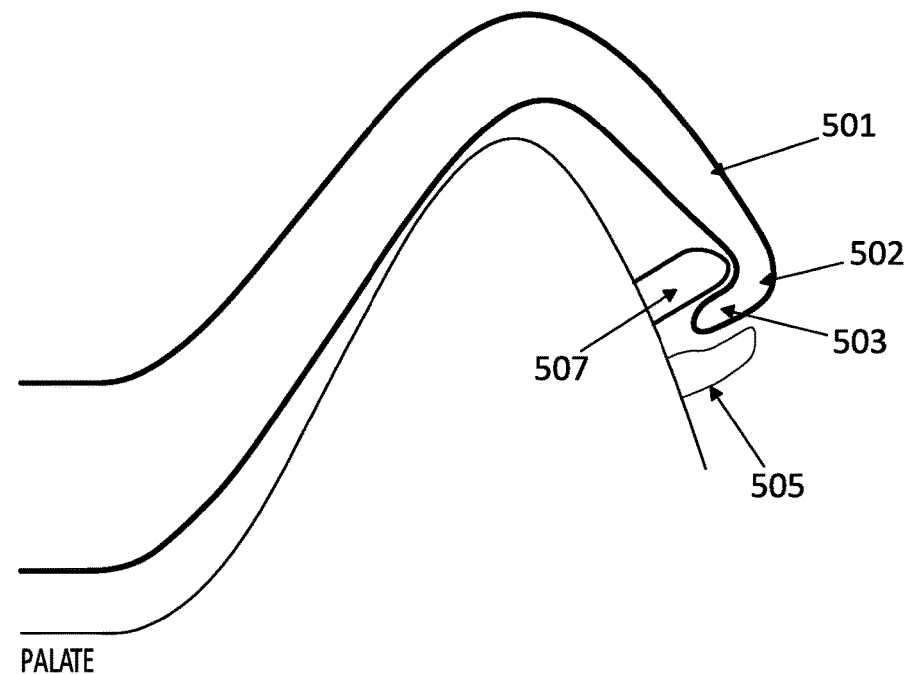
FIG. 21 illustrates a palatal expander, where the top and bottom parts of attachment can have different stiffness and angle so retention force and removal force can be separately designed to reach desired functionality and removal features.

FIG. 21 shows another variation of a palatal expander that is configured to lock onto attachment(s) on the patient's teeth for easy attachment and release of the palatal expander. In this example, the edge (the buccal edge) of the palatal expander 501 is configured as a release control shaped as a hook 503. The hook 503 is configured to engage with a stay on the attachment; in FIG. 21, the stay has two portions (though it may be formed as a single attachment or a pair of portions) 505, 507. Each of these components includes a lip or rim into which the hook 503 extends between. In some variations these components may each have a different stiffness. Hook 503 may be rigid, with a flexible region 502 that allows it to be hinged/bent to fit into the stay. In some variations the inner lip/rim 507 have a greater stiffness than the external lip/rim 505 of the stay on the attachment, which may allow the hook to apply sufficient retention force to the stay to retain the palatal expander when it is worn by the patient. The outer (external) lip/rim of the stay 505 may be more flexible than inner lip/rim 507 which may aid in removal of the palatal expander when a force is applied to this region to remove the hook 503 of the release control on the palatal expander.

Figure 22A:
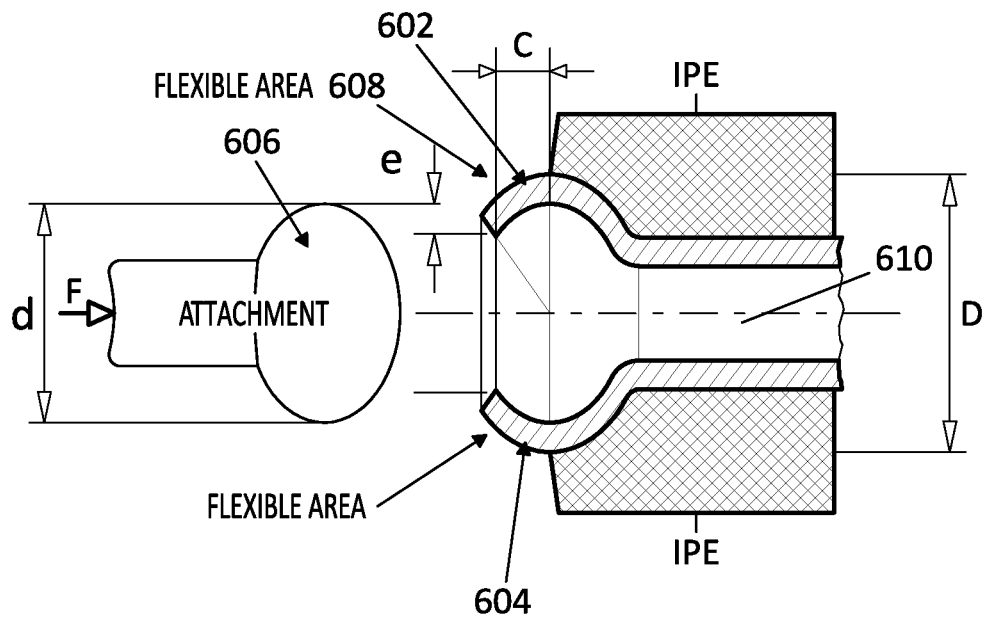
FIG. 22A illustrates a palatal expander having a ball and socket joint snap, where the attachment is the ball side and the expander is the socket side with flexible protrusions.

FIGS. 22A-22F and 23 illustrate other variations of release controls and stays that may be used to secure a palatal expander to a patient's teeth. For example, FIG. 22A shows an embodiment in which a ball and socket snap mechanism can be used. The release control in this case may formed as the receiving socket (ball socket) 602, which may be part of the palatal expander (IPE), while the attachment bonded to the patient's teeth may include the stay, configured as a ball or snap 606. In this example, the ball or snap may be attached into the socket by applying the palatal expander over the teeth and applying force to open the release control 602, which may include an opening that includes a flexible region 608. The release control may also include a release channel 610; the release channel may pass through the palatal expander (e.g., the buccal side of the palatal expander) and may be opened further, expanding the diameter D of the socket region, to disengage the stay from the release control. For example, a rod having a tapered or expanding diameter may be used to drive open the channel 610, disengaging the attachment. Alternatively or additionally, in some variations the attachment may be unsnapped by applying force F to pull the palatal expander from the attachment(s). Instead of the ball shape, other shapes such as triangle, square, oval and rectangle can also be used. The flexible protrusions 602 and 604 on the release control of the palatal expander may allow the engaging and dislodging of the expander.

Figure 22B:
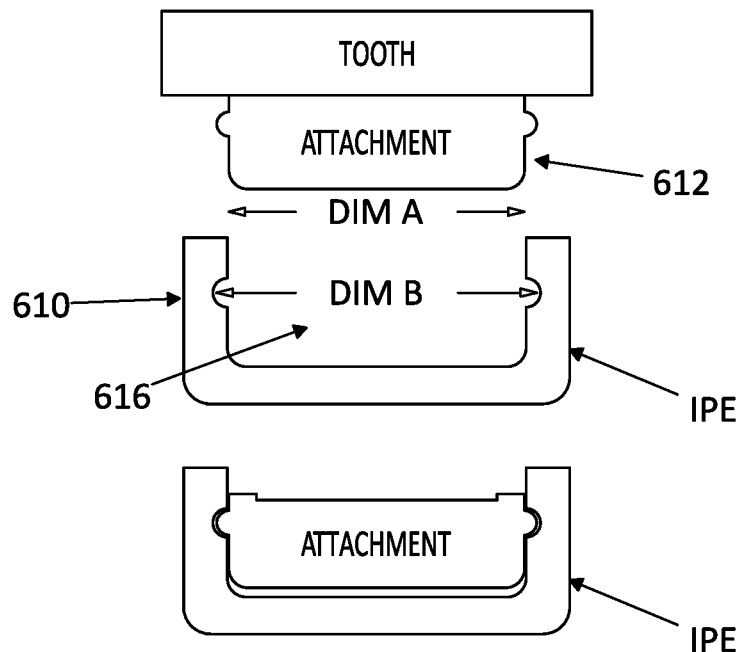
FIG. 22B illustrates a palatal expander having cylindrical shape attachments, where dim A side is the attachment with snap, and dim B is the expander side with the cylindrical slot.

FIG. 22B shows another example of a lock, configured as a snap (full perimeter snap) in this example. In FIG. 22B, the attachment 612 is bonded to the teeth and includes a rim or edge 632 configured as the stay to help retain the snap within the attachment window of the palatal expander. The palatal expander includes a cavity ("attachment window") or opening 616 that fits the attachment 610. The attachment 610 is connected to a palatal expander and is flexible for easy release when pulled. The inner diameter of the cavity 616 may be approximately the same as the outer diameter of the attachment. Alternatively, the stay 612 can be on the palatal expander and the release control 610 may be part of the attachment that is bonded to the patient's teeth.

For example, FIG. 22C shows a variation in which the lock includes a release control on the attachment; the release control comprises a pair of arms or prongs 620, 622 or shaped protrusions that are attached to the teeth for fitting with the stay formed on the palatal expander 621. The stay in this example, is an opening or channel 623 at least partially through the palatal expander that the prongs of the release control may snap into, as shown in FIG. 22D. In some variations, the prongs may include a tab or protrusion (no shown) that extends through the palatal expander that may allow them to be deflected towards each other to disengage the release control from the stay for removal of the palatal expander. The flexibility of the prongs may allow the palatal expander to be dislodged by applying low force. Alternatively, the prongs may be on the palatal expander and the stay may be on the attachment.

FIGS. 22E-22F show another example of a snap-on/snap-fit lock that may be used. FIG. 22E shows a schematic of the engagement between the release control 630 and the stay 632. In this example, the attachment 638 is configured to include a stay 632 and is bonded on the tooth 640. The stay may have a prefabricated shape and may include, e.g., a rim, lip, edge, or the like secure to a complimentary structure on the release control, as shown in FIG. 22F. As shown in FIG. 22F, the attachment 638 with the stay portion 632 may fit into an attachment cavity (attachment window) on the palatal expander (IPE) 636. For example, the release control region of the palatal expander may include protrusions forming the release control that are a flexible region (e.g., flexible arms, etc.) at the outer region of the attachment cavity in the palatal expander. The attachment may therefore snap into the palatal expander.

Figure 23:
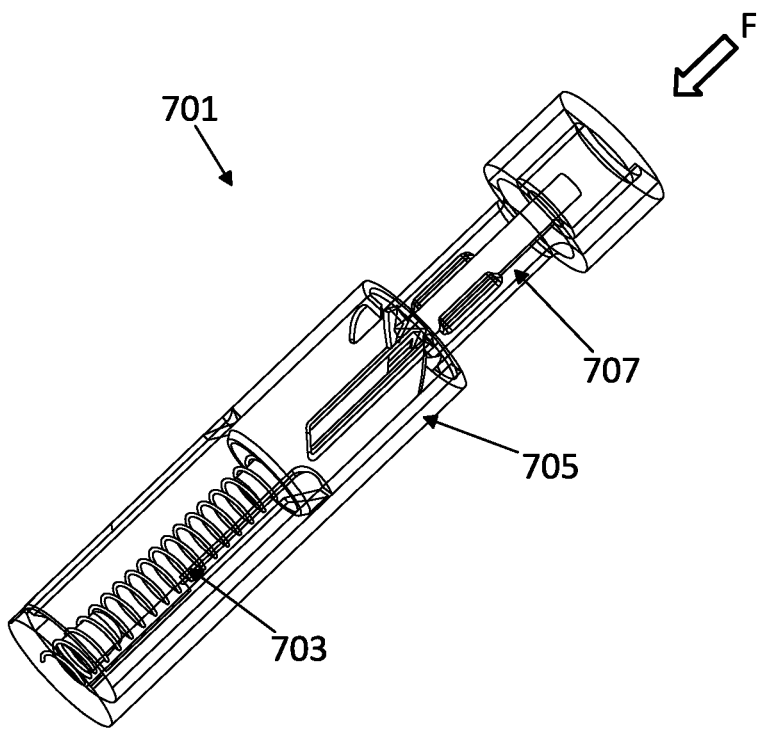
FIG. 23 illustrates a retractable pen mechanism that can be used for a palatal expander to engage and dislodge with the teeth.

Any of the release controls described herein may be configured as biased release controls. For example, the release control may include a spring, elastic, or other force retaining/releasing element. For example, FIG. 23 is an example of a release control configured as a biased pin 701 that may be used in any of the locks described herein. The biased pin includes a spring 703 that may drive the inner rod 707 out of the cylinder 705 forming the bod of the pin. Force (F) may be applied to compress the pin and collapse it back into the cylinder. In some variations the pin may be used as part of a release control mechanism of the lock that may extend either the inner rod portion or the cylindrical boy into a stay to secure the palatal expander into the stay on the teeth. Force may be applied by the patient and/or caregiver to remove the release control from the stay and disengage the palatal expander.

In any of the apparatuses described herein, a plurality of locks may be used to secure the palatal expander to the patient's teeth. For example, two or more locks (e.g., each comprising a release control and engaging with a stay) may be used to secure and release the palatal expander from the patient's teeth. The locks may be symmetrically arranged (e.g., one either side of a line of symmetry extending through the midline of the palatal expander). As mentioned, the locks may be configured on the buccal side of the palatal expander and configured to secure the palatal expander to the teeth.

Figure 24:
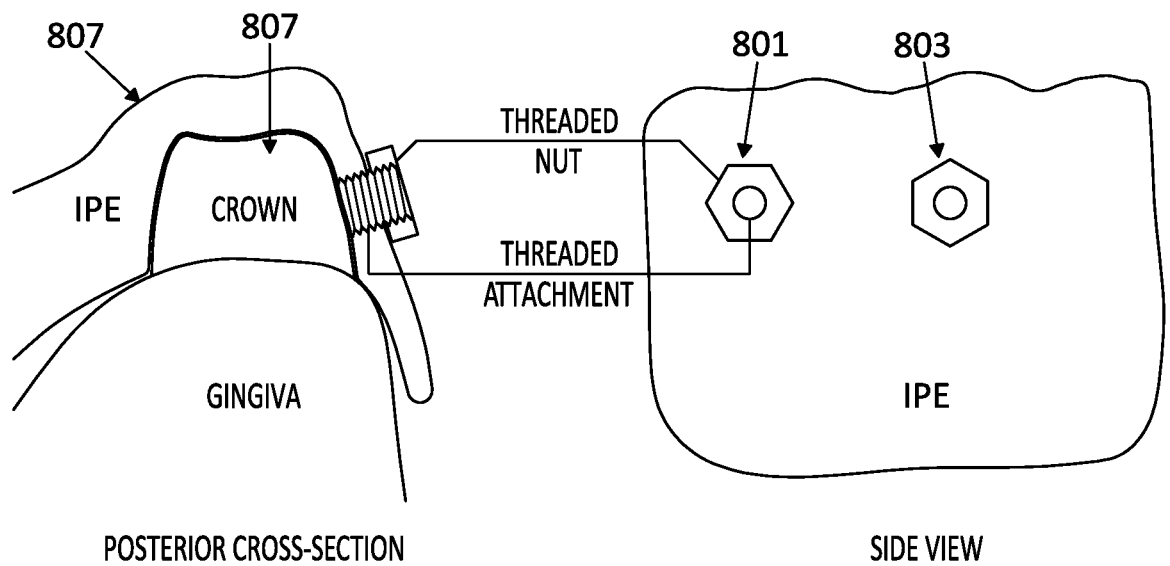
FIG. 24 illustrates a cross-sectional view and side view of a palatal expander engaged with the teeth, where threaded nuts and bolts are used to engage or dislodge the palatal expander.

FIG. 24 shows a variation in which the lock holding the palatal expander to the teeth includes a threaded nut 801, 803 that is attached to the patient's teeth. In this example, the threaded nut forms the release control and is separate or removable from the palatal expander, but secures to a threaded stay extending from and attached to (e.g., forming part of an attachment on) the patient's tooth 807. The palatal expander in this case includes an opening, notch or widow through the lateral (e.g., buccal) side through which the threaded stay extending from the tooth passes. The threaded nut can be used to lock the palatal expander 807 in place on the tooth, as shown. The palatal expander can be removed by unscrewing the threaded nut.

As mentioned above, the palatal expansion apparatuses described herein may be worn as a series of expanders by a patient. Various properties and characteristics of the inventive palatal expanders are described herein both in general and with reference to specific examples. Any of these features and characteristics, including the arrangement of features, may be incorporated into a palatal expander. These palatal expanders, which may be interchangeably referred to as palatal expansion shell apparatuses, may be configured to apply force within the patient's mouth to expand the patient's maxilla. The patients may be any appropriate patient, and particularly children from ages 7 to 9 years old, e.g., following eruption of the first permanent molars. These apparatuses may be used to expand the patient's palate between 4 and 12 mm or more.

The palatal expanders and/or attachments described herein may be formed of a single, monolithic material (e.g., by a 3D printing technique, etc.) or they may be formed in parts, e.g., by layering, thermosetting, etc.

The methods an apparatuses described herein may be used to treat young pre-pubertal subjects when a child's mouth has grown sufficiently to address the structure of the jaw and teeth while the primary teeth are still in the mouth. Palatal expansion may be used prior to aligner treatment; during this treatment, arch development occurs by increasing arch width or depth via dental or palatal expansion to create space for more permanent teeth to erupt. Typically aligners may not produce the required minimum transverse force needed for skeletal palatal expansion.

The palatal expander systems described herein may assist in skeletal and dental arch development. An example system may consist of a series of transpalatal arch feature that is intended to produce palatal expansion. The feature is designed to move/expand the palate by expanding the maxillary arch outwards buccolingually for transverse palatal size increases by exerting force on the maxillary posterior teeth. There will be no planned treatment for lower arch for the early feasibility clinical study. The expander wear time will be full-time. There are a series of expanders that are exchanged daily, with an expansion rate of 0.25 mm/day. The number of expanders is determined by the amount of expansion desired. This also determines the amount of time the expansion will be performed. The device is manufactured after obtaining digital impression scans of the child's teeth and palate. Thus, the palatal expander devices may be removed or replaced during the treatment, and may include any of the features descried herein to enhance removal. Patients are recommended to wear the device for a 24-hour period each day. Each device is recommended to wear for 1 day. The patient is requested to eat with the device as normally would. It is suggested that the patient remove the device before bedtime, brush their teeth before placing the next device.

The potential benefits of this treatment may include expansion of palate and arches, potentially correcting harmful and detrimental malocclusals. Expanding the palate may allow more space for permanent teeth to erupt, due to the space provided. Because the expanders are removable, patient hygiene may be improved. Because the expanders are made to the patient's anatomy, comfort may be improved without requiring the use of metal screws or brackets to irritate the tongue or palate. Expansion of the palate may improve the ability for the patient to breathe, increasing airway in nasal and areas.

The methods of treatment described herein may include a series of doctor-prescribed, custom manufactured, plastic removable orthodontic appliances that are designed for the expansion of the skeletally narrow maxilla (upper jaw, dental arch and/or palate) during early interceptive treatment of malocclusal. These apparatuses may be intended for use to expand the skeletally narrow maxilla (upper jaw, dental arch and/or palate).

Any of the apparatuses described herein may be used with (e.g., in conjunction with) a fixed skeletal expander and/or oral surgery, to correct severe crowding or jaw imbalances. If oral surgery is required, risks associated with anesthesia and proper healing must be taken into account prior to treatment.

Any of the features and methods described herein for palatal expanders may be applied to other removable orthodontic appliances, including in particular dental aligners. For example, the detachment regions, breach (e.g., hinge) regions, slots/slits, removal tools, etc., described herein may be similarly incorporated into a dental aligner or series of dental aligners. Thus, in the description above, unless the context makes it clear otherwise, the term "palatal expander" may be replaced with the term "dental aligner".

In addition, although the examples described herein are illustrated in the context of palatal expanders for use with one or more attachments on the teeth, these apparatuses and methods may be used for apparatuses that do not include attachments. For example, detachment regions, smoothed lower surfaces, and the like may be used with palatal expanders that do not include attachment regions (for mating with an attachment on a tooth).

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of removing a palatal expander shell apparatus from a patient's teeth, the method comprising:
applying a pulling force to a buccal side of the palatal expander shell apparatus while a first tooth engagement region is worn on a first portion of the patient's teeth, a second tooth engagement region is worn on a second portion of the patient's teeth, and while a palatal region extending between the first tooth engagement region and the second tooth engagement region is applying a lateral force between the first tooth engagement region and the second tooth engagement region,
wherein the pulling force causes a breach region of the palatal expander shell apparatus to break or bend along the breach region and to disengage the palatal expander shell apparatus from the first or second portion of the patient's teeth, wherein the breach region extends anteriorly to posteriorly in the palatal expander shell apparatus, and wherein the breach region comprises: a perforated region, a crease, a channel, or one or more voids within the palatal expander shell apparatus; and
removing the palatal expander shell apparatus from the patient's oral cavity.

2. The method of claim 1, wherein applying the pulling force comprises applying less than 30 N.

3. The method of claim 1, wherein applying the pulling force comprises applying less than 20 N.

4. The method of claim 1, wherein applying the pulling force comprises pulling the buccal side of the palatal expander shell apparatus with a force having a laterally outward force component.

5. The method of claim 1, wherein applying the pulling force comprises pulling an edge of the buccal side of the palatal expander shell apparatus.

6. The method of claim 1, wherein applying the pulling force causes the breach region to bend or break along the breach region so that the palatal expander shell apparatus disengages from one or more attachments between the palatal expander shell apparatus and the patient's teeth.

7. The method of claim 1, wherein applying the pulling force causes the breach region to bend along the breach region in a hinged manner.

8. The method of claim 1, wherein applying the pulling force causes the breach region to break along the breach region.

9. The method of claim 1, wherein applying the pulling force comprises using a tool to apply the pulling force.

10. The method of claim 1 wherein applying the pulling force comprises using a fingernail to apply the pulling force.

11. The method of claim 1, wherein applying the pulling force comprises pulling on a detachment region on the buccal side of the palatal expander shell apparatus.

12. A method of removing a palatal expander shell apparatus from a patient's teeth, the method comprising:
applying a pulling force to a buccal side of the palatal expander shell apparatus while a first tooth engagement region is worn on a first set of the patient's teeth and a second tooth engagement region is worn on a second set of the patient's teeth, and while a palatal region extending between the first tooth engagement region and the second tooth engagement region is applying a lateral force between the first tooth engagement region and the second tooth engagement region, wherein the palatal expander apparatus comprises a breach region extending anteriorly to posteriorly along the palatal expander shell apparatus, and vertical slots extending from a bottom of the buccal side toward the breach region,
wherein the pulling force causes a region along the buccal side between the vertical slots to bend away from the patient's teeth at the breach region, or to separate from the palatal expander apparatus at the breach region; and removing the palatal expander shell apparatus from the patient's oral cavity.

13. The method of claim 12, wherein the breach region has a mechanical strength that is less than a material strength of regions of the palatal expander shell apparatus surrounding to the breach region.

14. A palatal expander apparatus, the apparatus comprising:
- a pair of tooth engagement regions each extending anteriorly to posteriorly, and configured to be worn over a patient's teeth, wherein the tooth engagement regions each comprise an occlusal side and a buccal side;
- a palatal region connecting the pair of tooth engagement regions, wherein the palatal region is configured to apply a lateral force between the pair of tooth engagement regions when the apparatus is worn by the patient; and
- a breach region extending anteriorly to posteriorly, the breach region configured to predictably bend or break when a pulling force is applied to the buccal side of either or both of the pair of tooth engagement regions, wherein the breach region comprises: a perforated region, a crease, a channel, or one or more voids within the palatal expander apparatus.

15. The apparatus of claim 14, wherein the breach region has a mechanical strength that is lower than a mechanical strength of regions adjacent to either side of the breach region.

16. The apparatus of claim 14, wherein the breach region comprises a perforated region.

17. The apparatus of claim 14, wherein the breach region comprises a crease or channel.

18. The apparatus of claim 14, wherein the breach region comprises one or more voids within the palatal expander apparatus.

19. The apparatus of claim 14, wherein the breach region comprises a hinge.

20. The apparatus of claim 14, wherein the breach region extends across the occlusive side of one of the pair of tooth engagement regions.

21. The apparatus of claim 14, wherein the breach region is configured to break when the pulling force is greater than a predetermined value applied to the buccal side of one of the pair of tooth engagement regions in a laterally outward direction.

22. The apparatus of claim 21, wherein the predetermined value is 10 N.

23. The apparatus of claim 21, wherein the predetermined value is between 5 N and 100 N.

24. The apparatus of claim 14, wherein the breach region is configured to bend in a hinged manner when the pulling force is greater than a predetermined value applied to the buccal side of one of the pair of tooth engagement regions in a laterally outward direction.

25. The apparatus of claim 24, wherein the predetermined value is 10 N.

26. The apparatus of claim 24, wherein the predetermined value is between 5 N and 100 N.

27. The apparatus of claim 14, wherein the breach region is not visible.

28. The apparatus of claim 14, wherein the breach region extends from an anterior end of the palatal expander apparatus to a posterior end of the palatal expander apparatus.

29. The apparatus of claim 14, further comprising a plurality of attachment regions each configured to couple to an attachment bonded to the patient's teeth.

30. The apparatus of claim 29, wherein the breach region extends adjacent to one or more of the attachment regions along an anterior to posterior axis.

31. The apparatus of claim 14, further comprising a detachment region on the buccal side of at least one of the pair of tooth engagement regions configured to receive the pulling force.

32. The apparatus of claim 31, wherein the detachment region comprises one or more of a slot, ledge, notch, lip, or gap on or adjacent to a lower edge of the buccal side.

33. The apparatus of claim 14, further comprising a plurality of vertical slots or slits extending from a bottom of the buccal side toward the breach region.

34. A palatal expander apparatus, the apparatus comprising:
- a pair of tooth engagement regions each extending anteriorly to posteriorly, and configured to be worn over a patient's teeth, wherein the tooth engagement regions each comprise an occlusal side and a buccal side;
- a palatal region connecting the pair of tooth engagement regions, wherein the palatal region is configured to apply a lateral force between the pair of tooth engagement regions when the apparatus is worn by the patient; and
- a breach region extending anteriorly to posteriorly, the breach region configured to predictably bend or break when a pulling force is applied to the buccal side of either or both of the pair of tooth engagement regions; and
- vertical slots extending from a bottom of the buccal side toward the breach region, wherein, when the pulling force is applied to bend or break the breach region, the vertical slots provide a region along the buccal side that bends away from the patient's teeth or separates from the palatal expander apparatus.

35. The apparatus of claim 34, wherein the breach region has a mechanical strength that is less than a mechanical strength of regions adjacent to either side of the breach region so that the breach region predictably bends or breaks when a pulling force having a laterally outward component is applied to the buccal side of either or both of the pair of tooth engagement regions.

* * * * *